(12) United States Patent
Ito et al.

(10) Patent No.: US 7,752,643 B2
(45) Date of Patent: Jul. 6, 2010

(54) INFORMATION ACCESS SYSTEM, INFORMATION DISTRIBUTION DEVICE, INFORMATION ACCESS DEVICE, INFORMATION DISTRIBUTION METHOD, AND INFORMATION ACCESS METHOD

(75) Inventors: Akihiko Ito, Tokyo (JP); Tetsuo Maruyama, Tokyo (JP); Kazuhiro Fukuda, Kanagawa (JP); Takashi Tsurumoto, Saitama (JP)

(73) Assignee: Sony Corporation, Tokyo (JP)

( * ) Notice: Subject to any disclaimer, the term of this patent is extended or adjusted under 35 U.S.C. 154(b) by 1160 days.

(21) Appl. No.: 10/517,549

(22) PCT Filed: Apr. 7, 2004

(86) PCT No.: PCT/JP2004/005032

§ 371 (c)(1),
(2), (4) Date: Dec. 7, 2004

(87) PCT Pub. No.: WO2004/100549

PCT Pub. Date: Nov. 18, 2004

(65) Prior Publication Data

US 2006/0095543 A1    May 4, 2006

(30) Foreign Application Priority Data

| May 8, 2003 | (JP) | ................................ 2003-130788 |
| Jun. 13, 2003 | (JP) | ................................ 2003-169783 |
| Jun. 13, 2003 | (JP) | ................................ 2003-169825 |

(51) Int. Cl.
  G06F 15/16  (2006.01)
  H04N 5/445  (2006.01)
  G06F 3/00   (2006.01)
(52) U.S. Cl. ............................ 725/50; 709/218; 725/39

(58) Field of Classification Search ................. 709/218; 725/39, 46, 47, 53, 55, 56, 50
See application file for complete search history.

(56) References Cited

U.S. PATENT DOCUMENTS 5,990,883 A * 11/1999 Byrne et al. ................. 715/721

(Continued)

FOREIGN PATENT DOCUMENTS

JP    10-177532    6/1998

(Continued)

OTHER PUBLICATIONS

Kurioka, "TV Anytime Forum ni Okeru Hyojunka Doko", Eizo Joho Media Gakkaishi, Mar. 20, 2003, vol. 55, No. 3, pp. 344-352.

(Continued)

*Primary Examiner*—Larry Donaghue
*Assistant Examiner*—Brian J Gillis
(74) *Attorney, Agent, or Firm*—K&L Gates LLP

(57) ABSTRACT

An information search system is provided. The information search system is capable of searching a target content based on meta information provided by a broadcast station, in which a reception device makes an inquiry toward a directory service server based on a meta information reference ID accompanying meta information coming from the broadcast station so that a meta information group is derived for reference by the meta information reference ID. Also, another inquiry is made toward a content service server based on address information or a keyword of the content included in sub meta information in the meta information group so as to perform a search for any desired content.

52 Claims, 36 Drawing Sheets

U.S. PATENT DOCUMENTS

| | | | |
|---|---|---|---|
| 6,240,555 B1* | 5/2001 | Shoff et al. | 725/110 |
| 7,028,331 B2* | 4/2006 | Schwalb | 725/140 |
| 7,363,591 B2* | 4/2008 | Goldthwaite et al. | 715/763 |
| 2001/0027557 A1* | 10/2001 | Shinkawa et al. | 725/1 |
| 2003/0014753 A1* | 1/2003 | Beach et al. | 725/53 |
| 2003/0126600 A1* | 7/2003 | Heuvelman | 725/35 |
| 2004/0117280 A1* | 6/2004 | Klee et al. | 705/35 |

FOREIGN PATENT DOCUMENTS

| | | |
|---|---|---|
| JP | 2003-209830 | 7/2003 |

OTHER PUBLICATIONS

Kameyama, Hanamura, Digital Hoso Kyokasho (Ge), Kabushiki IDG Japan, Feb. 1, 2003, pp. 89 to 96, 140 to 197.

"TV Anytime Forum," The Journal of the Institute of Image Information and Television Engineers, vol. 55, No. 3, pp. 344-352, 2001.

Mori, Soichiro et al., "Medata Sharing Method for Metada Circulation," Forum on Information Technology, pp. 65-66, 2002.

* cited by examiner

FIG. 8

```
<ENTIRE META INFORMATION   META INFORMATION REFERENCE ID = "A-1" >
  <PROGRAM TITLE = "SMOPxSMOP"   START TIME = "22:00" ···/>
  <GROUP  GROUP ID = "0001"   GROUP TYPE = "CAST">
    <PERSON TYPE = "CAST" NAME = "TAKUYA KIMURO" ···/>
    <PERSON TYPE = "CAST" NAME = "HIKARI UTADA" ···/>
  </GROUP>
  <PERSON TYPE = "DIRECTOR" ···/>
</ENTIRE META INFORMATION>
```

FIG. 9

```
<BROADCAST STATION BROADCAST STATION ID = "TPS" >

<PROGRAM PROGRAM TITLE = "GOOD LACK", META INFORMATION
  REFERENCE ID = "A-1", ...>

<PROGRAM PROGRAM TITLE = "OUTABAN", META INFORMATION
  REFERENCE ID = "A-2", ...>

<PROGRAM ...>

</BROADCAST STATION>

<BROADCAST STATION BROADCAST STATION ID = "BUSHI TELEVISION">

<PROGRAM PROGRAM TITLE = "PROFESSIONAL BASEBALL",
  META INFORMATION REFERENCE ID = "B-1", ...>

<PROGRAM ...>

</BROADCAST STATION>
```

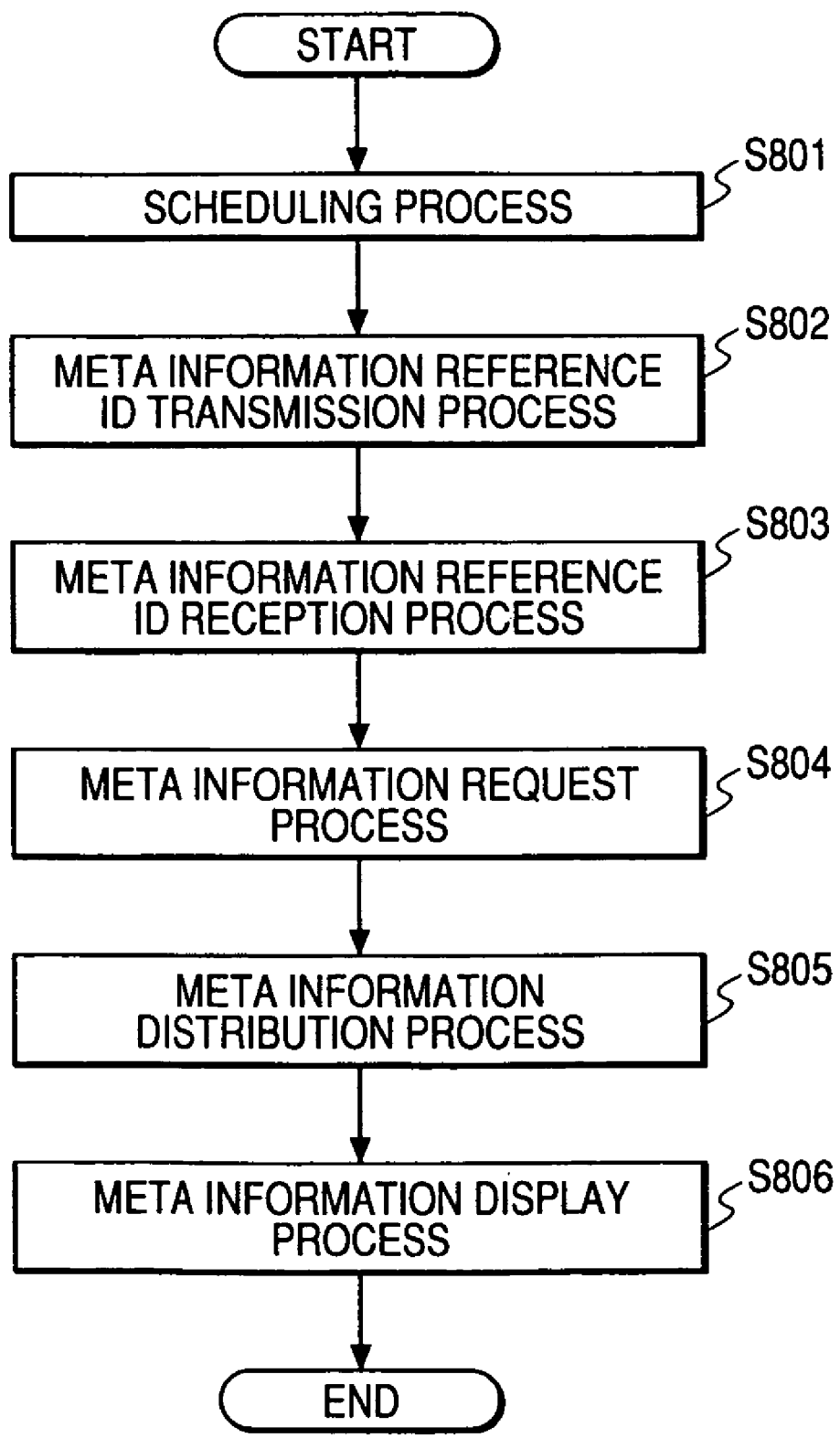

FIG. 12A

| | BROADCAST STATION 105-A | BROADCAST STATION 105-B | BROADCAST STATION ··· | |
|---|---|---|---|---|
| 19:00 | "A-NEWS" | "HANJIN x KYOSHIN" | ... | DISPLAY REQUIREMENTS |
| 20:00 | "GOOD LACK" | | ... | CATEGORY / CAST / ... / SPECIAL SITE / ... |
| 21:00 | "OUTABAN" | "NEWS STUDIO" | ... | |

FIG. 12B

| | BROADCAST STATION 105-A | BROADCAST STATION 105-B | BROADCAST STATION ··· | |
|---|---|---|---|---|
| 19:00 | "A-NEWS" NEWS | "HANJIN x KYOSHIN" SPORTS | ... | DISPLAY REQUIREMENTS |
| 20:00 | "GOOD LACK" DRAMA | | ... | CATEGORY / CAST / ... / SPECIAL SITE / ... |
| 21:00 | "OUTABAN" MUSIC | "NEWS STUDIO" NEWS | ... | |

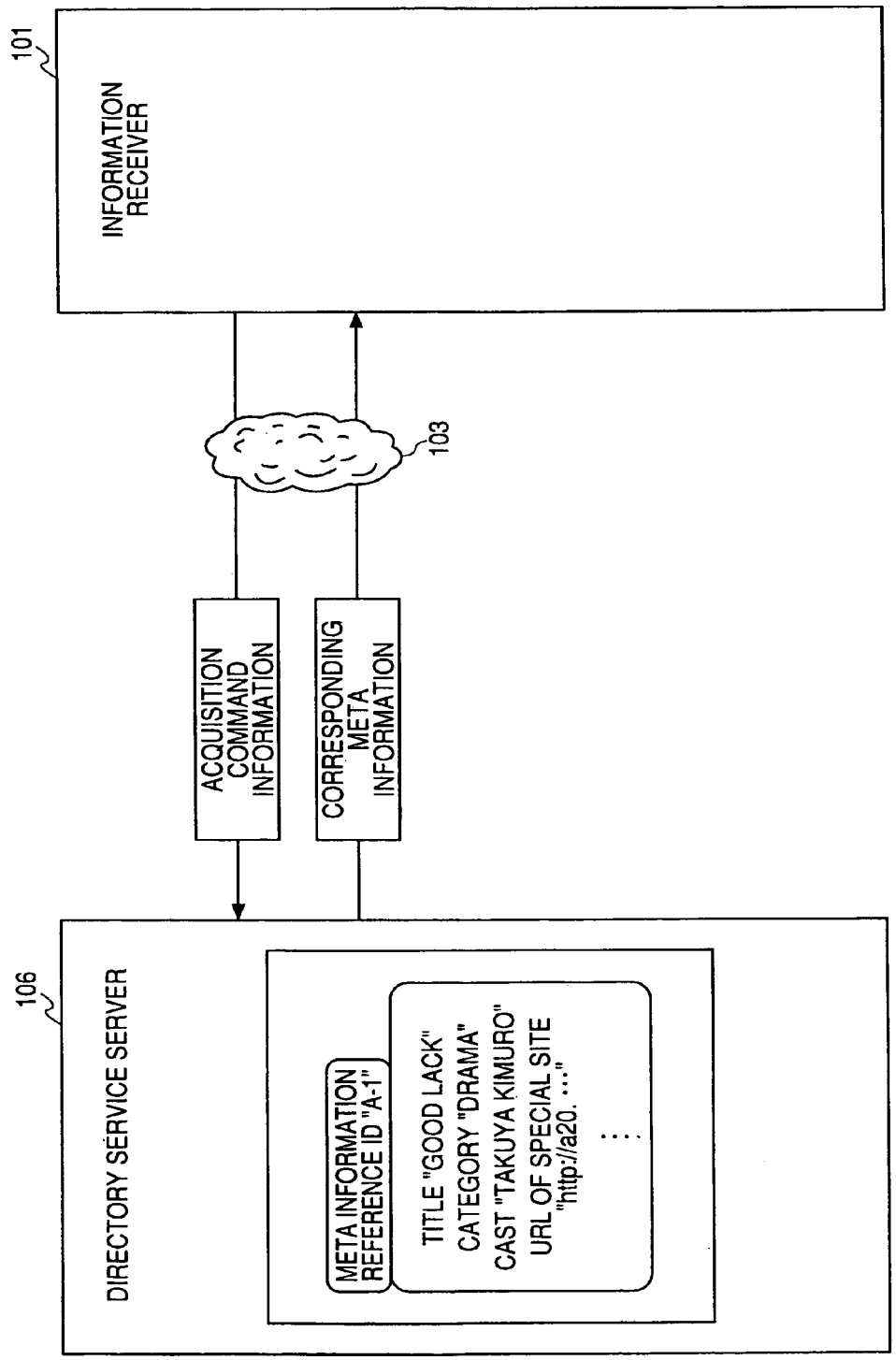

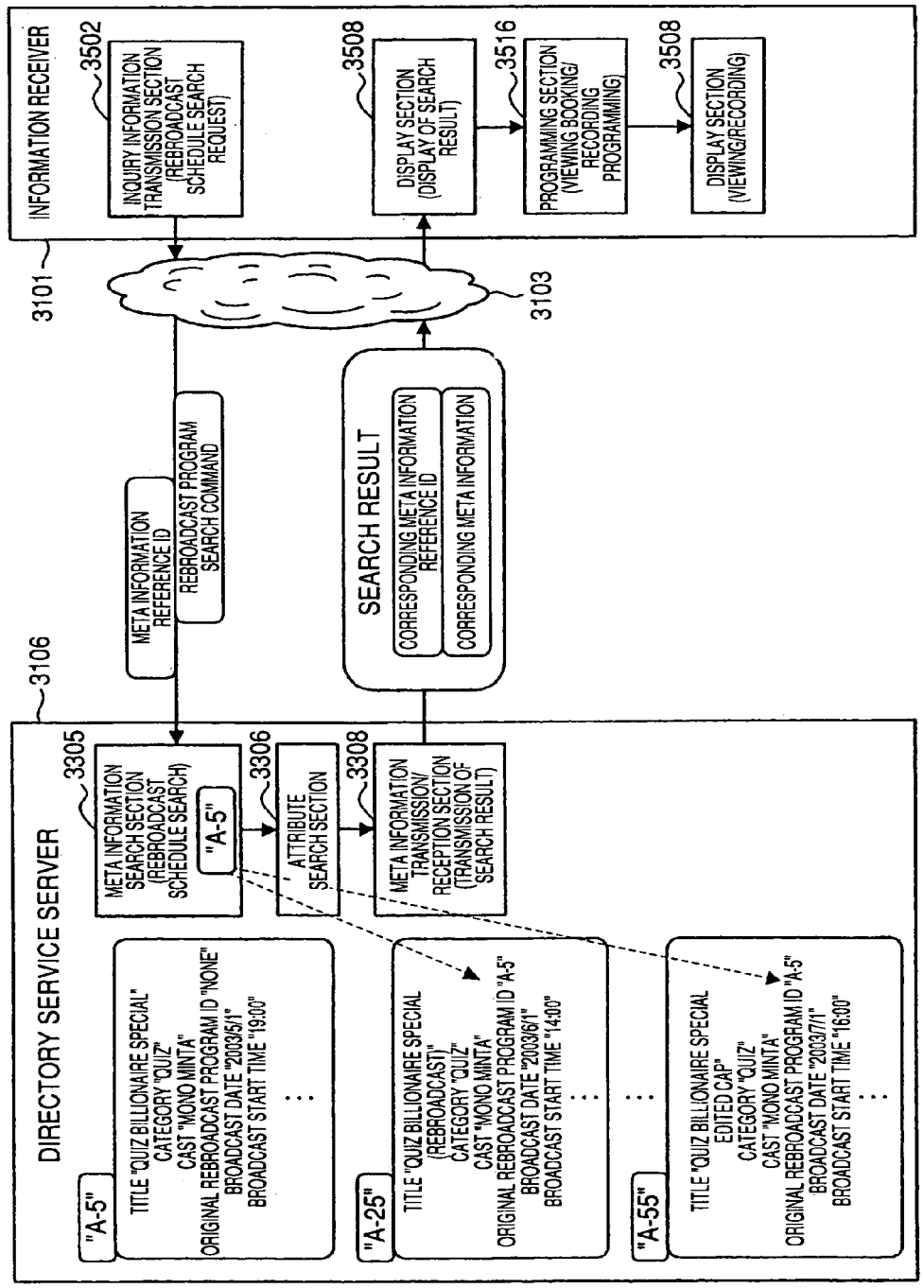

INFORMATION ACCESS SYSTEM, INFORMATION DISTRIBUTION DEVICE, INFORMATION ACCESS DEVICE, INFORMATION DISTRIBUTION METHOD, AND INFORMATION ACCESS METHOD

CROSS REFERENCES TO RELATED APPLICATIONS

The present application claims priority to Japanese Patent Document Nos. P2003-130788 filed on May 8, 2003, P2003-169783 filed on Jun. 13, 2003, and P2003-169825 filed on Jun. 13, 2003, the disclosures of which are herein incorporated by reference.

BACKGROUND OF THE INVENTION

The present invention relates to an information access method, an information distribution device, a meta information distribution device, an information reception device, and an information access method.

Conventionally, in a content service for offering main contents including broadcast programs, books in print, music, and others over a network exemplified by the Internet, for information search related to such main contents in televisions or others, for example, main contents such as programs are sent out to reception devices exemplified by PCs (Personal Computers), and a search is made for information related to the main contents in the reception devices.

The information or others about the main contents has been also sent out to the reception devices as meta information about the main contents. As an example, refer to JP-A-10-177532.

The issue here is that the meta information about the main contents is collectively forwarded to the reception devices as a whole of the meta information. Thus, for reception, the reception devices could not have selected only any desired meta information from the whole of the meta information. What is more, no change could have been made for the meta information and others of the main contents related to a broadcast program if the program was on the air.

SUMMARY OF THE INVENTION

The present invention provides in an embodiment information access method, information distribution device, meta information distribution device, information reception device, and information access method with which the reception devices receive only any needed meta information without receiving the whole of the meta information, and acquire from the received meta information any intriguing contents.

According to a first aspect of the present invention, provided is an information access system including an information distribution device for distributing a content, a meta information distribution device for distributing meta information related to the content, and an information reception device for receiving the content. In such an information access system, characteristically, the information distribution device is provided with an identification information transmission section for transmitting, to the information reception device, a meta information reference ID for referring to one or more pieces of metal information coming together with the content. The information reception device is provided with an identification information reception section for receiving the meta information reference ID coming from the information distribution device, an acquisition information capture section for capturing acquisition target information including a target set for meta information acquisition, and an acquisition command section for generating acquisition command information for acquiring any target meta information based on at least either the meta information reference ID or the acquisition target information. The meta information distribution device includes a meta information extraction section for extracting, from one or more pieces of meta information, only a part of the meta information instructed by the acquisition command information with reference to the acquisition command information coming from the information reception device.

According to the present invention in an embodiment, the information distribution device in the information access system transmits, as occasion arises, to the information reception device, the meta information reference ID for meta information identification. The information reception device receives the meta information reference ID, and after completing the selection of the meta information related to the meta information reference ID, extracts only any target meta information at least from the meta information based on at least either the selected meta information reference ID or the acquisition target information for use of meta information acquisition. With such a structure, by previously transmitting identification information including the meta information reference ID to the information reception device, and by transmitting the minimum amount of the content-relating meta information, the information reception device can receive and manage only any needed meta information without receiving unnecessary meta information, whereby the communications processing can be improved in efficiency.

A possibility determination section may be so structured as to use, as a determination factor, the update possibility of the meta information corresponding to the acquisition target information at hand.

The identification information transmission section provided to the information distribution device may be so structured as to send out the meta information reference ID using broadcast waves.

The information reception device may be so structured as to further include the possibility determination section for making a determination about the update possibility of the meta information, and an updated meta information request section for generating meta information request information used for asking the meta information distribution device for meta information. With such a structure, when the meta information forwarded to the information reception device has been updated on the side of the meta information distribution device, the meta information can be automatically updated in real time.

Based on update determination information indicating whether the meta information has the update possibility, the possibility determination section may be so structured as to determine whether the meta information can be updated or not. With such a structure, the meta information determined as not updatable requires no update confirmation process, thereby increasing the efficiency of the update process.

Based on the meta information request information coming from the information reception device, the meta information distribution device may be so structured as to include a meta information search section for making a search for the meta information requested by the information reception device.

The meta information request information may be so structured as to at least include version information of the meta information. Note here that the version information of the meta information may exemplarily show the update frequency or others, for example.

The meta information search section may be so structured as to make a search for, out of the found meta information, the meta information whose version information is the latest. With such a structure, if the version information of the meta information is the latest, the meta information is considered as having the highest update probability so that it can be swiftly checked on the information reception device side whether the information is updated or not through comparison of the version information.

With the meta information search section, derived is such a structure that the meta information having the largest number of version information of the meta information is to be searched. With such a structure, by checking the meta information having the highest update probability, it becomes possible to swiftly check whether the information has been updated or not.

The meta information search section may be so structured as to compare between the version information included in the meta information request information and the version information of the found meta information. With such a structure, it becomes possible to check whether or not the meta information has been updated on the meta information distribution device side. This can favorably lead to reduction of the processing load for the information reception device.

According to a second aspect of the present invention, provided is an information distribution device for distributing a content to an information reception device through selection of meta information coming from a meta information distribution device by the information reception device. The information distribution device includes an identification information transmission section for forwarding, to the information reception device, a meta information reference ID used for referring to one or more pieces of meta information coming together with the content. Note here that the above information distribution device has almost the same structure as the information distribution device applied to the information access system, and thus no detailed description is provided here again.

Further, according to a third aspect of the present invention, provided is an information reception device for receiving a content from an information distribution device by a meta information distribution device distributing meta information related to the content. Such an information reception device includes an identification information reception section for receiving a meta information reference ID for identifying the meta information coming from the information distribution device, an acquisition information capture section for capturing acquisition target information including a target set for meta information acquisition, and an acquisition command section for generating acquisition command information for acquiring any target meta information based on at least either the meta information reference ID or the acquisition target information. Note here that the above information distribution device has almost the same structure as the information distribution device applied to the information access system, and thus no detailed description is provided here again.

The acquisition target information may be so structured as to at least include an index of the meta information, and the index may be so structured as to include an attribute of the meta information.

The acquisition information capture section may be so structured as to capture the acquisition target information in which an acquisition target is group meta information as a result of grouping a plurality pieces of meta information. Each attribute or index of the meta information included in the group meta information may be so structured as to be substantially the same.

The information reception device may be so structured as to further include a possibility determination section for determining an update possibility of the meta information, and an updated meta information request section for generating meta information request information for requesting the meta information to the meta information distribution device in accordance with the determination result derived by the possibility determination section.

The possibility determination section may be so structured as to make a determination about the update possibility of the meta information based on update determination information indicating whether the meta information has the update possibility or not.

The meta information request information may be so structured as to at least include version information of the meta information. Note here that the version information of the meta information may exemplarily show the update frequency or others, for example.

Still further, to solve the above problems, according to a fourth aspect of the present invention, provided is a meta information distribution device for distributing, to an information reception device, meta information related to a content provided by an information distribution device. The meta information distribution device is characterized in including a meta information extraction section for extracting, with reference to acquisition command information coming from the information reception device to acquire any target meta information, only meta information instructed by the acquisition command information. Note here that the above information distribution device has almost the same structure as the information distribution device applied to the information access system, and thus no detailed description is provided here again.

The meta information extraction section may be so structured as to extract, with reference to the acquisition command information, only the meta information instructed by the acquisition command information out of the meta information linked to the meta information reference ID.

The acquisition command information may be so structured as to at least include a meta information reference ID or an index of the meta information, and the index may be so structured as to include an attribute of the meta information.

The acquisition command information may be so structured as to include, as an acquisition target, group meta information as a result of grouping a plurality pieces of meta information. With such a structure, the acquisition command information can be set with a meta information reference ID of the group meta information, an attribute of the group meta information, or others.

Each attribute or index of the meta information included in the group meta information may be so structured as to be substantially the same.

The meta information distribution device may further include a meta information search section for making a search for the meta information based on meta information request information for requesting any updatable meta information coming from the information reception device.

The meta information request information may be so structured as to at least include version information of the meta information. Note here that the version information of the meta information may exemplarily show the update frequency or others, for example.

The meta information search section may be so structured as to make a search for the meta information having the latest version information. Through comparison between the version information included in the meta information request information and the version information of the meta information found as a search result, when the version information of the found meta information resultantly outweighs, the meta information search section may be so structured as to determine that the found meta information has been updated.

When the found meta information is updated, the meta information extraction section may be so structured as to extract only the meta information requested by the meta information request information.

The meta information extraction section may be so structured as to extract, with reference to the meta information request information, only the meta information requested by the meta information request information out of the meta information linked to the meta information reference ID.

Still further, according to a fifth aspect of the present invention, provided is an information access method for making an access to a content retained by an information distribution device by a meta information distribution device distributing meta information related to the content. The information access method includes transmitting a meta information reference ID used for referring to one or more pieces of meta information coming together with the content, a process of receiving the transmitted meta information reference ID, a process of acquiring acquisition target information set with a target for meta information acquisition out of one or more pieces of meta information, a process of generating acquisition command information for acquiring any target meta information based on at least either the meta information reference ID or the acquisition target information, and a process for the meta information distribution device to extract, from one or more pieces of meta information, only a part of the meta information instructed by the acquisition command information with reference to the acquisition command information.

The process of extracting only a part of the meta information may be so structured as to extract, with reference to the acquisition command information, out of the meta information linked to the meta information reference ID, only the meta information instructed by the acquisition command information.

The acquisition target information may be so structured as to include at least an index of the meta information, and the index may be so structured as to include an attribute of the meta information.

The acquisition target information may be so structured as to include, as an acquisition target, group meta information as a result of grouping a plurality pieces of meta information.

Each attribute or index of the meta information included in the group meta information may be so structured as to be substantially the same.

The information access method may be so structured as to further include a process of determining an update possibility of the meta information, and a process of generating meta information request information for asking the meta information distribution device for the meta information in accordance with the determination result derived for the update possibility of the meta information.

The determination of update possibility may be so made that the update possibility of the meta information is determined based on update determination information indicating whether the meta information has the update possibility.

The meta information request information may be so structured as to at least include version information of the meta information. Note here that the version information of the meta information may exemplarily show the update frequency or others, for example.

The information access method may be so structured as to further include a process of making a search for the meta information based on the meta information request information.

The process of making a search for the meta information may be so structured as to search the meta information for the meta information having the latest version information.

The process of making a search for the meta information may be so structured as to compare between the version information included in the meta information request information and the version information of the found meta information.

Still further, according to a six aspect of the present invention, provided is an information access system capable of updating meta information, including a meta information distribution device for distributing meta information, an information distribution device for distributing a content related to the meta information, and an information reception device for receiving the content. The information distribution device is provided with an identification information transmission section for transmitting, to the information reception device, a meta information reference ID used for referring to one or more pieces of meta information coming together with the content. The information reception device is provided with an identification information reception section for receiving the meta information reference ID coming from the information distribution device, a meta information storage section for storing the meta information, a possibility determination section for determining whether the meta information is updatable, and an updated meta information request section for generating meta information request information for asking the meta information distribution device for any updated part of the meta information in accordance with the determination result derived by the possibility determination section.

The possibility determination section may be so structured as to make a determination about the update possibility of the meta information based on update determination information indicating whether the meta information has the update possibility or not.

In an alternative structure, based on at least one of the meta information reference ID, an index of the meta information, and an attribute of the index, the meta information request information may be generated.

The possibility determination section may be so structured as to use the meta information corresponding to the captured acquisition target information as a determination factor for determining the update possibility.

The meta information request information may be so structured as to include at least version information of the meta information. Note here that the version information of the meta information may exemplarily show the update frequency or others, for example.

The meta information distribution device may be provided with a meta information search section for making a search for the meta information requested by the information reception device based on the meta information request information provided by the information reception device.

Additional features and advantages of the present invention are described in, and will be apparent from, the following Detailed Description of the Invention and the figures.

BRIEF DESCRIPTION OF THE FIGURES

FIG. 8 is a diagram showing the data structure of a meta information group of the embodiment.

FIG. 9 is a diagram showing the data structure of EPG data of the embodiment.

FIG. 10 is a flowchart showing the schematic operation of the information access system of the embodiment.

FIGS. 12A and 12B are each a diagram showing the structure of an EPG display screen of the embodiment.

FIG. 14 is a diagram showing the structure of the EPG display screen of the embodiment.

FIG. 32 is a diagram schematically showing a partial acquisition process to be executed for meta information of the embodiment.

DETAILED DESCRIPTION OF THE INVENTION

Figure 1:
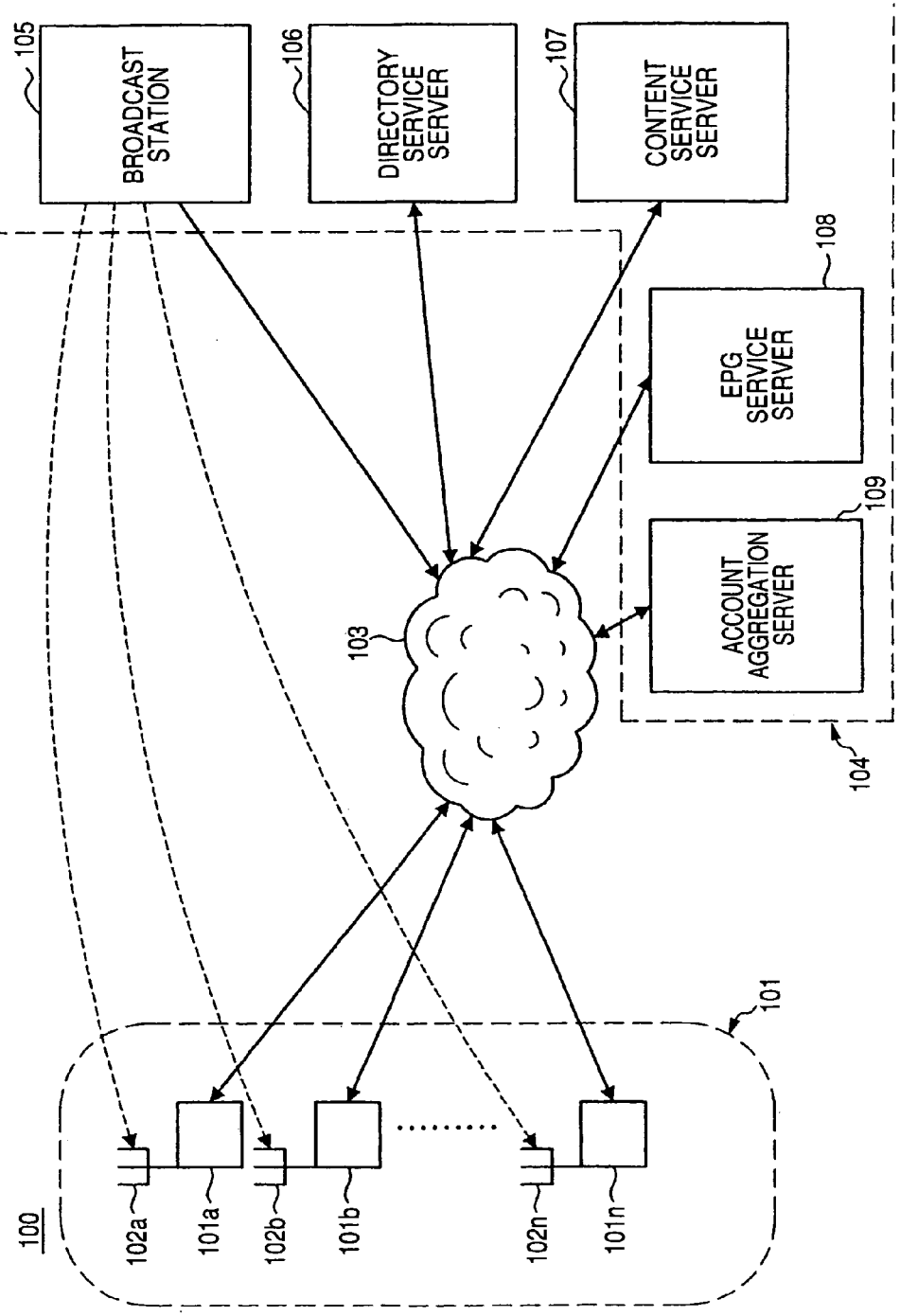
FIG. 1 is a block diagram showing the schematic structure of an information access system of an embodiment.

The present invention relates to an information access method, an information distribution device, a meta information distribution device, an information reception device, and an information access method.

In the below, a preferred embodiment of the present invention is described in detail by referring to the accompanying drawings. Here, in the following description and the accompanying drawings, any components sharing substantially the same function and structure are provided with the same reference numerals so as not to repeat their descriptions.

First, by referring to FIG. 1, described is an information access system 100 of the present embodiment. FIG. 1 is a block diagram showing the schematic structure of the information access system of the present embodiment.

As shown in FIG. 1, the information access system 100 of the present embodiment is structured at least by information reception devices 101 (101a, 101b, ..., 101n), a network 103, and an information distribution device 104. Note here that the information reception device 101 of the present embodiment corresponds to an information access device or others of the present invention, for example.

With the information access system 100 of the present embodiment, as a possible service, the information distribution device 104 can distribute a main content (main content) exemplified by a broadcast program to the information reception devices 101, and the information reception devices 101 can acquire, through meta information, a plurality of sub contents all interrelated to the main content. Here, the main content, the sub contents, and the meta information, or others will be all described later.

In the below, exemplified is a case where a main content provided by the information distribution device 104 toward the information reception devices 101 is a broadcast program to describe the information access system 100 of the present embodiment.

The information distribution device 104 includes at least a broadcast station 105, a directory service server 106, a content service server 107 or an EPG (Electronic Program Guide) service server 108, and an account aggregation server 109.

The broadcast station 105 offers various broadcast programs to the information reception devices 101, and sends out basic EPG information or others as data broadcasting. Through reception of the basic EPG information, the information reception devices 101 can display an EPG (Electronic Program Guide). Herein, the basic EPG information will be described later.

Note here that the information distribution device 104 of the present embodiment is described by exemplifying the structure including the broadcast station 105, but such an exemplary structure is not the only option. As an example, in a case where the main content is not "broadcast program or EPG" but "game software", "book in print", or the like, the information distribution device 104 may include, for application, an ISP (Internet Service Provider), or a product sales system for selling game software or others.

The EPG service server 108 receives schedule information or others coming from the broadcast stations 105, and generates EPG information in the form of Electronic Program Guide (EPG), or acquires EPG information that has been generated outside. The schedule information is information for broadcasting the programs on schedule, and proceeding the programs.

Thus generated EPG information is stored in a storage section (not shown.) provided to the EPG service server 108. Here, the EPG information includes basic EPG information. Through reception of the basic EPG information, the information reception devices 101 can display channel lists, program lists, program contents currently on the air, program contents to be on the air, program contents having been off the air, and the like.

The basic EPG information is delivered to the information reception devices 101 from the EPG service server 108 all at once, and any other additional ECG (Electronic Contents Guide) information exemplified by sub meta information added to the sub contents can be independently managed in the broadcast station 105 that is the service-offering side. Here, the ECG information and the sub meta information will be both described later. The broadcast station 105 is not the only option, and any other device will do depending on the service type offered by the information distribution device 104.

The information reception devices 101 are provided with each corresponding identification information reception section 102 (102*a*, 102*b*, . . . , 102*n*) to receive broadcast waves including identification information such as a meta information reference ID, and as indicated by dotted arrows, receive broadcast waves coming from the broadcast station 105. Alternatively, the information reception devices 101 perform data transmission and reception to/from the information distribution device 104 over the network 103. Here, through reception of the broadcast waves as such, the information reception devices 101 can display programs such as television programs.

Note here that the information access system 100 of the present embodiment is exemplified by a case of singly including the information distribution device 104. Such an example is not restrictive, and for example, each broadcast station may include a plurality of information distribution devices 104 for application.

The account aggregation server 109 has a function of performing, in a unified manner, not dependent on the broadcast station 105, programs, or others, authentication when viewers (users) use the information access system 100, or billing and settlement when the users using the information access system 100 make a purchase of sub contents or others.

That is, with the account aggregation server 109 included, unified authentication becomes possible through unification of users' authentication information, and moreover, billing and settlement information can be also unified on a user basis.

Assuming that a user wants to purchase various sub contents based on sub meta information, these sub contents may be under the management of varying content holders or content distribution companies.

Every possible service such as billing and settlement may be unified, and provided is a function of alternatively performing authentication to access every possible service based on a single unified user ID. It can be realized by any specific server, for example.

User authentication (for example, using passwords) is performed in the account aggregation server 109, and only the authentication result is forwarded to the corresponding content service server 107. This eliminates the need for informing unified user IDs and passwords to the broadcast station 105 provided to the information distribution device 104, whereby the users' personal information can be protected under the management of the server.

The authentication result is forwarded to the content service server 107 in a form of an electronic certificate or others, which includes neither the user ID nor password information. Thus, in a case of wiretapping by third parties, this successfully ensures security measures against tampering.

Herein, the user information is described by exemplifying a case of not being forwarded to the content service server 107. Such an example is not the only option, and the user information may be forwarded to the content service server 107 for application.

Moreover, when customer information is needed to be disclosed in terms of marketing activity for content holders being the copyright holders of products such as video, music, game software, and the like, the user information can be used effectively. In the above case, the user ID is included in an electronic certificate before notified to the content service.

For alternative performance of billing and settlement, a user logs in the account aggregation server 109 to obtain the unified billing and settlement service using his or her unified user ID.

After log-in, a selection is made from the sub contents exemplified by products offered by each different content service servers 107. For example, in response to a command of "put into basket", products available by various content services can be kept in a basket irrespective of the content service server. Herein, the "basket" is a shopping "bag".

Through selection of sub contents and placement of the result into the basket, at the payment, the sub contents can be collectively billed and settled no matter from which content service server 107 the sub contents are provided.

After selection of sub contents, when the user issues a "purchase" command, the account aggregation server 109 responsively performs, all at once, billing and settlement using its billing and settlement function, and the result derived by such billing and settlement is forwarded to the content service servers 107. Upon reception of a completion notice of billing and settlement, the content service servers 107 distribute the sub contents under the user's purchase command to the user.

Figure 2:
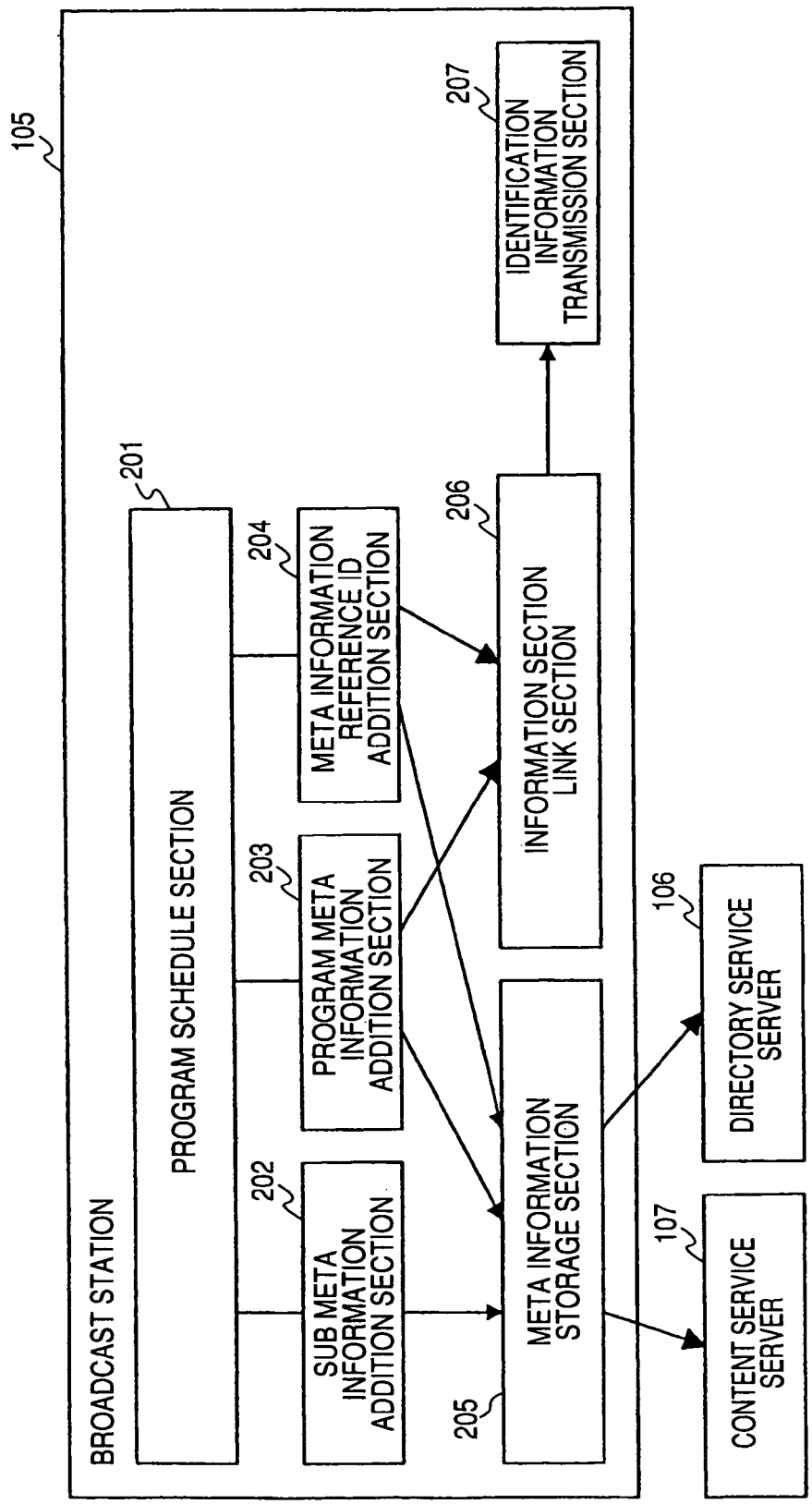
FIG. 2 is a block diagram showing the schematic structure of a broadcast station of the embodiment.
Figure 3:
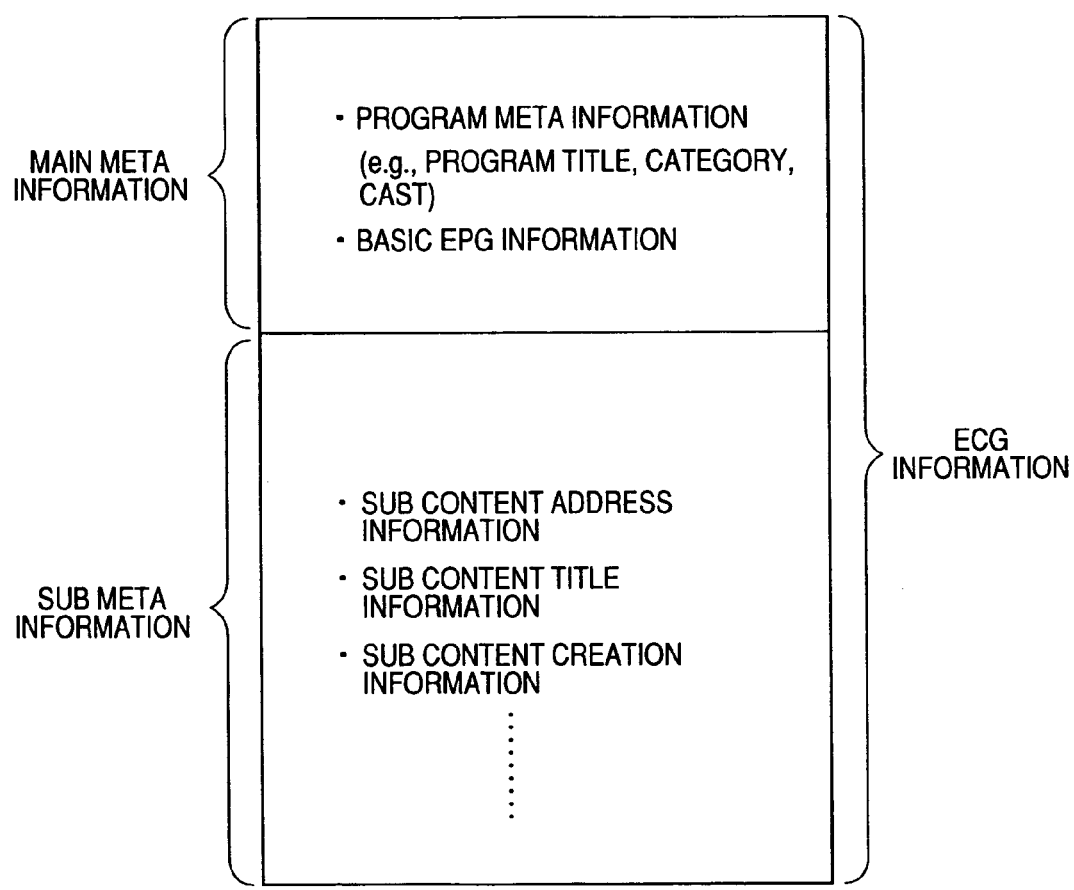
FIG. 3 is a diagram showing the schematic data structure of ECG information of the embodiment.
Figure 4A:
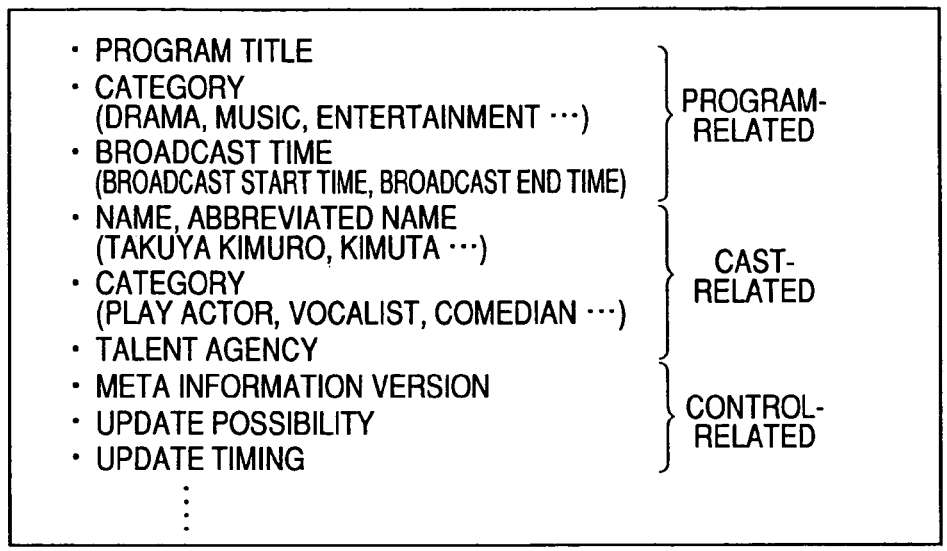
FIGS. 4A and 4B are each a diagram schematically showing meta information included in the ECG information of the embodiment.
Figure 4B:
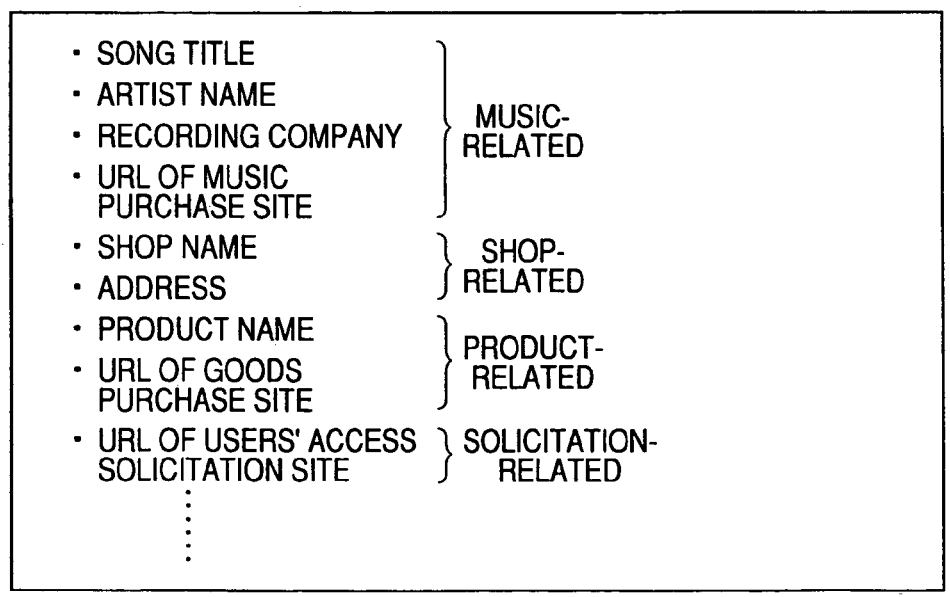

By referring to FIGS. 1 to 4B, described next are the structures of components provided to the information access system 100 of the present embodiment. FIG. 2 is a block diagram showing the schematic structure of a broadcast station of the present embodiment, FIG. 3 is a diagram schematically showing the data structure of ECG information of the present embodiment, and FIGS. 4A and 4B are both a diagram schematically showing meta information included in the ECG information of the present embodiment.

First, as shown in FIG. 1, the network 103 of the present embodiment is described. The network 103 is connected to the information distribution device 104 for bidirectional communications therewith, and typically is the Internet establishing a connection by ADSL (Asymmetric Digital Subscriber Line), FTTH (Fiber To The Home), and the like. The connection medium includes a fiber-optic cable by FDDI (Fiber Distributed Data Interface) or others, a coaxial cable or a twisted pair cable by Ethernet (trademark), or radio by IEEE 802.11b, and also includes a satellite network or others, whether it be cable or radio.

Next, as shown in FIG. 2, the broadcast station 105 of the present embodiment is structured by, in addition to a general broadcast facility, a program schedule section 201, a sub meta information addition section 202, a program meta information addition section 203, a meta information reference ID addition section 204, a meta information storage section 205, an information interrelation section 206, and an identification information transmission section 207.

Note here that when the service offered by the information access system 100 of the present embodiment is "broadcasting", the information access system 100 is provided with the broadcast station 105 of the present embodiment shown in FIG. 2. Moreover, the main contents (main contents) provided by the broadcast station 105 to viewers are presumably broadcast programs (programs) or EPG.

The main content of the present embodiment is exemplified as being a program or an EPG. Such an example is not restrictive, and for example, the main content may be game software, CD, book in print, movie, or the like.

The program schedule section 201 generates schedule information and others by going through a scheduling process for programs to be broadcast by the broadcast station 105.

The sub meta information addition section 202 generates sub meta information, and adds the resulting sub meta information to the entity of a sub content (sub content) or the schedule information. Herein, the sub content is a content including at least, singly, a product, a program, a package, a service, still image data, moving image data, music data, and text, and is provided from the content service server 107.

The sub meta information is meta information hierarchically below main meta information (or program meta information.) interrelated to the main content. Accordingly, by making an access to the main meta information, the information reception device 101 can access, extendedly, the sub meta information interrelated to the main meta information, whereby any target sub content can be acquired.

The program meta information addition section 203 generates program meta information being the main meta information for addition to the schedule information generated by the program schedule section 201. Note here that the program meta information added to the schedule information is structured as the basic EPG information for delivery to the information reception devices 101. The basic EPG information is the one structured in the format of Electronic Program Guide (EPG). Herein, the program meta information or the sub meta information is the meta information indicating information about information, and the program meta information belongs to the main meta information. The main meta information will be described later.

The basic EPG information includes the program meta information, and has structure information as a program guide. When transmitted over the network 103, the basic EPG information is delivered in such a format as HTML (Hyper Text Markup Language), and when transmitted by broadcast waves, it is sent out in such a format as SI (service Information).

The meta information reference ID addition section 204 goes through assignment of a meta information reference ID, and adds the meta information reference ID to the schedule information generated by the program schedule section 201 and the sub meta information. For the purpose of establishing a correspondence between the ECG information including the program meta information or the sub meta information and a program, the meta information reference ID is assigned to every program, for example. Thus, through addition of the meta information reference ID to both the program meta information and the sub meta information added to the schedule information, the program meta information or the sub meta information can be acquired based on the meta information reference ID.

By referring to the meta information reference ID, the information reception devices 101 acquire the program meta information or the sub meta information, and can access to sub contents or information related to broadcast programs. Herein, the meta information reference ID may be unique in the broadcast station 105.

The meta information storage section 205 stores, at least, the schedule information, the sub meta information, the program meta information, the meta information reference ID, or the sub contents. The sub meta information, the program meta information, the meta information reference ID, and the sub contents are belonging to ECG information, and the ECG information will be described later.

The information interrelation section 206 interrelates the basic EPG information and the meta information reference ID, both of which are added to the schedule information. Through such an interrelation established between the meta information reference ID and the basic EPG information, the information reception devices 101 can acquire broadcast station information or others for identification of the broadcast station 105 included in the basic EPG information based on the meta information reference ID. Here, the broadcast station information will be described later.

The identification information transmission section 207 sends out the basic EPG information and the meta information reference IDs assigned to the respective programs over the broadcast waves or the network 103. The meta information reference ID is delivered from the identification information transmission section 207 together with the basic EPG information.

To deliver the meta information reference ID over the broadcast waves from the identification information transmission section 207, for example, there needs to define the attribute value of a descriptor indicating the meta information reference ID for the SI, which is the transmission scheme for the basic EPG information.

To transmit the basic EPG information, the meta information reference ID, or the like over the network 103 exemplified by the Internet, there needs to define the delivery format supportable on the side of the information reception devices 101, the delivery mechanism, or the like.

The delivery format is exemplified by HTML (Hyper Text Markup Language) format, XML (eXtensible Markup Language) format, or the like. Thus, when the HTML format or the XML format is used for delivery, the meta information includes an attribute indicating the meta information reference ID.

Moreover, when the HTML format or the XML format is used for delivery, the basic EPG information in the delivery format is provided with an attribute value of the meta information reference ID.

The sub meta information or the program meta information to be stored in the meta information storage section 205 is forwarded to the directory service server 106 as appropriate. Moreover, the sub contents or the sub meta information to be stored in the meta information storage section 205 are/is forwarded to the content service server 107.

Next, by referring to FIG. 3, described is the ECG information of the present embodiment. First, as shown in FIG. 3, the ECG information is structured by the main meta information and the sub meta information both belonging to the meta information.

Using the ECG information allows the basic EPG (Electronic Program Guide) information to be expanded as data for TV (television) program search, and any needed information to be acquired through search of not only the TV programs but also various contents on the Internet.

The ECG information includes the program meta information, the basic EPG information, or the sub meta information. The program meta information or the basic EPG information is information belonging to the EPG information. The EPG information is electronic program guide data for TV program search.

By using the ECG as a result of expanding the EPG information, the search objects are not limited to the TV programs, and the various contents acquirable over the network 103 can be regarded also as the search objects. Thus, the found contents varying in type can be acquired.

The main meta information shown in FIG. 3 is a part of the meta information provided as the ECG information, specifically the meta information to be added to the main content. Here, the main content is the content provided by the information distribution device 104 as the main content, and for example, when the information distribution device 104 includes the broadcast station 105, the main content is the broadcast program, the EPG information, or the schedule information. When a DVD (Digital Versatile Disc) sales system is included instead of the broadcast station 105, the main content is DVD software, or the like.

Moreover, when the main content is the EPG information or the schedule information, the main meta information of the present embodiment is specifically referred to as "program meta information". The program meta information (e.g., program title, category, and cast) is a part of the meta information to be delivered by the SI (Service Information) for the current broadcast waves or the EPG service (details partially vary depending on which service) on the Internet.

Further, the sub meta information of FIG. 3 is a part of the meta information provided as the ECG information, that is, the meta information to be added to a sub content. Note here that the sub content is one or more contents interrelated to the main content.

The sub content can be exemplified by a product, a package, electronic data including moving pictures and music, a service, and the like. Herein, the sub content of the present embodiment is not restrictive to such examples.

The program meta information shown in FIG. 3 is a part of the meta information provided as the ECG information, that is, the meta information related to a program. The program meta information can be exemplified by program title, category, cast, or the like, related to a program.

The program meta information is classified as the information to be delivered by the SI for the current broadcast waves or by the EPG service server 108 (details partially vary depending for every EPG service) on the Internet. Although the program meta information has the different data structure from that of the basic EPG information, the contents will be substantially the same even if the program meta information is expressed as the basic EPG information.

The sub meta information is the meta information included in the ECG information. The sub meta information is added to a sub content provided from the content service server 107, which will be described later.

The sub meta information can be exemplified by address information (placement information) of the sub content being an URI (Universal Resource Identifier), title, human name such as author, creator name of the sub content, service offering time period of the sub content, or the like. Herein, the URL is included in the URI system.

Next, by referring to FIGS. 4A and 4B, described are the program meta information and the sub meta information of the present embodiment. FIGS. 4A and 4B are diagrams showing, respectively, the schematic structure of the program meta information and that of the sub meta information of the present embodiment.

As shown in FIGS. 4A and 4B, the program meta information included in the ECG information can be exemplified by the program meta information related to the programs such as "program title", "program category", or "broadcast time", the program meta information related to the cast such as "name/abbreviated name", "cast category", "talent agency", and the program meta information control-relating to control the main meta information such as "meta information version" indicating the version of the program meta information, "update possibility" indicating the update possibility of a plurality of program meta information groups belonging to the meta information reference ID, and "update timing" indicating the timing for updating the main meta information group.

The "broadcast time" indicates the time for program broadcast (broadcast start time, broadcast end time). The "category" related to the programs indicates the category of the program to be on the air, and can be exemplified by drama, music, or entertainment. The "name/abbreviated name" indicates the name or abbreviated name of the cast appearing in the program, and can exemplarily show such program meta information as "Takuya Kimuro", "Kimuta", or others.

The "category" related to the cast indicates the category of the cast appearing in the program to be on the air, and can exemplarily show such program meta information as "play actor", "vocalist", "entertainer", "comedian", "painter", or the like. Herein, the program meta information of the present embodiment is described by exemplifying a case where it is related to the programs or the cast, but such an example is not restrictive.

Further, as shown in FIGS. 4A and 4B, the sub meta information included in the ECG information can be exemplified by the sub meta information related to songs such as "song title", "artist's name", "recording company name", "URL of music purchase site", or the like, the sub meta information related to shops such as "shop name", "address", or the like, the sub meta information related to the products such as "product name", "URL of product purchase site", or the like, the sub meta information related to solicitation such as "URL of site for user access solicitation", the program meta information control-relating to control the sub meta information such as "meta information version" indicating the version of the sub meta information, the "update possibility" indicating the update possibility of a plurality of sub meta information groups belonging to the meta information reference ID, the "update timing" indicating the timing for the sub meta information groups to be updated, and the like.

Note here that the sub meta information of the present embodiment is described by exemplifying a case where it is related to songs, shops, prizes, or solicitation, but such examples are not restrictive.

Figure 5:
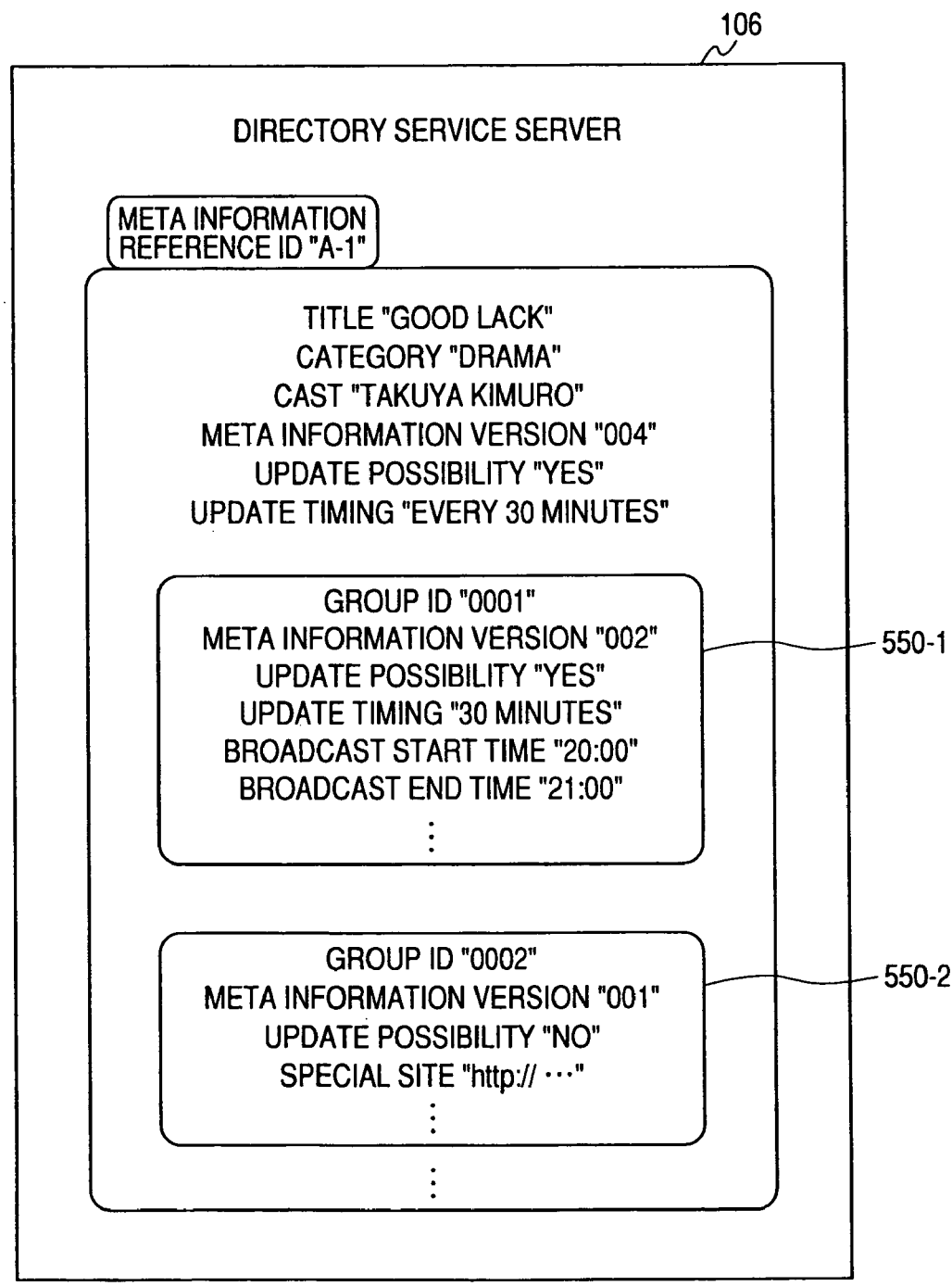
FIG. 5 is a diagram showing the schematic structure of data as a result of grouping the meta information of the embodiment.

Next, by referring to FIG. 5, described is meta information grouping of the present embodiment. FIG. 5 is a diagram schematically showing the data structure of meta information of the present embodiment as a result of grouping.

As shown in FIG. 5, a meta information storage section 304 of the directory service server 106 is storing a plurality pieces of meta information such as the program meta information, the sub meta information, or the like. As shown in FIG. 5, out of a plurality pieces of meta information interrelated to a meta information reference ID of "A-1", one or more pieces of meta information can be collectively managed as a group.

Accordingly, to access any grouped meta information out of the meta information stored in the directory service server 106, designating both a meta information reference ID and a group ID allows to make an access to the target grouped meta information all at once. Herein, the group ID is assigned to every meta information reference ID, and thus alternatively, it is possible to make a search for any grouped meta information (group meta information) having the same group ID on a program basis by designating only a group ID for searching.

The attribute of group meta information 550-1 of FIG. 5 includes a group ID "0001" for group identification in the meta information reference ID, a meta information version indicating the version of the group meta information 550-1, an update possibility indicating whether the group meta information 550-1 is updatable, an update timing indicating the timing for updating the group meta information 550-1, the broadcast start time indicating the time when the program is to be started, the broadcast end time indicating the time when the program is to be ended, and the like.

As shown in FIG. 5, grouping can be performed with any arbitrary combination. Specifically, out of a plurality pieces of meta information, grouping together any meta information having stronger interrelation thereamong will allow for meta information acquisition in an efficient manner. The resulting group is provided with the meta information corresponding to the group ID for group identification, and thereby, the uniqueness can be retained under the same meta information reference ID.

Here, the meta information related to the update possibility can indicate the possibility of updating the whole of the meta information group, the grouped meta information, and the not-yet-grouped meta information, or others. Thus, for example, when the update possibility is "NO" for the whole of the meta information group belonging to the meta information reference ID, and when the update possibility is "YES" for the grouped meta information, only the meta information defined as updatable is accessed, for example.

Similarly, the meta information related to the update timing can be so set as to synchronize with the timing for updating the whole of the meta information group, the grouped meta information, the not-yet-grouped meta information, or others. Here, only when the update possibility set to the updatable meta information is "YES", the timing may be set for updating to the meta information of the update timing.

Figure 6:
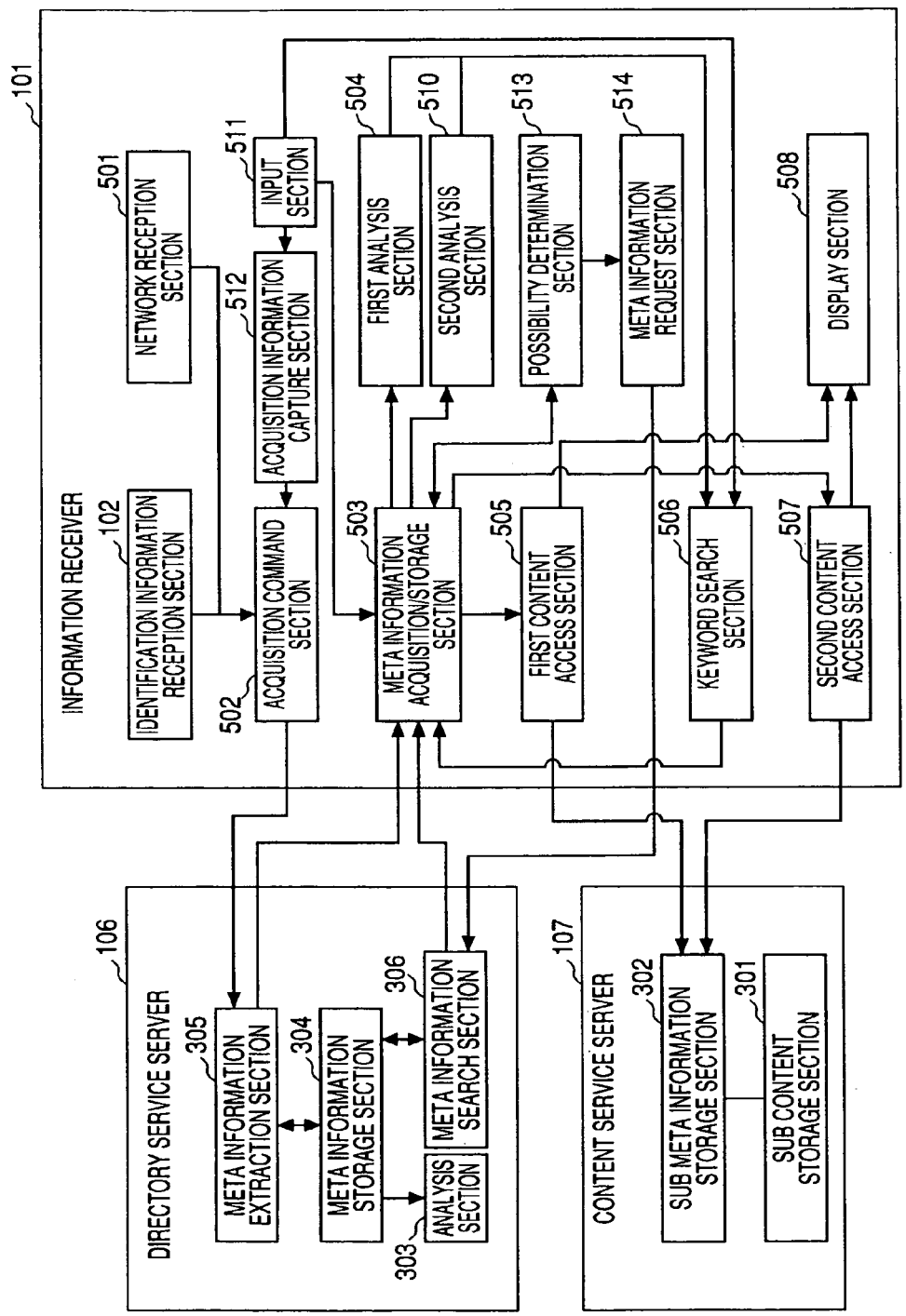
FIG. 6 is a block diagram showing the schematic structures of an information reception device, a directory service server, and a content service server of the embodiment.

Next, by referring to FIG. 6, described are the information reception devices 101, the directory service server 106, and the content service server 107 of the present embodiment. FIG. 6 is a block diagram showing the schematic structures of the information reception device 101, the directory service server 106, and the content service server 107 of the present embodiment.

The content service server 107 of the present embodiment stores various sub contents to be offered to viewers by content providers such as broadcast stations. Herein, as circumstances demand, the entity of the sub content (sub content) includes information indicating where those various sub contents are located, or how to acquire those, for example.

As shown in FIG. 6, the content service server 107 at least includes a sub content storage section 301, a sub meta information storage section 302, a control section (not shown.) for exercising control over processes to be executed by the respective components, a transmission section (not shown.) for data transmission over the network 103, and a reception section (not shown.) for data reception over the network 103.

The sub content storage section 301 stores sub contents provided by the broadcast station 105. The sub contents can be exemplified by video contents, packages, publications, events, program information, message boards for communications with an indefinite number of users, chat services, or the like, all of which can be transmitted and received over the network 103.

The sub content storage section 301 also stores, as sub contents, Web site information for sub content sales, for example. The sub content storage section 301 stores the Web site information specifically related to programs.

Moreover, other than locating in the sub content storage section 301 in the content service server 107 placed in the broadcast station, the sub contents of the present embodiment may be scattered in other sub content storage sections 301 provided in other content service servers 107 on the network 103.

The sub content can be provided with sub meta information provided as ECG information. The sub meta information storage section 302 stores such sub meta information.

Due to the fact that the sub content can be provided with the sub meta information as such, the information reception devices 101 can perform a sub content search using the sub meta information as a key (key).

Note here that, as a possible application, when the information access system 100 of the present embodiment includes plural broadcast station 105, those broadcast stations 105 may share a single content service server 107.

Next, the directory service server 106 of the present embodiment is operated as a server specifically only for the directory service, for example. As shown in FIG. 6, the directory service server 106 includes an analysis section 303 for analyzing access information through acquisition thereof, a meta information storage section 304, a meta information extraction section 305, a meta information search section 306, a control section (not shown.) for exercising control over processes to be executed by the respective components, a transmission section (not shown.) for data transmission over the network 103, and a reception section (not shown.) for data reception over the network 103.

The meta information storage section 304 stores a sub meta information group that is a collection of a plurality pieces of sub meta information about various attributes of sub contents varying in type provided by the content service server 107 as the ECG information, i.e., address, title, category, relating human name (e.g., cast, author), price, service offering time period, or the like, and a main meta information group (program meta information group).

Moreover, the meta information storage section 304 stores the program meta information related to regular programs and the sub meta information group with an interrelation established therebetween. Herein, the program meta information may be structured as the program meta information group including a plurality pieces of program meta information.

The meta information storage section 304 can be applicable to a case where the program meta information, the sub meta information, or the meta information reference ID is stored on the basis of the broadcast station 105 for management.

The meta information extraction section 305 searches the meta information storage section 304 for the meta information in its storage based on the acquisition command information coming from the information reception device 101. The meta information being a search object is the whole of the meta information group including the program meta information or the sub meta information.

After completing the search of meta information group instructed by the information reception device 101, the meta information extraction section 305 partially extracts only any corresponding program meta information or sub meta information from the meta information group, and forwards thus extracted program meta information or sub meta information to the information reception device 101 from which the acquisition command information came.

Based on the meta information request information coming from the information reception device 101, the meta information search section 306 makes a search for any updatable meta information. Herein, the meta information includes the program meta information or the sub meta information.

After completing the search of meta information based on the meta information request information, the meta information search section 306 acquires version information that is an attribute value of meta information version included in the meta information, and forwards thus acquired version information to the information reception device 101. In an alternative manner, without forwarding the version information to the information reception device 101, the meta information search section 306 may compare, for determination, the version information of the meta information version included in the meta information request information and the version information of the acquired meta information version.

The sub meta information is edited on the side of the broadcast station 105 on a program basis, and the result is structured as a sub meta information group including one or more pieces of sub meta information. Moreover, a meta information reference ID is assigned thereto for reference to the sub meta information group.

The information reception device 101 makes an access to the directory service server 106 based on the meta information reference ID so as to acquire meta information such as sub meta information. Here, the directory search service 106 can acquire access information that is generated every time the information reception device 101 makes an access, and store the resulting access information for every information reception device 101.

Furthermore, due to the fact that the analysis section 303 can analyze thus stored access information, the broadcast station 105 can generate sub meta information or others that is considered appropriate for users (viewers) based on the analysis result. Here, the broadcast station 105 also can receive the access information from the directory server 106 over the network 103.

Note here that, as a possible application, when the information access system 100 of the present embodiment includes the plural broadcast station 105, these broadcast stations 105 may share a single directory service server 106 thereamong.

Figure 7:
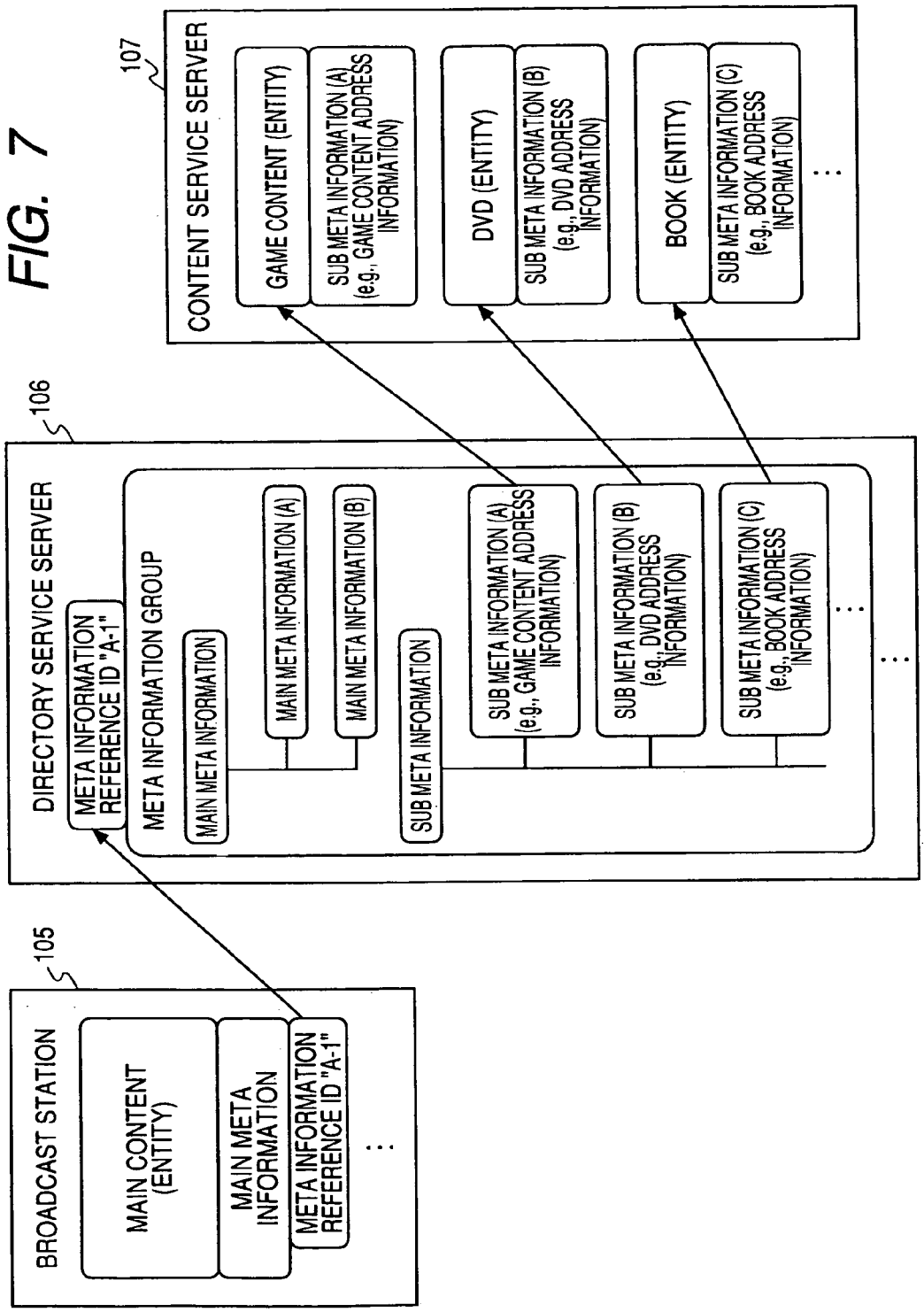
FIG. 7 is a diagram showing the schematic structure of main meta information and sub meta information of the embodiment.

Here, as shown in FIG. 7, described are the main meta information and the sub meta information stored in the broadcast station 105, the directory service server 106, or the content service server 107. FIG. 7 is a diagram showing the schematic structure of the main meta information and the sub meta information of the present embodiment.

As shown in FIG. 7, the broadcast station 105 stores main meta information and a main content on the basis of a meta information reference ID, and the directory service server 106 stores the main meta information (e.g., program meta information) or the sub meta information interrelated to the meta information reference ID.

The content service server 107 stores a plurality of sub contents each interrelated to the sub meta information. Note here that the information distribution device 104 of the present embodiment is described by exemplifying a case of including the broadcast station 105, but such an example is not restrictive.

In the sub meta information stored in the directory service server 106 of FIG. 7, the program meta information and the sub meta information collected from the content service server 107 are interrelated to each other through the meta information reference ID.

As described in the foregoing, when there is group meta information as a result of grouping at least either the main meta information or the sub meta information stored in the directory service server 106, a group ID that is an attribute of the group meta information is used to interrelate groups composed of the main meta information or the sub meta information.

Here, the group ID of the present embodiment is described by exemplifying a case where it is the attribute of the group meta information. Such an example is not surely restrictive, and for example, when the group ID is the attribute of the meta information, an index (tag) indicating the group ID of the group meta information will do.

Further, the sub meta information stored in the content service server 107 is structured by, as exemplarily shown in FIG. 7, one or more pieces of sub meta information including sub meta information (A), sub meta information (B), and sub meta information (C). Each of the contents is provided with the sub meta information.

The information reception device 101 makes an access to the directory service server 106 based on the meta information reference ID interrelated to the program, and asks for the sub meta information or others interrelated to the meta information reference ID.

In response to the access made as such, the information reception device 101 acquires the meta information group interrelated to the meta information reference ID "A-1". Here, this is also applicable to a case where the information reception device 101 partially acquires any needed meta information out of the meta information group interrelated to the meta information reference ID. Such a partial acquisition of the meta information will be described later.

The sub meta information acquired from the directory service server 106 includes address information or others about the sub contents stored in the content service server 107. Thus, this allows the information reception device 101 to make an access to the content service server 107 in accordance with the address information.

The sub meta information stored in the content service server 107 is used as a key for searching an indefinite number of sub contents.

Here, as shown in FIG. 7, described is a case where the directory service server 106 and the content service server 107 of the present embodiment respectively store the sub meta information. Such an example is not restrictive, and as a possible application, the directory server 106 may store meta information groups each composed of main meta information or sub meta information, and the content service server 107 may store only sub contents.

Next, by referring to FIG. 8, described is the data structure of the meta information group of the present embodiment. FIG. 8 is a diagram showing the data structure of the meta information group of the present embodiment.

As shown in FIG. 8, the data structure of the meta information group including a plurality pieces of main meta information or sub meta information is in the XML format. The meta information is structured by tags including elements or attributes each indicating the program meta information, the basic EPG information, the group ID, the meta information reference ID, and the like.

Out of such attributes, the tag including the meta information reference ID is "<entire meta information meta information reference ID="A-1"> shown in FIG. 8. The tag including the group ID and indicating the group is a tag indicating the group of "<group group ID="0001" group type="cast"...>".

Herein, the meta information reference ID, the group ID, or others are described by exemplifying as being the attribute of the meta information. Such an example is not restrictive, and as a possible application, the meta information reference ID, the group ID, or others may be a tag or others serving as an index, for example.

As shown in FIG. 8, out of the meta information group related to the same meta information reference ID, a group application is possible even if grouped meta information and not-yet-grouped meta information are included each plurally.

Note here that the data structure of the meta information group of the present embodiment is described by exemplifying a case of having the XML format. Such an example is not restrictive, and as a possible application, the data structure of the meta information group may be in the HTML (Hyper Text Markup Language) format.

Next, described is the information reception device 101 shown in FIG. 6 in the present embodiment. The information reception device 101 can be exemplified by broadcast STBs (Set-Top Boxes), VCRs, various CE devices such as game machines, PCs (Personal Computers), PDAs (Personal Digital Assistants), mobile equipment starting with portable phones, or others.

The information reception device 101 is provided with the identification information reception section 102, a network reception section 501, an acquisition command section 502, a meta information acquisition/storage section 503, a first analysis section 504, a first content access section 505, a keyword search section 506, a second content access section 507, a display section 508, a second analysis section 510, an input section 511, an acquisition information capture section 512, a possibility determination section 513, and a meta information request section 514.

Herein, the meta information acquisition/storage section 503 of the present embodiment corresponds to request means or others, for example, the keyword search section 506 of the present embodiment corresponds to preference search means or others, for example, and the display section 508 of the present embodiment corresponds to display means or others, for example.

The identification information reception section 102 receives, for storage, the basic EPG information and the meta information reference ID from an antenna or others over the broadcast waves. The network reception section 501 receives, for storage, the basic EPG information and the meta information reference ID over the network 103.

Note here that the information reception device 101 of the present embodiment is described by exemplifying a case of performing reception from the broadcast station 105 offering a data broadcasting service. Such an example is not restrictive, and as a possible application, only the meta information reference ID may be received not from the broadcast station 105 but from ISP or others.

The information reception device 101 of the present embodiment is described by exemplifying a case of acquiring the meta information reference ID from the identification information reception section 102. Such an example is not restrictive, and as a possible application, when an offerable service is CD sales, and when a main content is a "CD" such as a music CD, the CD-reproducible information reception device 101 may have a function of acquiring the meta information reference ID from the information distribution device 104 by reading the meta information reference ID stored in an extended storage region of the CD.

Moreover, for example, assuming a case where the offerable service is book publication and the main content is a book in print, and when the front cover of the book or others is directly printed with a meta information reference ID, as a possible application related to the meta information reference ID, the information reception device 101 may acquire the meta information reference ID through the input section 511 such as a keyboard provided to the information reception device 101. Here, the meta information reference ID may be a one-dimensional, two-dimensional, or three-dimensional bar code, for example.

The network reception section 501 receives the address information such as URI of the directory service server 106 or others over the network 103, and stores the URI. Alternatively, the address information such as URI may be provided from the input section 511 provided to the information reception device 101 for storage. Using the URI allows the information reception device 101 to access the directory service server 106.

Here, the information reception device 101 can be connected to the network 103 through dialup connection, ADSL/FTTH, or the like.

The information reception device 101 receives the basic EPG information to be delivered over the broadcast waves or the network 103, and the meta information reference ID added to the respective programs.

The information reception device 101 manages the address information (e.g., URI), on the Internet, of the directory service server 106 corresponding to the respective stations. When any change is made to the URI, the URI is updated so that the latest URI is always at hand. Such URI update is done by update data coming over the broadcast waves or the network 103.

The identification information reception section 102 or the network reception section 501 receives the basic EPG information provided with the meta information reference ID which is provided by the SI using the broadcast waves or over the network 103, and stores the meta information reference ID.

At the time of acquisition of the meta information reference ID, for the purpose of identifying to which broadcast station the program corresponding to the received meta information reference ID belongs, the meta information reference ID is previously interrelated to broadcast station information (not shown.) for storage.

At the time of acquiring the meta information reference ID from the SI, by receiving the broadcast station information, it becomes possible to identify to which broadcast station the program belongs. For example, according to the broadcast standards defined by ARIB (Association of Radio Industries and Businesses), the SI never fails to include a service ID indicating which broadcast station. The broadcast station information including such a service ID and the meta information reference ID are interrelated to each other.

When the EPG service server 108 distributes the broadcast station information over the network 103, the broadcast station information is required to be delivered in a format possible for identification. In the below, by referring to FIG. 9, described is the EPG data to be delivered over the network 103. FIG. 9 is a diagram showing the data structure of the EPG data of the present embodiment.

As shown in FIG. 9, the data structure of the EPG data is in the XML format. The EPG data is structured by a tag indicating as being the basic EPG information, a tag indicating as being the broadcast station information, a tag indicating as being the program meta information, or the like. Herein, the data structure of the EPG data of the present embodiment is described by exemplifying as having the XML format. Such an example is not restrictive, and as a possible application, the data structure of the EPG data may be in the HTML format, for example.

The meta information reference ID coming together with the basic EPG information never fails to be delivered with the broadcast station information representing which broadcast station. Herein, the broadcast station information is the meta information, but such an example is not the only option.

The meta information reference ID shown in FIG. 9 is described by exemplifying a case of being an attribute. Such an example is not restrictive, and as a possible application, the meta information reference ID may be a tag serving as an index indicating as being the meta information reference ID.

As shown in FIG. 9, the "broadcast station ID" represents the broadcast station. Moreover, set to the "broadcast station ID" is "TPS", or "Bushi Television". Here, such an example is not the only option, and the "broadcast station ID" may be assigned with an ID whichever considered appropriate.

The broadcast station information shown in FIG. 9 has the hierarchical structure including the "broadcast station tag (<broadcast station>)", and the "program tag (<program>)". The meta information reference ID assigned to the respective programs is defined as being a child element of the element indicating the broadcast station ("broadcast station ID").

With the data structure shown in FIG. 9, to acquire the meta information reference ID, it becomes possible to determine which broadcast station is in charge by referring to the "broadcast station ID" being a parent element of the hierarchical structure.

Other types of broadcast station information coming over the network 103 include broadcast station information telling an ID naming rule of the meta information reference ID. As the meta information reference ID, a definition is so made as to never fail to include a text string exemplarily at the ID head for identification of the broadcast station.

By referring to the meta information reference ID set with such a predetermined text string, the information reception device 101 can determine which broadcast station 105 is in charge. Here, if this is the case, the advantage of managing the IDs separately by every broadcast station 105 may be lost.

In this view, for the EPG service server 108 to deliver the meta information reference ID (including no text string for identifying the broadcast station 105) individually named by the broadcast station 105, the text string is added to help broadcast station identification.

At the time of data acquisition such as the meta information reference ID, the information reception device 101 is required to additionally go through a process of deleting the text string for identifying the broadcast station 105, and putting back the meta information reference ID to the one designated by the broadcast station 105.

After acquiring the basic EPG information, the information reception device 101 displays an EPG display screen on the display section 508. In response to a viewer's command for displaying sub meta information related to any appropriate program displayed on the EPG display screen, the information reception device 101 acquires the corresponding sub meta information based on the meta information reference ID and the URI information of the directory service server 106 of the corresponding broadcast station 105.

Note here that the directory service server 106 and the content service server 107 of the present embodiment are applicable even if those are operated separately by each of the broadcast stations 105. The information reception device 101 differentiates between the meta information reference ID, the sub meta information, and the like on the basis of the broadcast station 105, and acquires the sub contents.

For example, based on the keyword found in the sub meta information acquired from a broadcast station 105-A, it is possible to make a search for the sub meta information of a broadcast station 105-B to make an access to the sub contents. In such a manner, the viewers can acquire the sub contents without noticing the difference among the broadcast stations 105.

Moreover, the directory service server 106 and the content service server 107 of the present embodiment are applicable even when those are operated separately by each program sponsor, content distributor, or the like. Here, even if those are operated separately by each program sponsor, content distributor, or the like, the broadcast station 105 takes charge of assignment of the meta information reference ID.

When separately operated by each program sponsor or content distributor, for example, a directory service server 106-A stores a meta information reference ID, sub meta information, or others of the sponsor of a program A, and a directory service server 106-B stores a meta information reference ID, sub meta information, or others of the sponsor of a program B.

Referring to FIG. 6, the input section 511 provided to the information reception device 101 of the present embodiment is composed of a pointing device such as a mouse, a track ball, a track pad, a stylus pen, or a joy stick, a keyboard, or others, those of which are all capable of receiving users' operation commands. Such examples are not restrictive.

From the main meta information interrelated to the main content, the input section 511 can select only the sub meta information that is an acquisition target. Thus, this allows to acquire any desired sub meta information from the main meta information displayed on the display section 508, and acquire a sub content(s) interrelated to the sub meta information. Herein, the sub meta information is not restrictive, and the input section 511 can also select the main meta information.

The acquisition information capture section 512 acquires acquisition target information telling a target for acquiring the main meta information or the sub meta information coming from the input section 511. The acquisition information target information is generated by the input section 511 based on the user's operation command.

Based on the received meta information reference ID and/or acquisition target information, the acquisition command section 502 generates acquisition command information to acquire the meta information corresponding to the main meta information or the sub meta information stored in the directory service server 106.

The acquisition command section 502 forwards thus generated acquisition command information to the directory service server 106 over the network 103.

The meta information acquisition/storage section 503 asks the directory service server 106 to forward the main meta information or the sub meta information found by the acquisition command section 502 or the keyword search section 506, and receives the sub meta information over the network 103 for storage.

To acquire the sub meta information, the sub contents, or the like, the information reception device 101 is provided with a first analysis section 504 for storing or analyzing viewers' preference information based on the access information or others derived by accessing the directory service server 106.

Through keyword search, thus found sub contents or sub meta information attached to the sub contents are stored in the meta information acquisition/storage section 503. A second analysis section 510 analyzes thus found sub meta information or the entities of the sub contents so that preference information is generated. Herein, thus generated preference information is stored/managed.

A first content access section 505 makes an access to the sub meta information storage section 302 over the network 103 based on the main meta information or the sub meta information found by the acquisition command section 502, and acquires the sub contents interrelated to the sub meta information.

The keyword search section 506 makes a search for the main meta information or the sub meta information stored in the meta information storage section 304 based on the keyword designated by the viewer through the input section 511 or the preference information. Here, when the main meta information or the sub meta information is found, the meta information acquisition/storage section 503 acquires thus found main meta information or the sub meta information.

Note here that the keyword search section 506 of the present embodiment is described by exemplifying a case as having the different structure from the acquisition command section 502. Such an example is not restrictive, and as a possible application, the acquisition command section 502 may include the keyword search section 506, for example.

A second content access section 507 makes an access to the sub meta information storage section 302 over the network 103 based on the sub meta information found by the keyword search section 506, and acquires the sub contents interrelated to the sub meta information.

The possibility determination section 513 makes a determination about the update possibility of the meta information group including either the main meta information or the sub meta information, or both of those stored and managed by the meta information acquisition/storage section 503.

When the meta information group stored and managed by the meta information acquisition/storage section 503 includes any grouped meta information (group meta information), the possibility determination section 513 makes a determination also to the group meta information whether it will be updated or not.

When the possibility determination section 513 provides the determination result of "YES" for the update possibility, the meta information request section 514 generates meta information request information to acquire from the directory service server 106 the updated meta information group or group meta information.

The meta information request information includes meta information version as the attribute indicating the update frequency of the meta information group or the group meta information. Thus generated meta information request information is forwarded to the directory service server 106 over the network 103.

Herein, the meta information version of the present embodiment is described by exemplifying as being an attribute. Such an example is not restrictive, and as a possible application, the meta information version may be a tag serving as an index indicating that it is the meta information version.

Accordingly, through transmission of the meta information request information to the directory service server 106, and through detection of the updated meta information group or group meta information, the information reception device 101 can derive the new meta information through updating.

Here, described above is a case of generating the meta information request information of the present embodiment under the requirements that the meta information previously includes at least the update determination information with some update possibility. Such an example is not the only option, and as a possible application, the meta information request information may be generated in response to a user's command coming to the meta information request section 514 via the input section 511, for example.

Next, by referring to FIG. 10, described is the operation of the information access system 100 structured as above in the present embodiment. FIG. 10 is a flowchart showing the schematic operation of the information access system of the present embodiment.

Scheduling Process

First, as shown in FIG. 10, with the information access system 100 of the present embodiment, a program scheduling process (S801) is executed by the program schedule section 201. After the broadcast station 105 determines a program schedule, generated are the main meta information (program meta information) and the sub meta information, both of which are related to the programs. Here, assignment of a meta information reference ID is carried out in advance for program identification.

Next, the program meta information addition section 203 and the sub meta information addition section 202 add, respectively, the program meta information and the sub meta information to the schedule information generated as a result of the scheduling process.

Out of the program-relating sub contents, a selection is made for any sub content to be displayed to the viewer, and the resulting sub content is interrelated to the meta information reference ID. Moreover, by adding the meta information reference ID corresponding to the program to the program schedule, an interrelation is established between the program meta information or the sub meta information.

The meta information reference ID is linked to the program meta information and the sub meta information. Thus, as shown in FIG. 8 example or others, the program meta information and the sub meta information linked to the meta information reference ID will have a unified data structure as the meta information group belonging to the meta information reference ID.

Through acquisition of the meta information reference ID, out of the meta information group linked to the meta information reference ID, only any needed program meta information or sub meta information can be extracted, and partially acquired.

Figure 11:
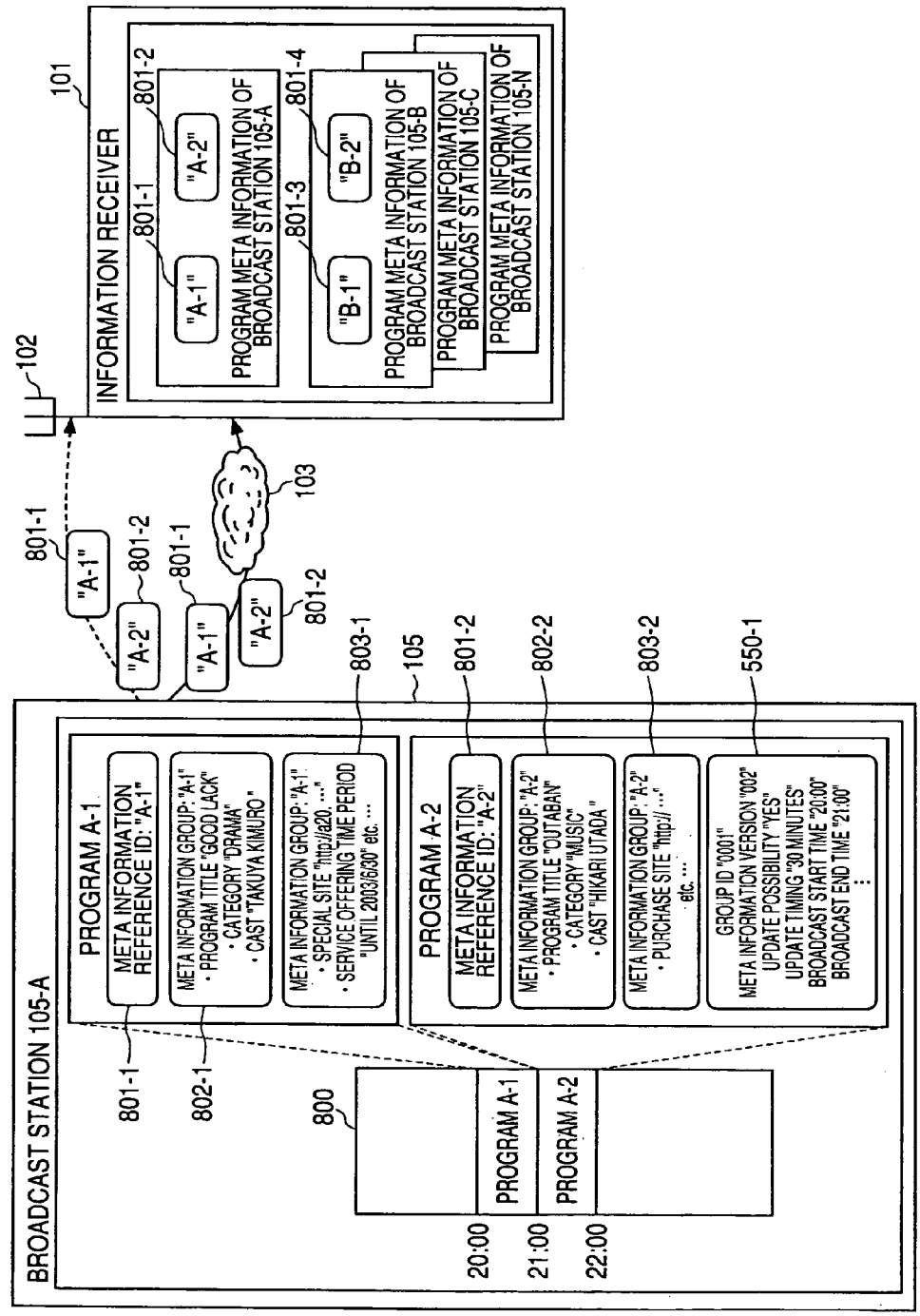
FIG. 11 is a diagram showing the schematic operation at the time when an information distribution device of the embodiment transmits a meta information reference ID to the information reception device.

As shown in FIG. 11, schedule information 800 is provided with a meta information reference ID 801, program meta information 802 linked to the meta information reference ID 801, and sub meta information 803. FIG. 11 is a diagram showing the schematic operation of forwarding the meta information reference ID from the information distribution device of the present embodiment to the information reception device.

Moreover, as shown in FIG. 11, as to the schedule information 800 of the broadcast station 105-A, if a "program A-1" to be on the air from "20:00" is provided with sub meta information or program meta information, the meta information reference ID to be added thereto is "A-1".

Through the interrelation established among one or more pieces of program meta information and one or more pieces of sub meta information via "A-1" of a meta information reference ID 801-1, formed is the meta information group including program meta information 802-1 and sub meta information 803-1, both of which are belonging to the "program A-1".

The program meta information 802-1 shown in FIG. 11 includes the program meta information indicating the program title of "Good Lack", the program meta information indicating the program category of "drama", and the program meta information indicating the program cast of "Takuya Kimuro". Herein, such program meta information 802 is included in the basic EPG information being EPG data.

Here, described above is a case where the program meta information of the present embodiment includes the program meta information including tags of program title, category, cast, or the like. Such an example is not restrictive, and as a possible application, the program title, category, or cast may be an attribute of the program meta information.

Moreover, the sub meta information 803-1 shown in FIG. 11 includes sub meta information indicating "Special Site URL", and sub meta information indicating "Service Offering Time Period". Here, described above is a case where the sub meta information of the present embodiment includes the sub meta information including a tag of service site URL, service offering time period, or the like. Such an example is not restrictive, and as a possible application, the special site URL, the service offering time period, or the like may be an attribute of the sub meta information.

The "Special Purchase Site URL" is URL information indicating a Web screen for viewers to make an access thereto if intrigued by the "program A-1". Here, as a possible application, the sub meta information indicating "song CD" may be additionally provided other than those indicating "special site URL" or "Service Offering Time Period".

In the meta information group linked to a meta information reference ID 801-2 having a meta information reference ID of "A-2", included are program meta information 802-2, sub meta information 803-2, and group meta information 550.

Through the interrelation established between the meta information reference ID and such a meta information group, an access can be made to the sub meta information or the program meta information. Here, the directory service server 106 stores, collectively, the meta information reference ID 801, the program meta information 802, and the sub meta information 803.

The content service server 107 stores the sub meta information 803, and the entity of the sub content interrelated to the sub meta information 803.

Transmission Process

Once the scheduling process (S801) is through, the identification information transmission section 207 then forwards the basic EPG information, and the meta information reference ID interrelated to the basic EPG information over the broadcast waves (S802). Here, the identification information transmission section 207 may be applicable to a case of forwarding the basic EPG information and the meta information reference ID over the network 103.

Moreover, the meta information reference ID may not be restrictively delivered simultaneously when a broadcast program is put on the air, and the identification information transmission section 207 may deliver the meta information reference ID in advance by adding or providing the meta information reference ID to the basic EPG information provided by various EPG information delivery services.

Here, described above is a case where the identification information transmission section 207 of the present embodiment sends out the meta information reference ID together with the basic EPG information. Such an example is not restrictive, and as a possible application, the identification information transmission section 207 may send out only the meta information reference ID depending on what main content.

As shown in FIG. 11, the broadcast station 105-A sends out, together with the basic EPG information including the program meta information, the meta information reference ID 801-1 being "A-1", and the meta information reference ID 801-2 being "A-2".

The information reception device 101 stores and retains, on the basis of the broadcast station 105, the meta information reference ID 801-1 and the meta information reference ID 801-2, both of which are provided by the identification information reception section 102 or the network reception section 501.

Here, those various meta information (ECG information) such as the sub meta information indicating "Special Site URL" is not delivered together with the basic EPG information but retained in the directory service server 106.

In more detail, after the meta information reference ID is transmitted to the information reception device 101, in response to a request coming from the information reception device 101 side, the directory service server 106 transmits the sub meta information linked to the meta information reference ID to the information reception device 101.

For delivery over the broadcast waves, for example, the meta information reference ID can be transmitted together with the basic EPG information over the broadcast waves through assignment of the meta information reference ID as a descriptor attribute value from table information in the SI.

Here, the identification information transmission section 207 of the present embodiment is described by exemplifying a case of performing delivery with a meta information reference ID additionally provided. Such an example is not restrictive, and other than the meta information reference ID, any value with which the main content can be uniquely identified may be used as the meta information reference ID. As an example, when the main content is a broadcast program, used as the meta information reference ID may be a value as a result of various combination such as a combination of a service ID and an event ID included in SI information of the broadcast waves.

Next, the information reception device 101 receives the basic EPG information and the meta information reference ID (S803), and acquires various data. In a case where delivery is carried out over the broadcast waves, the information reception device 101 acquires the basic EPG information included in the SI and the meta information reference ID of the respective programs.

At the time when receiving the basic EPG information and the meta information reference ID (S803), the information reception device 101 acquires only the basic EPG information and the meta information reference ID, but not other ECG information such as the sub meta information.

Here, by referring to FIGS. 12A and 12B, described now is an EPG display screen on which display is made based on the basic EPG information acquired by the information reception device 101. FIGS. 12A and 12B are both a diagram showing the structure of the EPG display screen of the present embodiment.

The meta information retained by the information reception device 101 is classified under the meta information included in the basic EPG information to be first acquired, and the meta information that is supposed to be acquired from the directory service server 106.

As shown in FIG. 12A, the EPG display screen displays the basic information related to the broadcast programs such as the program broadcast time or the program title on a broadcast station basis. For example, displayed thereon is the program-relating information such as the program title "Good Lack" to be on the air from "20:00" by the broadcast station 105-A. Herein, FIG. 12A is showing only the program title out of the basic information related to the broadcast programs. This is surely not restrictive, and the cast information or others may be displayed.

The basic information related to the broadcast programs is basically the meta information included in the basic EPG information, and the meta information as a part of the program meta information. When the viewer selects any attribute found therein as a display target, responsively displayed will be the attribute value, category, or the like of the corresponding meta information extracted from the storage region of the meta information acquisition/storage section 503 of the information reception device, whichever program that is requested to be displayed in the screen.

When the viewer selects as a display target the meta information not found in the basic EPG information, the information reception device 101 is required to acquire from the directory service server 106 the meta information covering the program requested for screen display.

For acquisition of the meta information, if the meta information of every program is to be entirely acquired, it means a large number of wasted data is to be received. In this view, only the meta information of the attribute specified for each program may be extracted from the meta information group, and the information reception device 101 may perform partial acquisition from the meta information. As a result of such a partial acquisition, the information reception device 101 acquires only any needed meta information, and then displays on the EPG display screen the value of the attribute selected as the display requirements.

Note here that the EPG display screen of the present embodiment is described by exemplifying a case where the meta information reference ID is not displayed. Such an example is not restrictive, and as a possible application, the EPG display screen may display the meta information reference ID.

As shown in FIG. 12A, the initial screen of the display section 508 is displaying a main content (in this example, EPG information of a broadcast program). To display the sub meta information as detailed information related to the main content, depressing various buttons displayed on the display section 508 will accordingly display the sub meta information. The sub meta information may be displayed in various formats including a case of displaying any limited information such as only the sub content title.

When the sub content title is displayed, another selection is made for a sub content to see its detailed information, and then various buttons (e.g., category, cast) or others are depressed. In this manner, the detailed information is displayed for the sub content.

Further, when the main meta information (program meta information such as program title) is displayed but not information about the sub content, it is possible to display a sub content list. If this is the case, from the displayed sub content list, another sub content selection may be made so that the sub meta information related to the sub content may be displayed.

Accordingly, by successively making an access to any related meta information from the meta information displayed on the initial screen of the display section 508, it becomes possible to acquire the sub meta information related to various main contents, or the sub contents.

Still further, with such a display attribute specified, any program having the same attribute value can be explicitly displayed by changing in display color or flashing on the screen. If this is the case, this eases the viewer to find his or her wanting program through the use of the fact that how many programs show the attribute value of the attribute "cast" as "Takuya Kimuro" among the programs displayed on the EPG display screen of the display section 508, for example.

Herein, other than directly designating the attribute value, the search requirements may be "program currently on the air", or "program interrelated to a specific content", for example.

In the EPG display screen to be displayed on the display section 508, various buttons such as a "category" button, a "cast" button, or a "special site" button are displayed for displaying the program-relating information such as the program meta information or the sub meta information. Through selection of such buttons as the "category" button, the "cast" button, and the "special site" button, the information related to the programs in the display screen of the display section 508 are entirely displayed.

For example, when the input section 511 selects the "category" button, the program meta information including the "category" attribute is searched, and the attribute value of the attribute "category" is displayed on the display section 508. Similarly, in response to the "cast" button, the program meta information including the "cast" attribute is searched, and the attribute value of the "cast" is displayed. In response to the "special site" button, the sub meta information including the attribute of "special site" is searched, and the attribute value of the "special site" is displayed.

Also, separately displaying the program-relating information on the EPG screen is possible. For displaying such program-relating information on a program basis, button pressing is possible with the broadcast programs actively selected. As shown in FIG. 12A, when the program title "Good Lack" is selected by the input section 511, a rectangular thickly lined in black appears so that the state becomes active. Then, when another selection is made by the input section 511 by double click, for example, the meta information group linked to the meta information reference ID is accordingly displayed. Here, described is the case of separately displaying the program-relating information of the present embodiment by double click. Such an example is not restrictive, and the display section 508 may include a "related information" button, for example.

Next, when the viewer selects the "category" button using the input section 511, the meta information acquisition/storage section 503 of the information reception device 101 makes a search for the program meta information including the "category" attribute of the respective programs in its storage. Here, the program meta information is searched based on the meta information reference ID.

Once the search of the program meta information is completed for the programs displayed on the EPG screen, as shown in FIG. 12B, the "category" of the respective programs is displayed on the display section 508.

Moreover, to separately display the program-relating information for the respective programs, when program selection is made by the input section 511 by double click or others, the meta information acquisition/storage section 503 makes a search for its own program meta information and sub meta information based on the meta information reference ID corresponding to the selected program.

Once the sub meta information or the program meta information linked to the meta information reference ID is found, as shown in FIG. 12(B), the related information including the program meta information or the sub meta information for the respective programs is displayed on the display section 508.

Here, if there is no corresponding program meta information or sub meta information in the meta information acquisition/storage section 503, the information reception device 101 asks the directory service server 106 for the program meta information or the sub meta information. In the below, a process of requesting the meta information is described.

The information reception device 101 collectively acquires the meta information groups linked to the meta information reference IDs stored in the directory service server 106 based on the meta information reference ID. Also, out of the meta information groups linked to the meta information reference IDs, the category, the element, or the attribute may be specified so as to partially acquire the meta information that is supposed to be acquired.

Figure 13A:
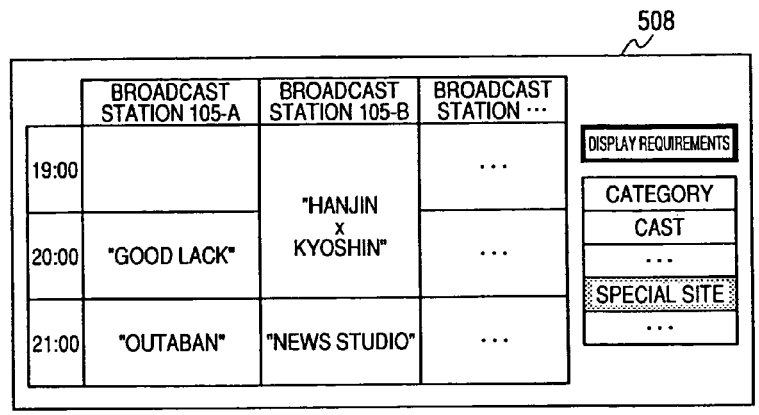
FIGS. 13A to 13C are each a diagram schematically showing a partial acquisition process to be executed for the meta information of the embodiment.
Figure 13B:
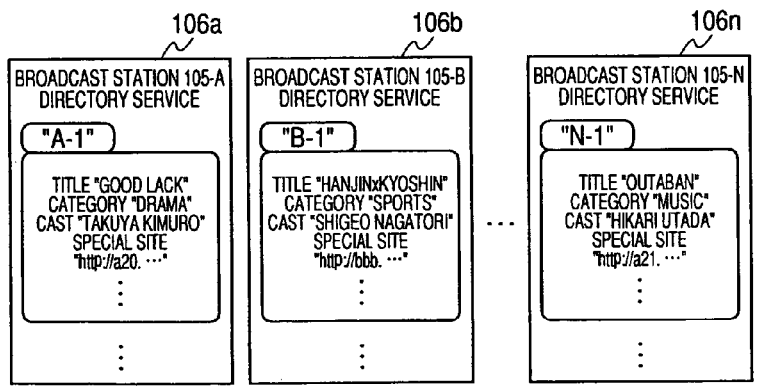
Figure 13C:
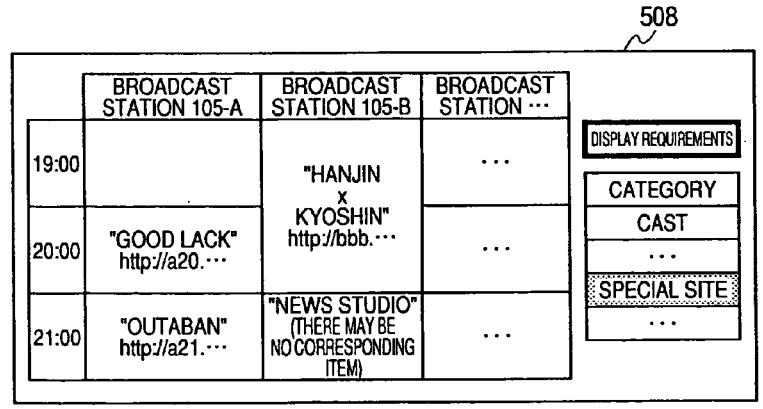

By referring to FIGS. 13A to 13C, and FIG. 14, described now is a process of partially acquiring the meta information of the present embodiment. FIGS. 13A to 13C are each a diagram schematically showing the meta information partial acquisition process of the present embodiment, and FIG. 14 is a diagram showing the structure of an EPG display screen.

As shown in FIGS. 13A to 13C, when the "special site" is selected, the acquisition information capture section 512 receives from the input section 511 the acquisition target information at least including the attribute of "special site". Here, the attribute is not the only option to be included in the acquisition target information, and as a possible application, a tag, an element, or others serving as an index indicating the program meta information, the sub meta information, the group meta information, or others will do. Out of the meta information group, only the meta information including the attribute of "special site" can be partially extracted.

The acquisition command section 502 generates acquisition command information including at least either the meta information reference ID or the acquisition target information. As shown in FIG. 14, thus generated acquisition command information is forwarded to the directory service server 106 by the acquisition command section 502 over the network 103 (S804). Here, the acquisition command information is information indicating only the acquisition target for the meta information.

Moreover, the information reception device 101 determines which broadcast station 105 corresponds to the meta information reference ID, and when the corresponding broadcast station 105 is identified, the information reception device 101 forwards the acquisition command information to the directory service server 106 based on the URI indicating the directory service server 106 of the broadcast station 105.

As an example, by forwarding the acquisition command information as such, the information reception device 101 can forward to the directory service server the command information, telling as wanting only the meta information including "Special Site URL" as an acquisition target from the meta information group interrelated to the meta information reference ID. As shown in FIG. 14, the directory service server 106 then forwards, to the information reception device 101, only the meta information indicating "Special Site URL" interrelated to the meta information reference ID (S805).

Further, the information reception device 101 can partially acquire the group meta information from the meta information group. For example, by specifying a group ID as the acquisition target, the directory service server 106 can extract the group meta information from the meta information group interrelated to the meta information reference ID, and as shown in FIG. 14, forward the meta information corresponding to the information reception device 101 (S805).

Further, as shown in FIG. 13B, the information reception device 101 forwards the acquisition command information to the corresponding directory service servers 106. The directory service server 106 provided by the acquisition command information searches the meta information in its storage for the meta information corresponding to the acquisition command information.

Upon reception of the meta information including the attribute of "special site" from the directory service server 106, as shown in FIG. 13C, the information reception device 101 displays the special site URL of the respective programs on the EPG screen.

Moreover, as shown in FIG. 5, to partially acquire the group meta information, the meta information group interrelated to the meta information reference ID "A-1" includes the group meta information 550-1 having the group ID of "0001". The group meta information 550-1 is the group meta information 550 collectively including information about the broadcast time.

Thus, the group meta information 550 related to the broadcast time at least includes the "broadcast start time", the "broadcast end time", the "update possibility", and the "update timing". Such an example is not restrictive, and the group meta information 550 may include any other information.

The acquisition command section 502 receives from the acquisition information capture section 512 the acquisition target information, the acquisition target of which is the group meta information 550 including the "group ID". Then, the acquisition command section 502 generates the acquisition command information based on the acquisition target information.

Thus generated acquisition command information is transmitted by the acquisition command section 502 to the directory service server 106 over the network 103. The directory service server 106 searches and extracts the group meta information 550 thus specified by the acquisition command information, and forwards the result to the information reception device 101 (S805). After such a transmission (S805), the group meta information 550 is displayed on the display section 508 of the information reception device 101 (S806).

Accordingly, instead of performing transmission for every meta information provided plurally, the directory service server 106 can collectively transmit a plurality pieces of meta information, thereby improving the data transmission efficiency.

Here, the directory service server 106 may search the group meta information 550 having the same group ID not only from the meta information group interrelated to the meta information reference ID but also from the whole of the meta information group stored in the directory service server 106.

Figure 15A:
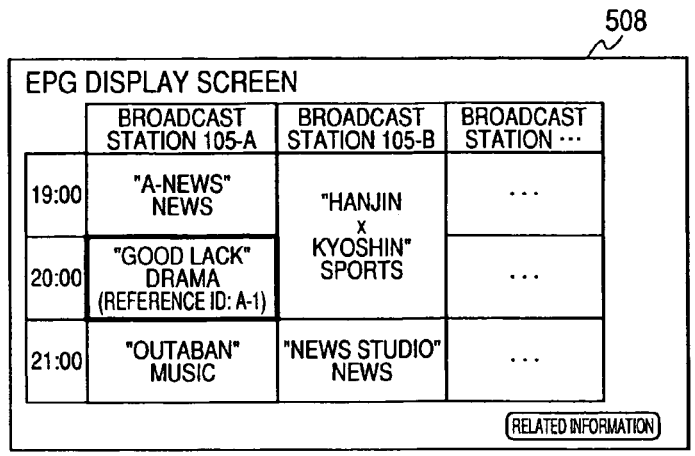
FIGS. 15A to 15C are each a diagram showing the structure of the EPG display screen of the embodiment.
Figure 15B:
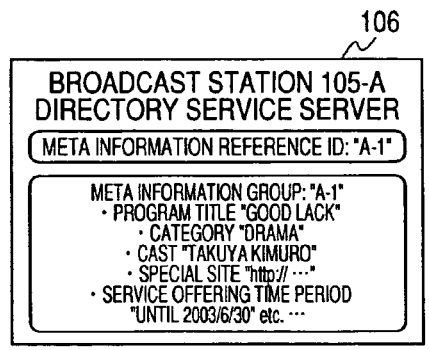
Figure 15C:
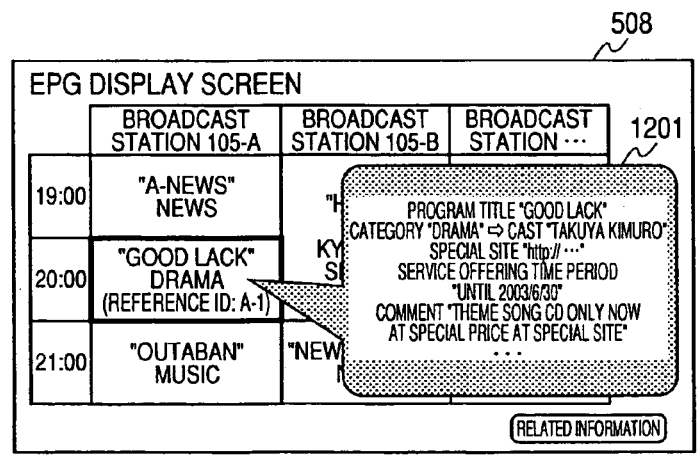

Here, by referring to FIGS. 15A to 15C, described is the EPG display screen on which display is made based on the basic EPG information acquired by the information reception device 101. FIGS. 15A to 15C are each a diagram showing the structure of the EPG display screen of the present embodiment. Here, as another embodiment of partial acquisition of the meta information in the above description, described is entire acquisition of the meta information.

As shown in FIG. 15A, the EPG display screen displays the basic information related to programs such as program title. For example, displayed is the program-relating information such as the program title of "Good Lack" to be on the air from "20:00" by the broadcast station 105-A.

Herein, described above is a case where the EPG display screen of the present embodiment displays the "reference ID: A-1" as the meta information reference ID. Such an example is not restrictive, and as a possible application, the EPG display screen may display no such meta information reference ID, for example.

The EPG display screen displays a "related information" button. Such a "related information" button becomes available for depression with a broadcast program actively selected. Upon reception of the basic EPG information, and the meta information reference ID, as shown in FIG. 15A, in the rectangular thickly lined in black for the program title of "Good Lack", the "reference ID: A-1" indicating that the meta information reference ID "A-1" has been received.

Request Process

When the viewer depresses a button such as the "related information" button with a certain program selected, the information reception device 101 responsively identifies the corresponding broadcast station 105 based on the meta information reference ID corresponding to the selected program.

After identifying the corresponding broadcast station 105, the information reception device 101 makes an access to the directory service server 106 based on the URI indicating the directory service server 106 of the broadcast station 105, and asks for the sub meta information interrelated to the selected meta information reference ID (S804).

As shown in FIG. 15A, if the viewer requests to display information related to the "Good Lack", the "Good Lack" is a program of the "broadcast station 105-A", and the meta information reference ID is "A-1".

Figure 16:
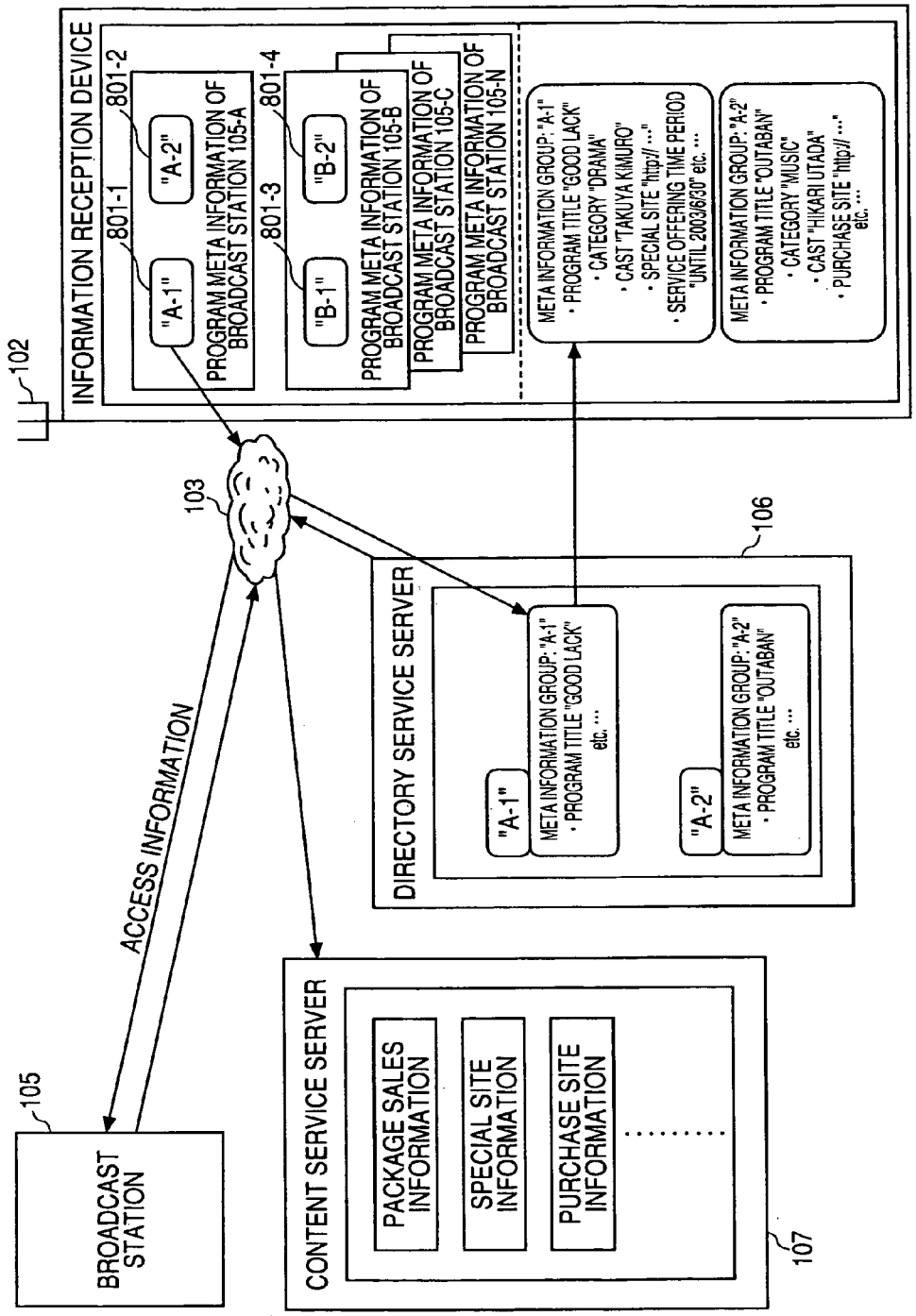
FIG. 16 is a diagram showing the schematic operation of a process to be applied to the information access system of the embodiment.

Thus, as shown in FIG. 16, the information reception device 101 makes an access to the directory service server 106 corresponding to the broadcast station 105-A. After making such an access, the information reception device 101 forwards the acquisition command information to request the sub meta information or others interrelated to the meta information reference ID of "A-1" (S804).

Next, the directory service server 106 acquires the meta information group of the sub meta information or others interrelated to the corresponding meta information reference ID, and then forwards the meta information group to the information reception device 101 over the network 103 (S805).

The information reception device 101 displays, on the EPG display screen, the sub meta information or others provided from the directory service sever 106 (S806). Here, the information reception device 101 is also applicable when only any needed meta information is to be displayed on the EPG display screen, e.g., when the information is limited in advance for display.

As shown in FIG. 15B, the directory service server 106 has such meta information interrelated to "A-1". i.e., the cast "Takuya Kimuro", "Special Site URL" "http:// . . . ", or the purchase site "Service Offering Time Period Until 2003/6/30".

As shown in FIG. 15C, when the meta information group including the main meta information or the sub meta information comes from the directory service server 106, the information reception device 101 acquires the whole of the meta information group for display on a caption section 1201 of the EPG display screen.

As shown in the caption section 1201 of FIG. 15C, via the information reception device 101, the user can acquire only the meta information (ECG information) related to his or her intriguing program. The meta information group displayed on the display section 508 is regarded as the information about which the viewer shows his or her interests, and the directory service server 106 can retain the access information.

Moreover, the analysis section 303 of the directory service server 106 has the function of acquiring or analyzing the access information coming from the information reception device 101, and thus can understand the viewers' interest level for the respective programs.

At the access time of the directory service server 106, the viewer may give a permission to use his or her profile information such as Cookie (Cookie) information stored in the information reception device 101, whereby the directory service server 106 can classify the access information according to the viewer crowd.

The meta information group including the sub meta information or others may be stored in the information reception device 101 in the same format when stored in the directory service server 106. Alternatively, as required, it may be converted into the database format in the information reception device 101 for storage. Still alternatively, the information reception device 101 may convert the meta information group into the database format for storage in the information reception device 101 as required, and collectively manage the meta information group with differentiation among information acquisition sources.

Figure 17:
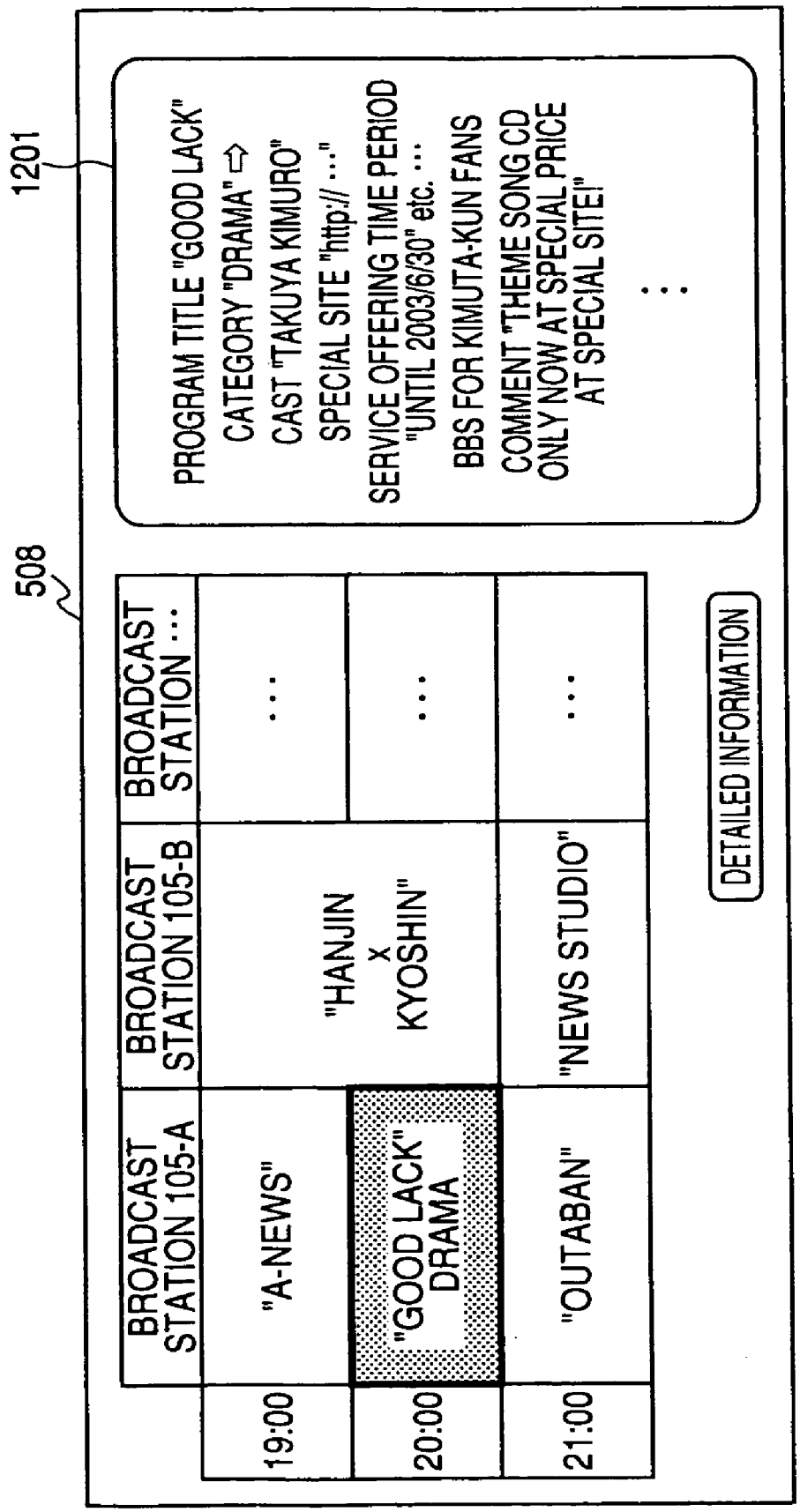
FIG. 17 is a diagram showing the structure of a screen to be displayed on the information reception device to be applied to the information access system of the embodiment.

Here, the caption section 1201 of FIG. 15C is displayed over the EPG display screen, and thus the EPG display screen is hidden therebehind for some broadcast stations. Thus, as shown in FIG. 17, the EPG display screen and the caption section 1201 may be separately displayed in the display section 508 so that the risk of masking the EPG display screen can be avoided. As such, this is the end of a series of operation of the information access system 100 of the present embodiment shown in FIG. 10.

Described next is a process of the information reception device 101 of the present embodiment storing or analyzing the viewers' preference information as another operation of the information access system 100 shown in FIG. 10.

The information reception device 101 collectively manages the meta information group including the sub meta information or others received from the directory service server 106 of the broadcast station 105 inside of a database in the information reception device 101.

At the access time of the directory service server 106, the information reception device 101 adds the meta information such as the acquired sub meta information to the database (not shown.), and separately stores the access frequency or others to the same category in the meta information. Further, the information reception device 101 stores information or others telling that content purchase has been actually made.

The information reception device 101 manages such information as the meta information (not shown.) about the viewers' preference information. Using such meta information about the preference information, the viewers' preference analysis or personality diagnosis is made with respect to the entities of the contents. For content display on the display section, based on the result, any content considered highly intriguing is provided with a higher priority for display (recommended).

Described next is the operation of the information reception device 101 of the present embodiment, making an access to a sub content from the meta information group such as the sub meta information at hand.

Figures 18A, 18B:
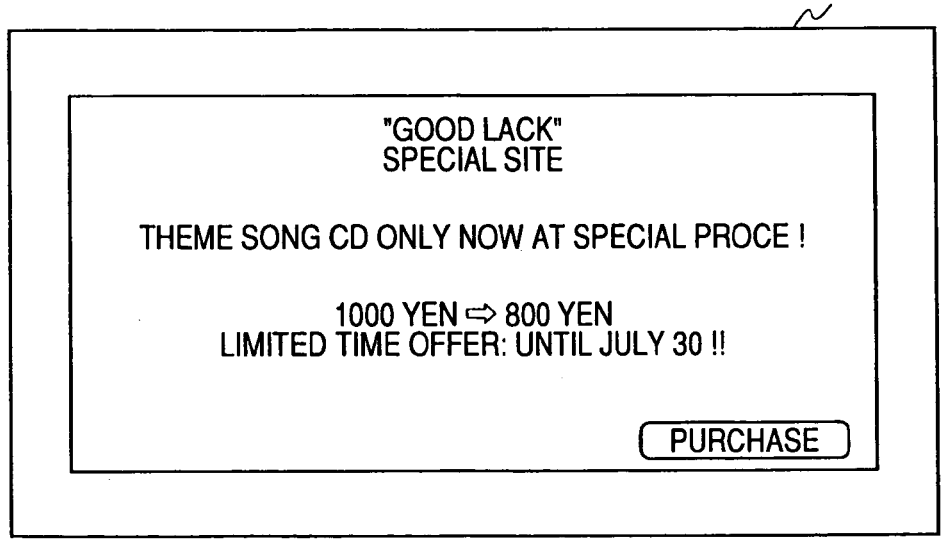
FIGS. 18A and 18B are each a diagram showing the structure of the screen to be displayed on the information reception device to be applied to the information access system of the embodiment.
Figure 19:
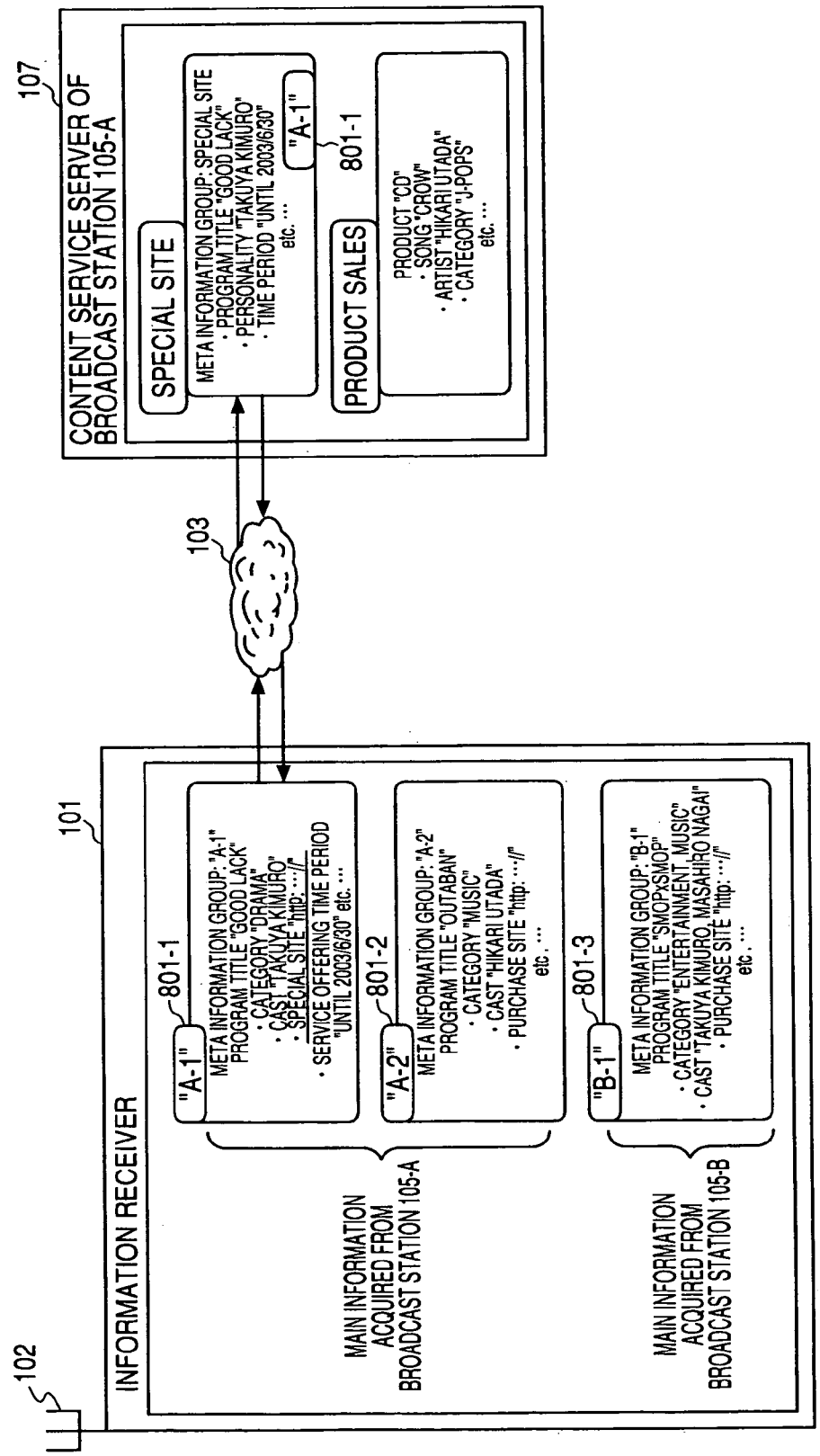
FIG. 19 is a diagram showing the schematic operation of a process to be applied to the information access system of the embodiment.

First, by referring to FIGS. 18A and 18B, and FIG. 19, described is the operation of making an access to a sub content based on a URI found in the sub meta information of the present embodiment.

As shown in FIG. 18A, when the meta information group coming from the directory service server 106 carries in advance the information including a URI, by directly selecting it, the viewer can make an access to any corresponding sub content in the content service server 107.

To access the sub content, as shown in FIG. 18A, program selection is made for "Good Lack" or others displayed on the EPG display screen of the information reception device 101, and the "related information" button is depressed by the input section 511 exemplified by a mouse.

Note here that the EPG display screen of the present embodiment is described by exemplifying a case of displaying "reference ID: A-1" as the meta information reference ID. Such an example is not restrictive, and as a possible application, the EPG display screen may display no such meta information reference ID.

When the line enclosing in rectangular the program title "Good Lack" is thickly lined in black and thus put into the active state by the input section 511, and when the rectangular is double-clicked by the input section 511, the special site including the program title, cast information, or URL is displayed on the caption section 1201. Herein, the "special site" may display mail addresses instead of URLs.

Next, when the viewer selects the "special site" displayed on the caption section 1201, and then selects the "related information" button, the information reception device 101 makes an access to the content service server 107 of the URL specified by the "special site".

When the input section 511 selects the "special site" displayed on the caption section 1201 shown in FIGS. 18A and 18B, the first content access section 505 of the information reception device 505 extracts the URL included in the stored "special site".

As shown in FIG. 19, the first content access section 505 reads the meta information having the attribute of "special site" from the meta information group having the meta information reference ID of ID 801-1 in storage of the meta information acquisition/storage section 503 of the information reception device 101, and then extracts the attribute value of "http:// . . . ".

Next, as shown in FIG. 19, based on the above URL qj(http:// . . . ), the first content access section 505 makes an access to the content service server 107 over the network 103.

As shown in FIG. 19, the content service server 107 forwards special site information composed of a Web screen or others corresponding to the URL to the information reception device 101 over the network 103.

Upon reception of special purchase site information coming from the content service server 107, the information reception device 101 displays the information on the EPG display screen as shown in FIG. 18B.

By the special site information displayed on the display section 508, products exemplarily shown in FIG. 18B as songs can be available for sale. For product purchase, depressing a screen-displayed "purchase" button will do. A billing and settlement process following the "purchase" button depression will be described later.

Due to the fact that the sub meta information including the URL is generated on the broadcast station 105 side, the broadcast station can easily make the information reception device 101 access any predetermined site deliberately. Here, the information reception device 101 accessing such a site is regarded as highly likely to show interests in contents in the site.

By referring to FIGS. 20A to 20C, and FIG. 21, described next is the operation of accessing the sub content based on a keyword included in the sub meta information of the present embodiment.

Using as a keyword the attribute value or index included in the meta information group coming from the directory service server 106, the information reception device 101 can searches the directory service server 106 or the content service server 107 connected to the network 103 for program meta information related to its sub contents or programs to be on the air (or those having been off the air).

The index indicates, out of the meta information, any one of the program meta information, the group meta information, and the sub meta information. For example, the index corresponds to a tag set to the meta information of FIG. 8 example or others. Here, the category is not restrictive to such an example, and as a possible application, it may indicate to what main content the meta information entirely relates.

Figure 20A:
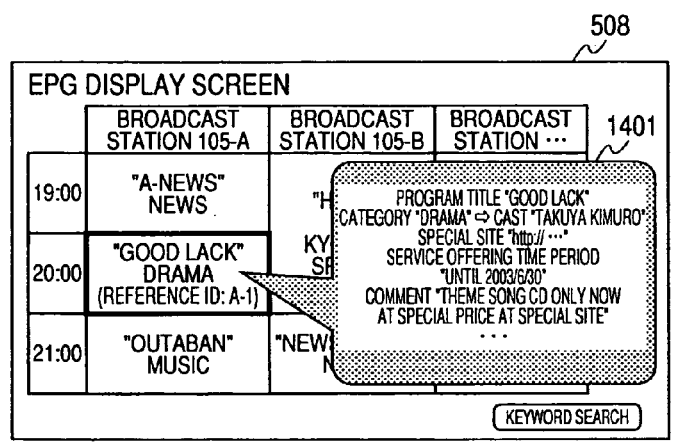
FIGS. 20A to 20C are each a diagram showing the structure of the screen to be displayed on the information reception device to be applied to the information access system of the embodiment.

As shown in FIG. 20A, for example, when "Good Lack" is selected from the EPG display screen, and when the input section 511 double-clicks it, the information reception device 101 displays the meta information related to the meta information reference ID of "Good Lack" onto a caption section 1401.

Herein, the EPG display screen of the present embodiment is described by exemplifying a case of displaying "reference ID: A-1" as the meta information reference ID. Such an example is not restrictive, and as a possible application, the EPG display screen may display no such meta information reference ID.

The caption section 1401 displays "program title", "category", "cast", "special purchase site", or the like. To display sub contents related to "Takuya Kimuro" displayed as the "cast" in the caption section 1401, the displayed "Takuya Kimuro" is selected, and a "keyword search" button is then depressed.

Figure 21:
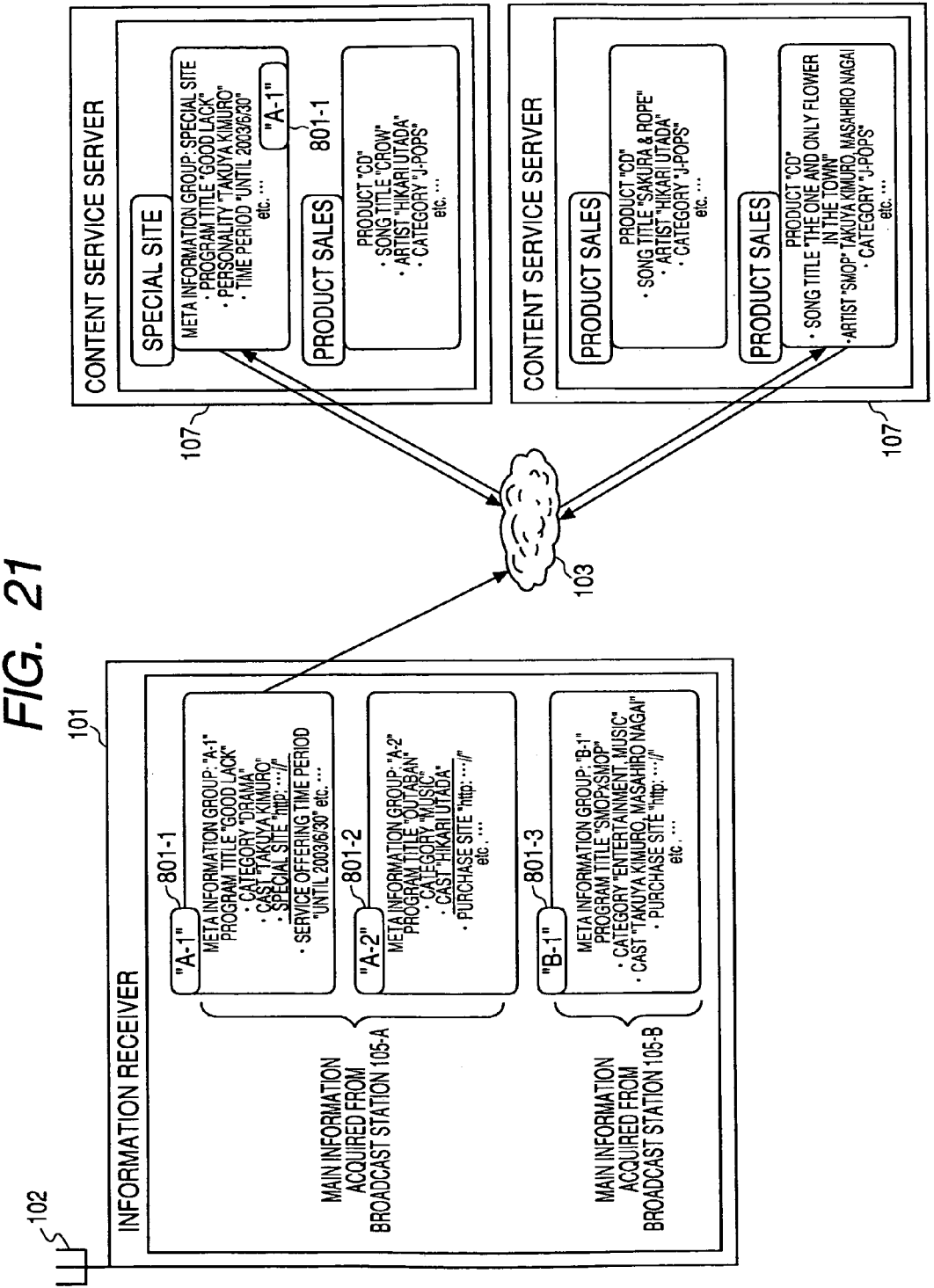
FIG. 21 is a diagram showing the schematic operation of a process to be applied to the information access system of the embodiment.

As shown in FIG. 21, using thus selected "Takuya Kimuro" as a keyword, the information reception device 101 searches, for the meta information group, the directory service server 106 or the content service server 107 for every broadcast station connected to the network 103. Here, when the information reception device 101 is not storing a URI of the directory service server 106 for every broadcast station, a request is made for the directory service server 106 of the broadcast station whose URI is stored for meta information search.

Moreover, in addition to the designated keyword of "Takuya Kimuro", the abbreviated name "Kimuta" having the strong interrelation to the "Takuya Kimuro" is also used as a keyword for search. Here, an interrelation table (not shown.) previously defines that "Kimuta" and "Takuya Kimuro" has the strong interrelation therebetween. When the information reception device 101 carries no such meta information needed for search, a partial acquisition is made from the directory service server 106.

As a result of the search made as such, if there is meta information having the attribute value of "Takuya Kimuro" or "Kimuta", it is explicitly displayed by changing in color for the title or others to be displayed on the EPG display screen of the program meta information interrelated to such meta information.

What is more, thus found program meta information (basic EPG information" can be displayed in a list after sorting. From such a displayed list, detailed information can be further displayed on a program basis.

The information reception device 101 makes an access to the directory service server 106 over the network 103 based on the meta information reference ID 801-1 or others. After such an access, the information reception device 101 makes a request for the directory service server 106 for meta information group search such as sub meta information.

The information reception device 101 makes an access to the content service server 107 over the network 103 based on the URL found in the "special site", for example. After making such an access, the information reception device 101 asks the content service server 107 to search any corresponding meta information. Here, if no such URL can be acquired, the information reception device 101 makes no access to the content service server 107.

After receiving such a search request, the directory service server 106 or the content service server 107 first makes a search for the meta information group including the keyword of "Takuya Kimuro" coming fro the information reception device 101, and then extracts only the meta information including "Takuya Kimuro" for partial acquisition. Here, the keyword of the present embodiment is exemplified by Takuya Kimuro, but this is not restrictive.

Figure 20B:
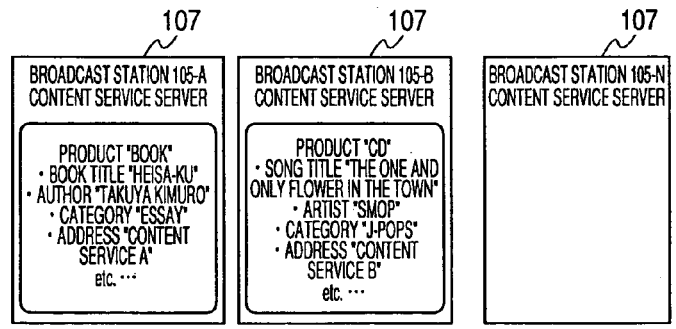

As shown in FIG. 20B, through search of the keyword "Takuya Kimuro", the content service server 107 of the broadcast station 105-A makes a search for the sub meta information group related to the "product" "book". The content service server 107 of the broadcast station 105-B makes a search for the sub meta information group related to the "product" "CD", and extracts the sub meta information including a keyword for partial acquisition.

The meta information of thus found sub meta information or others is forwarded to the information reception device 101 from the content service server 107 or the directory service server 106 over the network 103.

Figure 20C:
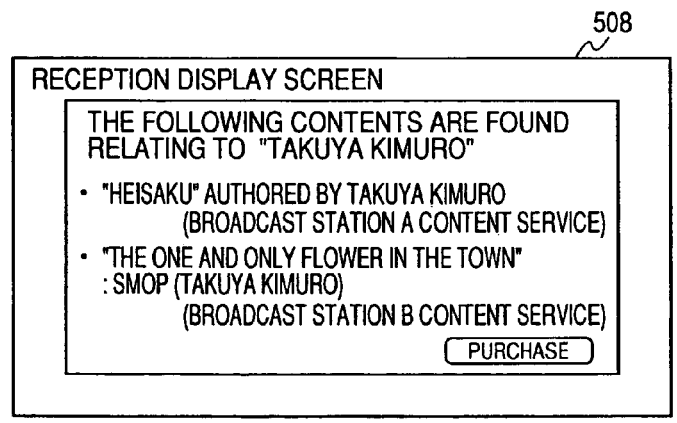

Next, as shown in FIG. 20C, the display section 508 of the information reception device 101 displays the sub meta information as the search result. Here, when no such corresponding sub meta information is found, the display section 508 displays nothing.

As shown in FIG. 20C, through depression of the "purchase button" displayed on the display section 508, any corresponding sub content such as a product can be purchased. Here, described above is a case where the display section 508 is exemplarily displaying only the "purchase" button. Such an example is not restrictive, and as a possible application, the display section 508 may display a "site change" button or others for accessing other Web sites, for example.

Moreover, based on the URL of thus found sub meta information, after an access is made to the sub content, the information reception device 101 can make a further search for the sub meta information added to the content.

Furthermore, after making an access to the sub content based on the URL included in thus found sub meta information, the second analysis section 510 analyzes the content or the sub meta information to generate the preference information again.

Based on thus regenerated preference information, the information reception device 101 then extracts the keyword again to further search the sub meta information added to the content.

Similarly to the above, the search target is a sub content, program meta information, or others, by which the program-relating program meta information or others can be searched from the program-relating sub content in an inverted manner.

The keyword for search use may be singly or plurally provided. By selecting a plurality of keywords, the search target can be narrowed down to a greater degree. Exemplarily when the keywords for search are "Takuya Kimuro" and "drama", the display result includes only sub contents related to "dramas of Takuya Kimuro".

With a keyword input interface specifically for the input section 511 provided to the information reception device 101, not only the keyword derived from the meta information displayed on the display section 508 such as "Takuya Kimuro", but also the user (viewer) can arbitrarily input or enter a keyword.

Accordingly, through keyword input, or selection of the main meta information or others displayed on the display section 508 by the input section 511 to access the sub meta information or others interrelated to the main meta information, it becomes possible to perform a search in various manners, including the search of other programs from any specific program, the search of a sub content interrelated to the specific program, the search of other sub contents from any specific sub content, and the search of other programs from the specific sub content.

By referring to FIGS. 22A to 22C, and FIG. 23, described next is the operation of making an access to a sub content based on the preference information under the management of the information reception device 101 of the present embodiment.

Based on the above-described preference information, the information reception device 101 performs keyword search. The preference information is generated by accumulating the result derived by accessing the directory service server 106 or others, and analyzing the result.

Figure 22A:
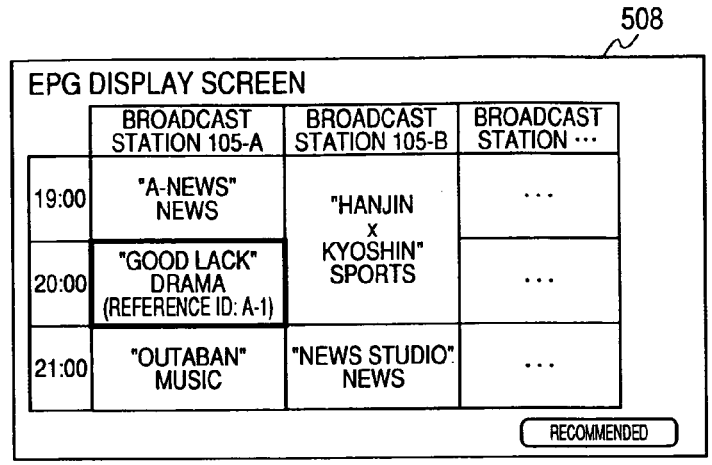
FIGS. 22A to 22C are each a diagram showing the structure of the screen to be displayed on the information reception device to be applied to the information access system of the embodiment.

As shown in FIG. 22A, a "recommendation" button or others is depressed in the EPG display screen. Once the "recommendation" button is depressed, a preference analysis engine section (not shown.) of the information reception device 101 extracts a user's most interested keyword based on the preference information under the management of the first analysis section 504 or the second analysis section 510.

Here, described above is a case where the EPG display screen of the present embodiment displays the "reference ID: A-1" as the meta information reference ID. This is not restrictive, and as a possible application, the EPG display screen may display no such meta information reference ID.

The preference analysis engine section of the present embodiment is applicable in the cases of being provided in the first analysis section 504, in the second analysis section 510, in the information reception device 101, or in a server connected to the network 103.

Figure 23:
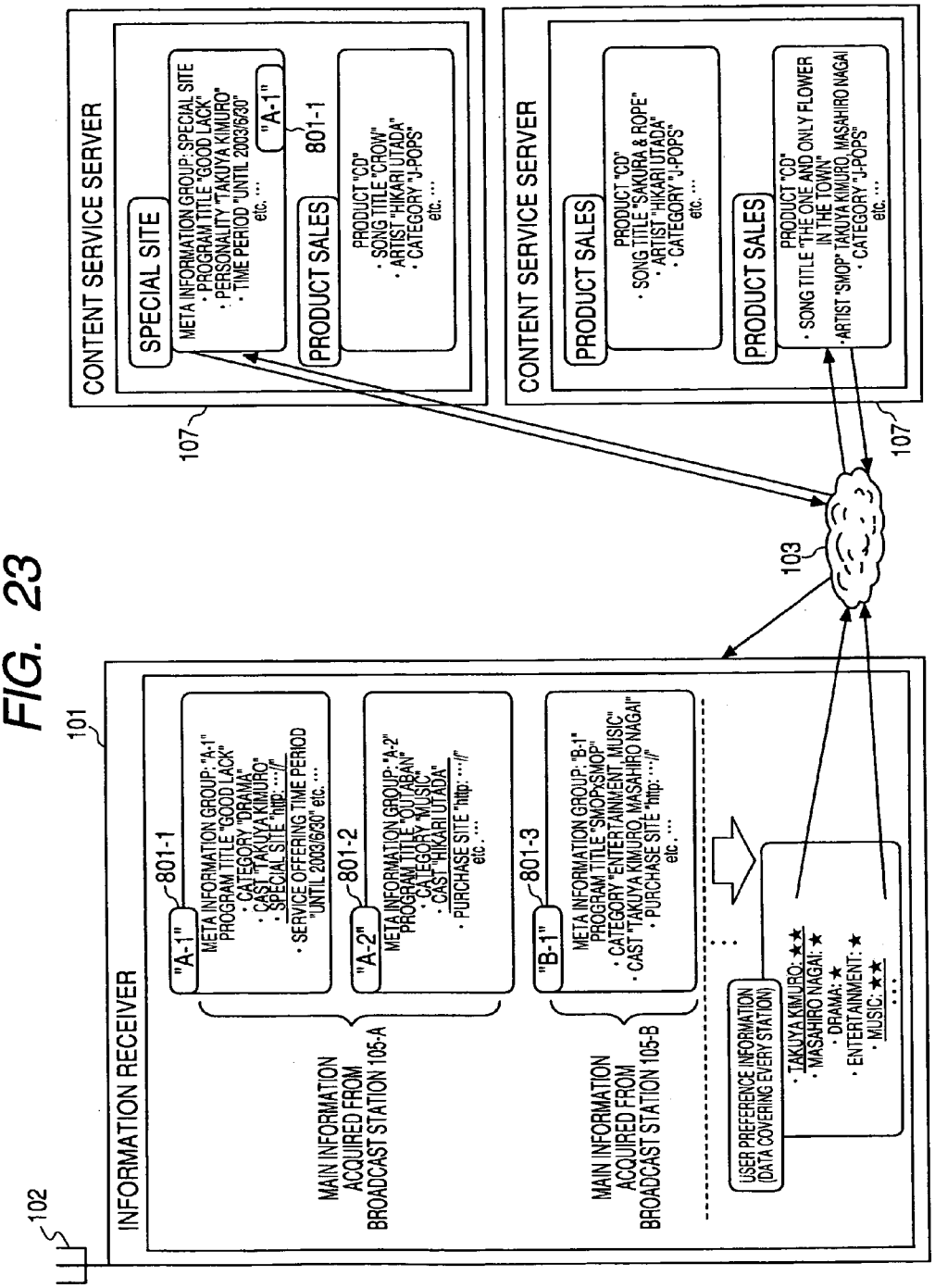
FIG. 23 is a diagram showing the schematic operation of a process to be applied to the information access system of the embodiment.

As shown in FIG. 23, the information reception device 101 generates the preference information based on the access generation to be generated when the meta information is acquired. Thus generated preference information is stored in the first analysis section 504.

Once the "recommendation" button shown in FIG. 22A is depressed, the preference analysis engine of the information reception device 101 extracts a keyword based on the preference information considered possible to attract the user's interests.

After keyword extraction as such, priority assignment is performed to indicate the viewer's interests. As shown in FIG. 23, the number of "*" assigned to "Takuya Kimuro" and "music" is larger, and it is regarded that the interest priority is high. Accordingly, "Takuya Kimuro" and "music" are both keywords for search.

The information reception device 101 makes an access, over the network 103, the directory service server 106 or the content service server 107 of every broadcast station 105. After making such an access, the information reception device 101 makes a search request for the meta information group corresponding to the keywords.

Here, if the information reception device 101 is not storing the URI of the directory service server 106 of every broadcast station 105, the information reception device 101 searches the directory service server 106 storing such URIs.

Figure 22B:
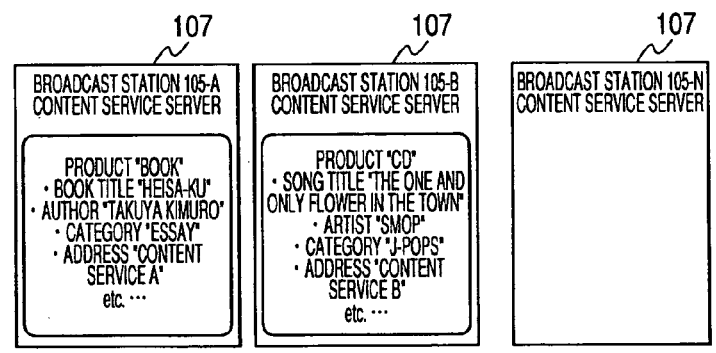

As shown in FIG. 22B, through keyword search of "Takuya Kimuro" and "music", the content service server 107 of the broadcast station 105-A found the sub meta information group related to the "product" "book", and the content service server 107 of the broadcast station 105-B found the sub meta information related to the "product" "CD".

The meta information of thus found sub meta information or others is forwarded to the information reception device 101 from the content service server 107 or the directory service server 106 over the network 103.

Figure 22C:
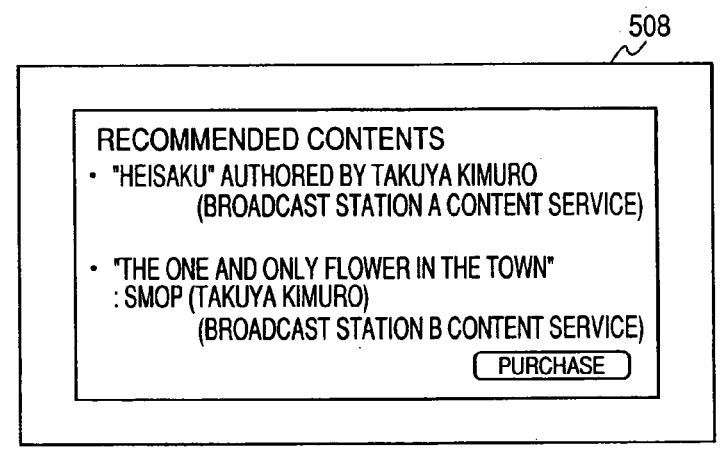

Next, as shown in FIG. 22C, the display section 508 of the information reception device 101 displays the sub meta information as the search result. Here, if no such sub meta information is found, a message telling as such or nothing appears on the display section 508.

As shown in FIG. 22C, through depression of the "purchase" button displayed on the display section 508, the information reception device 101 can go through sub content purchase such as products.

Moreover, with the information access system of the present embodiment, the meta information derived by a user being a viewer accessing the directory service server 106 using the information reception device 101 is highly likely to match his or her preferences.

Accordingly, the information access system of the present embodiment has a function of performing, based on the meta information derived by the information reception device 101 accessing the directory service server 106, preference analysis for every information reception device 101. However, due to a requirements-selection EPG display screen, the acquired meta information is sometimes aimed only to display the meta information related to the basic EPG information covering the entire EPG display screen. If this is the case, the meta information derived exemplarily by partial acquisition is not always matching the viewers' preferences.

In this sense, when such information is used as the original information for preference analysis, not only using the information as it is, weight assignment is performed on the basis of meta information. For example, to display as detailed information on the EPG display screen, a weighing is performed in such a manner that the meta information first selected and acquired is weighed more than others, and based on the meta information, the meta information acquired only for displaying the search result derived by searching any other meta information may be weighed less than others.

Unified Authentication/Settlement

Next, for example, as a result of the viewer's sub content search using a keyword, in a case where the sub contents corresponding to the keyword are found on the content service servers 107, depressing a button to "purchase" the sub contents displayed on the display section 508 of the information reception device 101 will allow to collectively purchase any wanting products from a plurality of content service servers 107.

To realize such a collective purchase, the information access system 100 of the present embodiment includes the account aggregation server 109. The information reception device 101 first makes an access to the account aggregation server 109 so as to enter a unified user ID and a password to the account aggregation server 109.

The unified user ID is an ID as a result of unification over a plurality of content service servers 107 for their sharing use. Accordingly, using a single unified user ID will allow the information reception device 101 to purchase sub contents stored in a plurality of content service servers 107.

Thereafter, the information reception device 101 uses the unified user ID and the password to log in the account aggregation server 109. From the sub content list located in the content service server 107, any wanting sub content is selected.

To be more specific, for selection of any wanting sub content, the information reception device 101 requests the account aggregation server 109 to put any wanting sub content into its own "basket" for registration as a possible purchase choice.

Assuming that the information reception device 101 wants to purchase any wanting sub content from the sub content list located in any other content service server 107, responsively when the information reception device 101 selects the wanting sub content, the account aggregation server 109 registers the sub content as a possible purchase choice.

With respect to the sub content plurally registered in the basket as the possible purchase choices, the user issues a command of "purchase". More specifically, exemplarily, the "purchase" button displayed on the display section 508 is depressed by the input section 511.

Once "purchase" is requested, depending on the sum of the sub contents in the basket, the account aggregation server 109 performs settlement with the billing/settlement function provided to the account aggregation server 109.

Such settlement is performed on the basis of the content service server 107 in charge of sub content management. Once the settlement is completed, the account aggregation server 109 forwards the settlement result (completion notice) to each of the content service servers 107.

In accordance with the settlement result, the corresponding content service servers 107 provide the sub contents to the user. Herein, with some settlement result, the content service servers 107 may not provide the sub contents to the user. For example, considered is a case of settlement failure due to balance shortage.

Moreover, to clear the balance of the sub contents alternatively through with billing and settlement, the account aggregation server 109 forwards, to the content service servers 107, balance data indicating the result of money transfer within any appropriate time period.

Meta Information Update Process

Figure 24:
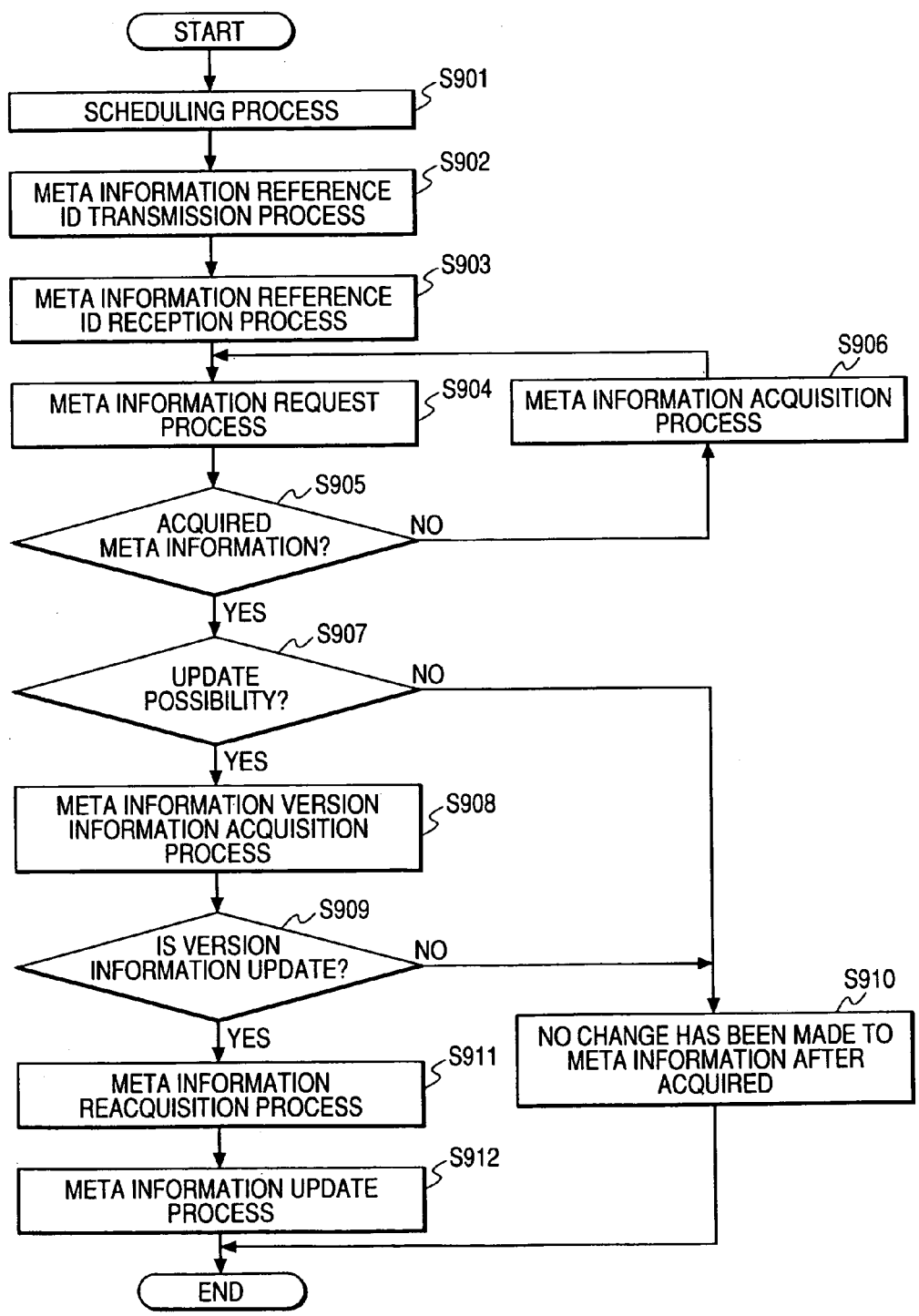
FIG. 24 is a flowchart schematically showing an update process to be executed for the meta information of the embodiment.

By referring to FIG. 24, described next is a meta information update process as the operation of the information access system 100 of the present embodiment. FIG. 24 is a flowchart schematically showing the meta information update process of the present embodiment.

There is a possibility that the details of meta information managed by the directory service server 106 of the respective broadcast stations will be updated as appropriate. Thus, depending on the timing when the information reception device 101 receives the meta information from the directory service server 106, the meta information may vary in details.

The meta information including the timing for updating the meta information group or the meta information may be previously included in the corresponding meta information group so that the information reception device 101 can acquire always the latest meta information by accessing the directory service server 106 at the timing when the meta information group is updated. In the below, described is the update process to be executed for the meta information group or the meta information.

The meta information group under the management of the directory service server 106 includes the meta information including an attribute of the "meta information version" that is representing at least the version of the meta information group per unit interrelated to the meta information reference ID. Here, alternatively, the meta information (version meta information) including a tag indicating the meta information version will do.

Moreover, per unit interrelated to the meta information reference ID, the meta information group under the management of the directory service server 106 has the meta information including the element/attribute such as "update possibility" indicating whether the meta information group may be updated in details, and if there is an update possibility, "update timing" indicating with what frequency/intervals.

The unit interrelated to the meta information reference ID exemplarily includes the whole of the meta information group structured by the main meta information or the sub meta information linked to the meta information reference ID, the group meta information, the individual meta information, or the like.

Thus, the meta information including the attribute of the meta information version, the update possibility, or the update timing can be provided to every meta information group, or to every group meta information. Moreover, the attribute may be included in every meta information.

Here, when the details of the meta information are updated, the meta information version is so changed that the version of the meta information is updated, e.g., the value of the meta information version is incremented by 1.

First of all, as shown in FIG. 24, with the information access system 100 of the present embodiment, the program schedule section 201 goes through a program scheduling process (S901). Here, the program scheduling process (S901) of the present embodiment has almost the same structure as the program scheduling process (S801) shown in FIG. 10, and thus no detailed description is given again.

Thereafter, once the scheduling process (S901) is completed, the identification information transmission section 207 then sends out, over broadcast waves, basic EPG information, and a meta information reference ID interrelated to the basic EPG information (S902). Here, such a meta information reference ID transmission process (S902) of the present embodiment has almost the same structure as the meta information reference ID transmission process (S802) shown in FIG. 10, and thus no detailed description is given again.

Next, the information reception device 101 receives the meta information reference ID coming from the broadcast station 105 (S903). The meta information update process can be exemplified by the cases shown as below.

After the information reception device 101 receives the meta information reference ID, with an EPG display screen being active through selection of a specific program, when a button such as a "detailed information" button displayed on the EPG display screen is depressed.

With the detailed information displayed on the display section 508 by the "detailed information" button depressed in the EPG display screen, when a button such as an "information change" button is depressed.

For recording-programming a broadcast program, to the information processor 101, there needs to set to the meta information the recording programming time including the broadcast start time and the broadcast end time, for example. Such recording programming time may be changed for some reasons, and if this is the case, the once-set recording programming time has to be set again.

Exemplified is a case where the information reception device 101 automatically checks whether the preset meta information is changed or not such as resetting of the recording programming time, or a case where the information reception device 101 needs the latest meta information.

As shown in FIG. 24, with the depression of the "detailed information" button, or with automatic checking by the information reception device 101, a meta information request process (S904) is executed. When a request is made by the input section 511 for the meta information, the meta information acquisition/storage section 503 provided to the information reception device 101 refers to the meta information storage region in the meta information acquisition/storage section 503 to check whether the meta information group interrelated to the meta information reference ID already carries the meta information, and whether it has been already acquired (S905).

Here, to ease the meta information acquisition/storage section 503 to check the existence of the meta information, a meta information flag indicating the existence of the meta information or the meta information group may be provided in the storage region of the meta information acquisition/ storage section 503 for storing the meta information.

At the acquisition time of the meta information group or the meta information, to store the meta information group or the meta information in such a storage region, the meta information acquisition/storage section 503 sets a flag to the meta information flag.

Thus, once a request comes for the meta information, the meta information acquisition/storage section 503 can immediately determine whether the meta information has been already at hand by referring to the meta information flag.

Here, described above is an exemplary case where the meta information flag of the present embodiment is set for every meta information or meta information group. Such an example is not restrictive, and for example, the meta information flag may be set for every group meta information. If this is the case, a setting is so made that a group ID is used as a basis to check the meta information flag.

Moreover, assuming a case where the meta information group interrelated to the meta information reference ID is not acquired in its entirety, but only the group and item are partially acquired, the meta information flag may be specified based on the group ID, category, attribute, item name, or tag.

If the meta information is not acquired yet (S905), the information reception device 101 uses the meta information reference ID to acquire the meta information group including the corresponding meta information from the directory service server 106 (S906). Here, without acquiring the meta information group, only any needed meta information may be extracted from the meta information group for partial acquisition.

If the information reception device 101 has been already acquired the meta information (S905), a confirmation process (S907) is then executed whether thus acquired meta information has the update possibility or not (S907).

Such a confirmation process of checking about the update possibility (S907) is executed by referring to the meta information including the attribute of "update possibility" out of the meta information group to which the acquired meta information belongs. The confirmation process of checking about the update possibility (S907) is executed by the possibility determination section 513 provided to the information reception device 101. Here, in a case where the acquired meta information is a part of the group meta information, the confirmation process (S907) is carried out by referring to the meta information having the attribute of "update possibility" from the group meta information.

If the attribute of "update possibility" shows "NO" for the update possibility (S907), the acquired meta information stored in the meta information acquisition/storage section 503 is used as it is (S910).

If the attribute of "update possibility" shows "YES" for the update possibility, the possibility determination section 513 determines that the acquired meta information is the meta information that can be updated, and then for transmission to the meta information request section 514, generates update confirmation information for checking whether or not the acquired information has been actually updated.

After receiving the update confirmation information, the meta information request section 514 then generates meta information request information based on the updated confirmation information to check the meta information version. The meta information request information at least includes a meta information reference ID assigned to the meta information, and an attribute value (version information) of the meta information version for checking. Here, every time the meta information is updated, the directory service server 106 updates the version information for version up.

Here, the meta information including the attribute of the meta information version is not the only option, and as a possible application, the meta information structured by a tag indicating the meta information version may be also used.

The meta information request information generated by the meta information request section 514 is forwarded to the directory service server 106 over the network 103.

After receiving the meta information request information coming from the information reception device 101, based on the meta information reference ID set to the meta information request information, the meta information search section 306 provided to the directory service server 106 searches the meta information group stored in the meta information storage section 304 for the meta information having the attribute of the meta information version.

Herein, the meta information search section 306 of the present embodiment is applicable not only for the case of searching the meta information group for the meta information having the attribute of the meta information version but also for the case of searching the group meta information for the meta information having the attribute of the meta information version. If this is the case, the meta information request information coming from the information reception device 101 includes a group ID or others in addition to the meta information reference ID.

After completing the search of the meta information having the attribute of the meta information version, the meta information search section 306 acquires the version information that is an attribute value of the meta information version (S908).

The version information is information indicating the update frequency of the meta information. For example, the version information as a result of once-updating the meta information is displayed as "V01", and the version information as a result of twice-updating the meta information is displayed as "V02". Note here that the version information of the present embodiment is not restrictive to show the update frequency of the meta information but also show the transmission frequency of the meta information, the publication frequency thereof, the printing frequency thereof, and the like.

The meta information search section 306 forwards thus acquired version information to the information reception device 101 over the network 103. Herein, before forwarding the version information to the information reception device 101, the meta information search section 306 of the present embodiment may compare the version information coming from the information reception device 101 with the version information acquired through the search. In this manner, as a result of comparison, if the meta information is determined as having been updated, the meta information search section 306 can forward to the information reception device 101 the updated meta information, meta information group, or group meta information as it is.

After receiving the version information, the meta information request section 514 provided to the information reception device 101 compares the version information of the received meta information with the version information of the acquired meta information stored in the meta information acquisition/storage section 503 (S909).

As a result of version information comparison as such, if any two pieces of version information are the same, e.g., the version information coming from the directory service server 106 and the version information stored in the information reception device 101, are both showing "V02", for example, there is no need for the information reception device 101 to make a new request for the meta information group because the meta information has not been updated.

Thus, without going through the update process for the meta information, the information reception device 101 uses as it is the acquired meta information stored in the meta information acquisition/storage section 503 (S910).

Further, if any two pieces of meta information version are not the same, and especially if the version information coming from the directory service server has been updated more often and thus being the latest, it means that the meta information group stored in the directory service server 106 has been updated. Accordingly, the information reception device 101 acquires again the meta information group interrelated to the same meta information reference ID as the acquired meta information (S911).

To acquire again the meta information group as such, the acquisition command section 502 provided to the information reception device 101 generates the acquisition command information for acquiring again the corresponding meta information group. Here, the process onwards is almost the same in structure as the acquisition process for the meta information described above, and thus is not described in detail again. Herein, it is applicable for not only the case of acquiring again the whole of the meta information group, but also the case of acquiring again the group meta information, the case of acquiring again each meta information, and the like.

Once receiving from the directory service server 106 the meta information group that is supposed to be acquired again, the meta information acquisition/storage section 503 updates the meta information group in storage to the received meta information group (S912). Accordingly, the version information is also updated.

At the time when the meta information of the present embodiment is updated (S912), the meta information group is overwritten before update. This is not restrictive, and the information before and after update may be stored for backup.

In the above case, the update time of the meta information group is also stored, and every time the meta information is updated, the meta information group can be displayed as detailed information. As an application, in an exemplary case where the information reception device 101 reproduces any recorded broadcast program after the broadcast program is through, the contents of any previous meta information group can be displayed in a relative manner as if being on the air in real time with a lapse of reproduction time. The information to be stored at such a time includes both the update time (or the relative time from broadcast starting) of the meta information, and the update details therefor (meta information). To reproduce any recorded program, a reference is made thereto.

Alternatively, with a lapse of time, the information reception device 101 may automatically display the information about the time (update time) stored in the storage region of the meta information acquisition/storage section 503, or when the viewer depresses a "detailed display" button or others, may responsively refer to the detailed information corresponding to the button depression time in the storage region for display on the display section 508.

Note here that in the above example, the timing for the process for updating the meta information is when the meta information is needed to be acquired through an operation made by a viewer being a user. Other than such an example, the information reception device 101 may automatically performs update checking through a previous setting of the meta information update process to the information reception device 101.

If storing the updatable meta information group, the information reception device 101 refers to the meta information group for the meta information having the attribute of "update timing".

In a case where the attribute value of the meta information having the attribute of "update timing" is set with "30 minutes" for the update timing, for example, the information reception device 101 checks the directory service server 106 every 30 minutes to see the update state of the meta information group linked to the meta information reference ID based on the version information or others.

The update timing may be set with an absolute time or a relative time from broadcast starting, and if this is the case, the meta information held by the information reception device 101 can be updated collectively at the timing aimed by the broadcast station. This is the end of the description for a series of operation in the meta information update process.

Other than controlling the update timing on the broadcast station side on the basis of the meta information group as such, the timing setting for meta information update checking is possible on the side of the information reception device 101. As an exemplary process, the update checking is so set as to be made every 15 minutes for the information reception device, and checking is performed at a timing other than the update timing set on the side of the broadcast station 105. Further, it becomes possible to perform the update checking with respect to the meta information group 3 minutes before the broadcast start time of a program programmed for recording. Thus, even if the broadcast start time or others is changed, by checking the meta information group at whatever time, it is possible to deal with program extension, for example. Here, the meta information group is not restrictive, and the group meta information will do.

Described above is a case where the meta information having the attribute of the meta information version for update checking is under the management of the directory service server. This is not restrictive, and the meta information having the attribute of the meta information version may be located in another server or others, for example. If this is the case, the meta information having the attribute of the meta information version includes a meta information reference ID. With the group meta information instead of the meta information group, the meta information including the attribute of group ID is also included.

Real Time Update

Next, in a case where the basic EPG information is delivered over SI of the broadcast waves, with the information access system 100 of the present embodiment, only the meta information reference ID is delivered together with the basic EPG information.

The sub meta information or others is not delivered together with the basic EPG information, and is stored in the directory service serer 106 connected to the network 103. The sub contents are also stored in the content service server 107.

By uniquely specifying a meta information reference ID coming with the basic EPG information, and by updating a content or sub meta information to be referred thereby (the directory service server 106, the content service server 107), it becomes possible to always provide the latest information when the viewer wants to acquire the meta information.

Figure 25:
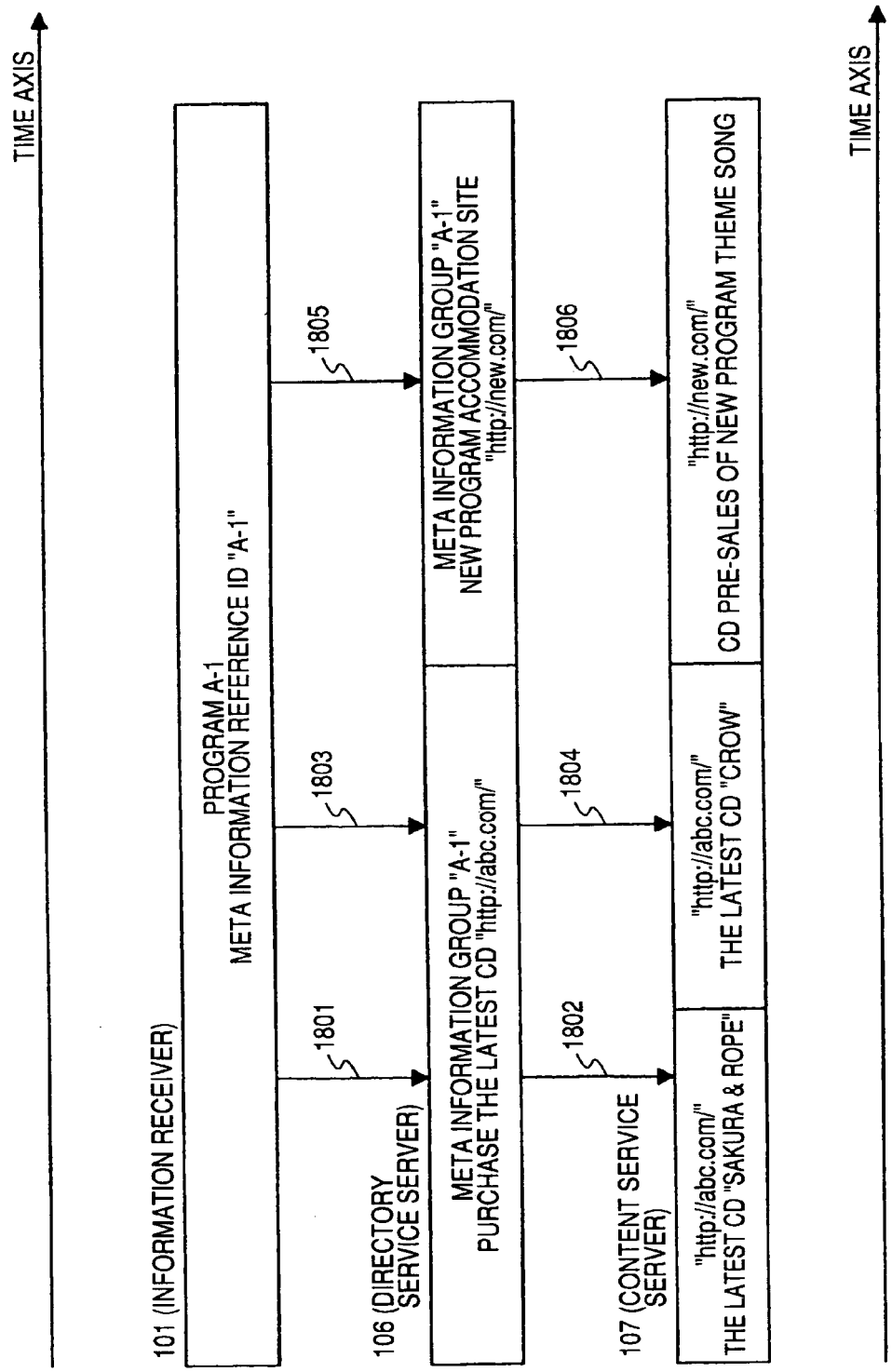
FIG. 25 is a diagram schematically showing a process to be executed for screen display of the meta information of the embodiment.

As shown in FIG. 25, exemplarily responding to an access 1801, the information reception device 101 acquires from the directory service server 106 the sub meta information indicating "purchase the latest CD "http://abc.com/"".

As another example, with an access 1802, the information reception device 101 makes an access to a sub content stored in the content service server 107 for "the latest CD "Sakura & Rope" "http://abc.com/""

With an access 1803, the sub meta information to be acquired by the information reception device 101 is the same as with the access 1801. With an access 1804, because the sub content has been updated, the information reception device 101 can access the latest sub content ("the latest CD "crow" "http://abc.com/").

With an access 1805, because the sub meta information stored in the directory service server 106 has been updated, the information reception device 101 can acquire the latest sub meta information ("new program accommodation site "http://new.com/").

With an access 1806, because the sub content stored in the content service server 107 has been updated, the information reception device 101 can make an access to the latest sub content ("new program theme song CD presale "http://new.com/").

If the sub content or the sub meta information has been updated, this eliminates the need for forwarding the updated sub content, sub meta information, or others toward the EPG service server 108.

Thus, this eliminates the need for the broadcast station 105 to go through a process such as the update process for the schedule information to be generated responsively by updating the sub content, the sub meta information, or others. Moreover, updating the sub content, the sub meta information, or others will not affect SI information, and the SI information can be used as it is.

As an application of the above description, exemplified is "extension application for program recording programming". In a case where the information reception device 101 capable of program recording programming performs recording programming based on the basic EPG information, using the information access system 100 will uniquely correspond the program meta information of the broadcast program and the program information to be represented by the basic EPG information via the meta information reference ID provided by the side of the broadcast station 105.

Here, the actually-available basic EPG information cannot establish an explicit interrelation with programs to be broadcast by the broadcast station 105.

Assuming here is a case of recording-programming a "professional baseball" program. The information reception device 101 understands that the meta information reference ID of the "professional baseball" program is "B-1" based on the basic EPG information or others.

Moreover, the information reception device 101 uses the meta information reference ID of "B-1" as a key to acquire any corresponding sub meta information or others from the directory service server 106. Here, the meta information such as the sub meta information includes an extension flag (not shown.) indicating that the program extension is possible as an attribute.

When an extension flag is set, the information reception device 101 refers to the meta information of "B-1" stored in the directory service server 106 on a regular basis (for example, every 10 minutes).

The information reception device 101 starts recording when the program-programmed time comes, and also during recording, refers to the meta information stored in the directory service server 106 on a regular basis.

The meta information such as the sub meta information for reference as such includes, in addition to an extension flag as an attribute, the start time or end time after the recording time is changed.

If the broadcast time is extended or changed, the broadcast station 105 updates in real time the start time or end time provided to the program meta information held by the directory service server 106.

If the recording time information provided to the meta information such as the program meta information has been updated, the information reception device 101 can go through a process of automatically extending the recording time, for example. Here, the recording time provided to the meta information can be changed in real time not only a case where the recording-programmed program is extended but also a case where programs having been on the air before the recording-programmed program are extended.

The information reception device 101 capable of program recording stores, for program recording and storage, stores also the basic EPG information, and the meta information reference ID of a program corresponding to the basic EPG information.

When the above-described "related information" button is depressed by a viewer for acquiring any information related to the recorded program, based on the meta information reference ID corresponding to the program, the information reception device 101 makes an access to the directory service server 106 to ask for any related meta information.

Unless the expiration date of the meta information reference ID is invalid, the information reception device 101 can acquire the meta information such as the sub meta information from the directory service server 106 over the network 103.

The contents of the meta information group located in the directory service server 106 can be updated in real time. Thus, the information reception device 101 can acquire the meta information having different contents in accordance with the timing accessing to the directory service server 106.

Even if the contents of the meta information or the sub content being referable from the specific program are changed, with the same meta information reference ID, the information reception device 101 can acquire the meta information or the sub content having been updated.

The information access system 100 of the present embodiment is characteristically capable of managing the directory service server 106 and the content service server 107 separately for every broadcast station 105.

With such a structure, no dependency is observed among the meta information under the management of the broadcast stations 105. Thus, each broadcast stations 105 can operate the information access system 100 of the present embodiment within the scope of the meta information under its own management.

What is more, instead of every broadcast station 105 starting operating the information access system 100 all at once, the broadcast stations 105 can start operating the information access system 100 at whatever time irrespective of date and time.

Although required to manage the acquired meta information through identification for every broadcast station 105, the information reception device 101 can convert it in any appropriate format. Accordingly, the information reception device 101 can collectively manage or use the meta information or others acquired by a plurality of broadcast stations 105, and the information reception device 101 can make an access to the sub contents or others stored in a plurality of content service servers 107.

Instead of the whole of the meta information, the information distribution device 104 distributes only any minimum meta information reference ID and the basic EPG information, and forwards the meta information group interrelated to the meta information reference ID responding to a request coming from the information reception device 101. Accordingly, this favorably leads to reduction of the data amount for delivery and the data amount to be accumulated in the information reception device 101, improving the process efficiency. Also, any desired contents can be provided to the information reception device 101.

When the information distribution device 104 provides the sub contents or others to the information reception device 101, such provision is made in accordance with the viewer's preferences belonging to the information reception device 101. Thereby, the information distribution device 104 can efficiently provide advertising information to the information reception device 101 without waste.

Based on the meta information, the information reception device 101 can easily search the sub contents or others related to the meta information. At the time of search as such, the information reception device 101 can acquire the sub contents or others stored in a plurality of information distribution devices based on the meta information or others derived by a plurality of information distribution devices 104.

Through an access made by the information reception device 101 to the information distribution device 104, the information distribution device 104 can acquire access information at the time of meta information reception.

Based on the meta information reference ID, the information reception device 101 can always receive the latest sub contents, sub meta information, or others from the information distribution device 104.

Figure 26:
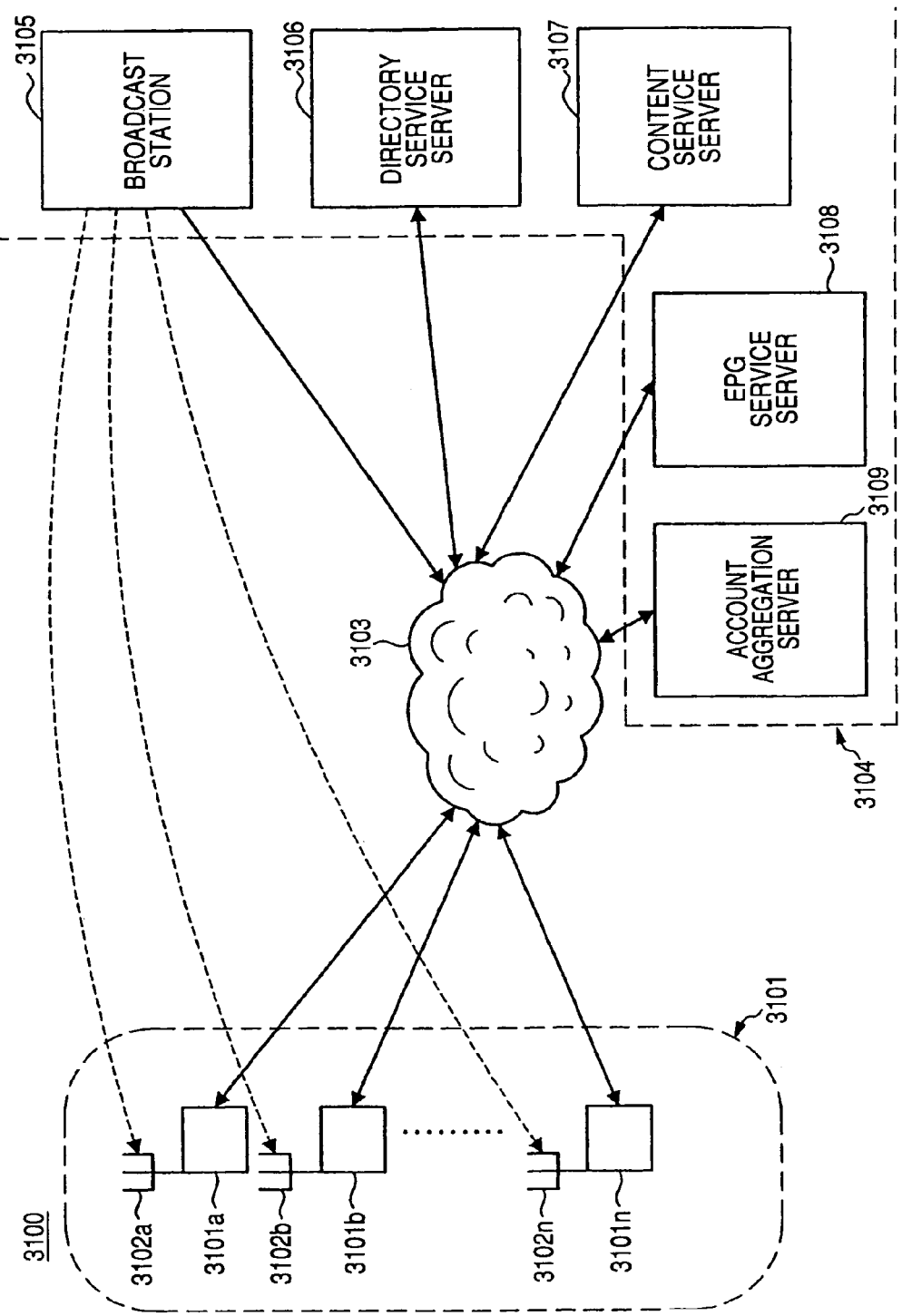
FIG. 26 is a block diagram showing the schematic structure of an information search system of the embodiment.

In the below, by referring to FIG. 26, described is an information search system 3100 of the present embodiment. FIG. 26 is a block diagram showing the schematic structure of the information search system of the present embodiment.

As shown in FIG. 26, the information search system 3100 of the present embodiment is structured by, at least, information reception devices 3101 (3101a, 3101b, . . . , 3101n), a network 3103, and an information distribution device 3104. Herein, the information reception device 3101 of the present embodiment corresponds to the information access device of the present invention, for example.

With the information search system 3100 of the present embodiment, as an offerable service, the information distribution device 3104 offers main contents (main contents) such as broadcast programs to the information reception device 3101. Also, the information reception device 3101 makes a search for, for acquisition, any other main contents related to the above main contents, or sub contents related to the main contents via meta information. Herein, the main content, the sub content, the meta information, or others will be described later.

In the below, exemplified is a case where the main content is a broadcast program for provision from the information distribution device 3104 to the information reception device 3101, the information search system 3100 of the present embodiment is described.

The information distribution device 3104 includes, at least, a broadcast station 3105, a directory service server 3106, a content service server 3107 or an EPG (Electrical Program Guide) service server 3108, and an account aggregation server 3109. Herein, the directory service server 3106 of the present embodiment corresponds to the meta information distribution device of the present invention, for example.

The broadcast station 3105 broadcasts various broadcast programs with respect to the information reception device 3101, and sends out basic EPG information or others as data broadcasting. Through reception of the basic EPG information, the information reception device 3101 can display an EPG (Electrical Program Guide). The basic EPG information will be described later.

Note here that, the information distribution device 3014 of the present embodiment is described by exemplifying a case of including the broadcast station 3105, but such an example is not restrictive. For example, it is applicable when the main content is "game software", "book in print", or the like instead of "broadcast program or EPG", and when the information distribution device 3104 includes an ISP (Internet Service Provider), or a product sales system for selling game software or others.

The EPG service server 3108 receives schedule information or others from the respective broadcast stations 3105, and generates EPG information in a format of electrical program guide (EPG). Alternatively, it receives EPG information that is generated outside. The schedule information is information for broadcasting programs on schedule, and proceed the programs.

Further, thus generated EPG information is stored in a storage section (not shown.) provided to the EPG service server 3108. Here, the EPG information includes the basic EPG information. Through reception of the basic EPG information, the information reception devices 3101 can display channel lists, program lists, program contents currently on the air, program contents to be on the air, program contents having been off the air, or the like.

The basic EPG information is delivered to the information reception devices 3101 collectively from the EPG service server 3108, and any other additional ECG (Electronic Contents Guide) information exemplified by sub meta information added to the sub contents can be independently managed in the broadcast station 3105 that is the service-offering side. Here, the ECG information and the sub meta information will be both described later. The broadcast station 3105 is not the only option, and any other device will do depending on the service type offered by the information distribution device 3104.

The information reception devices 3101 are provided with each corresponding identification information reception section 102 (3102a, 3102b, ..., 3102n) to receive broadcast waves including identification information such as a meta information reference ID, and as indicated by dotted arrows, receive broadcast waves coming from the broadcast station 3105. Alternatively, the information reception devices 3101 perform data transmission and reception to/from the information distribution device 3104 over the network 3103. Here, through reception of the broadcast waves as such, the information reception devices 3101 can display programs such as television programs.

Note here that the information search system 3100 of the present embodiment is exemplified by a case of singly including the information distribution device 3104. Such an example is not restrictive, and for example, each broadcast station may include a plurality of information distribution devices 3104 for application.

The account aggregation server 3109 has a function of performing, in a unified manner, not dependent on the broadcast station 3105 or programs, authentication when viewers (users) use the information access system 3100, or billing and settlement when the users using the information access system 3100 purchase sub contents or others.

That is, with the account aggregation server 3109 included, unified authentication is allowed through unification of users' authentication information, and moreover, billing and settlement information can be also unified on a user basis. Here, such unification is performed based on a unified user ID as a result of unifying a plurality of user IDs.

Assuming that a user wants to purchase various sub contents based on sub meta information, these sub contents may be under the management of varying content holders or content distributors.

Every possible service such as billing and settlement may be unified, and provided is a function of alternatively performing authentication to access every possible service based on a single unified user ID. It can be realized by any specific server, for example.

User authentication (for example, using passwords) is performed in the account aggregation server 3109, and only the authentication result is forwarded to the respective content service servers 3107. This eliminates the need for informing the broadcast station 3105 provided to the information distribution device 3104 of unified user IDs and passwords, whereby the users' personal information can be protected under the management of the server.

The authentication result forwarded to the content service servers 3107 is in a form of an electronic certificate or others, which includes neither the user ID nor password information. Thus, in a case of wiretapping by third parties, this successfully ensures security measures against tampering.

Herein, the user information is described by exemplifying a case of not being forwarded to the content service server 3107. Such an example is not the only option, and the user information may be forwarded to the content service server 3107 for application.

Moreover, when customer information is needed to be disclosed in terms of marketing activity of the content holders being the copyright holders of products such as video, music, game software, and the like, the user information can be used effectively. In the above case, the user ID is included in an electronic certificate before notified to the content service.

For alternative performance of billing and settlement, the user logs in the account aggregation server 3109 to obtain the unified billing and settlement using his or her unified user ID.

After log-in, a selection is made from the sub contents exemplified by products offered by the respective content service servers 3107. For example, in response to a command "put into basket", products available by various content services can be kept in a basket irrespective of content service server. Herein, the "basket" is a shopping "bag".

Through selection of sub contents and placement of the result into the basket, at the payment, the sub contents can be collectively billed and settled no matter from which content service server 3107 the sub contents are provided.

After selection of sub contents, when the user issues a "purchase" command, the account aggregation server 3109 collectively performs billing and settlement using its billing and settlement function, and the result derived by such billing and settlement is forwarded to the content service servers 3107. Upon reception of a completion notice of billing and settlement, the content service servers 3107 distribute the sub contents under the user's purchase command to the user.

Figure 27:
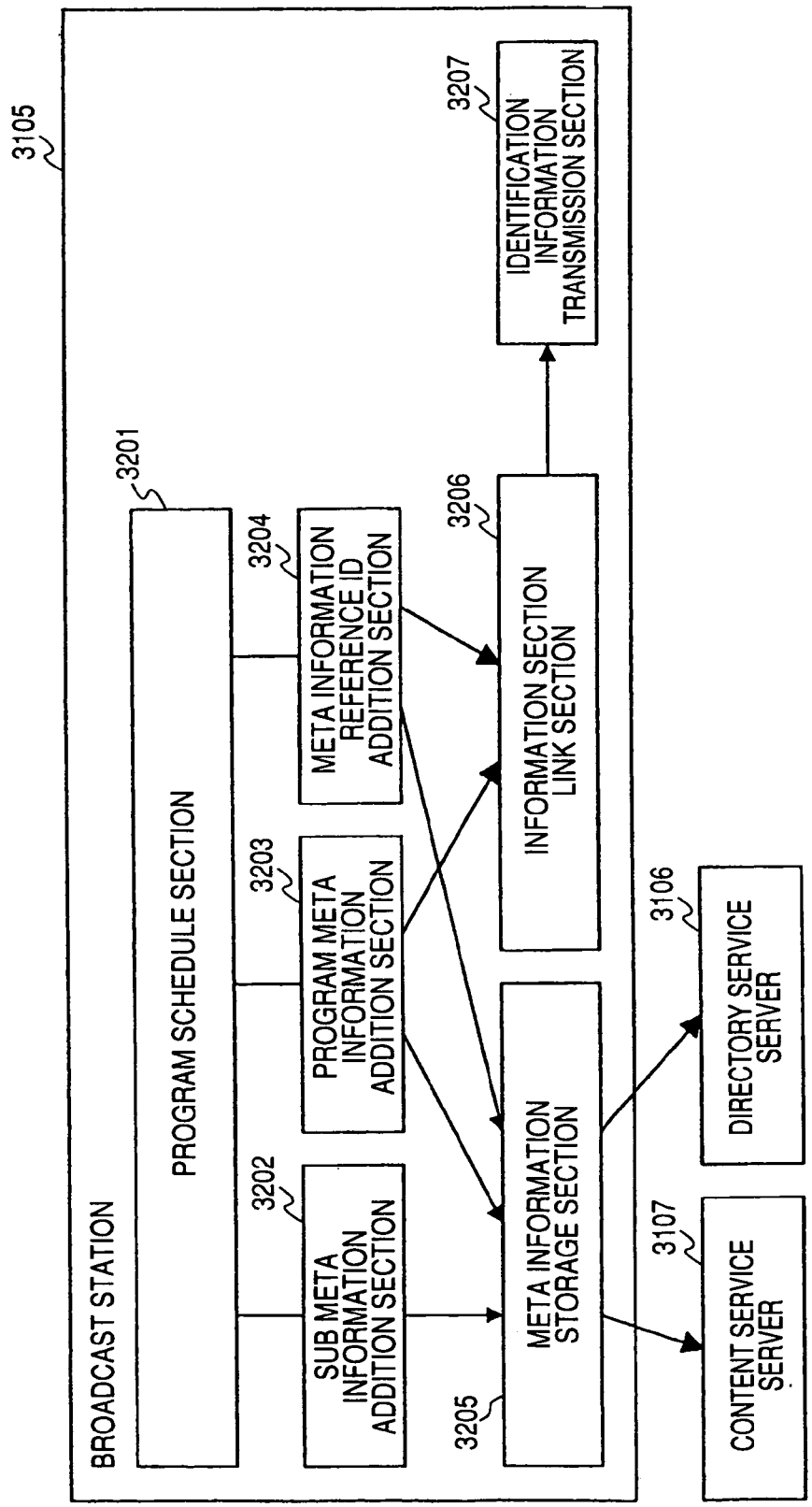
FIG. 27 is a block diagram showing the schematic structure of a broadcast station of the embodiment.

By referring to FIG. 26, described next are the structures of components provided to the information search system 3100 of the present embodiment. FIG. 27 is a block diagram showing the schematic structure of a broadcast station of the present embodiment.

First, as shown in FIG. 26, the network 3103 of the present embodiment is described. The network 3103 is connected to the information distribution device 3104 for bidirectional communications therewith, and typically is the Internet establishing a connection by ADSL (Asymmetric Digital Subscriber Line), FTTH (Fiber To The Home), and the like. The connection medium includes a fiber-optic cable by FDDI (Fiber Distributed Data Interface) or others, a coaxial cable or a twisted pair cable by Ethernet (trademark), or radio by IEEE 802.11b, and also includes a satellite network or others, whether it be cable or radio.

Next, as shown in FIG. 27, the broadcast station 3105 of the present embodiment is structured by, in addition to a general broadcast facility, a program schedule section 3201, a sub meta information addition section 3202, a program meta information addition section 3203, a meta information reference ID addition section 3204, a meta information storage section 3205, an information interrelation section 3206, and an identification information transmission section 3207.

Note here that when the service offered by the information search system 3100 of the present embodiment is "broadcasting", the information search system 3100 is provided with the broadcast station 3105 of the present embodiment. Moreover, the main contents (main contents) provided by the broadcast station 3105 to viewers are presumably broadcast programs (programs) or EPG.

The main contents of the present invention in the present embodiment are exemplified as being programs or EPGs. Such an example is not restrictive, and for example, the main contents may be game software, CD, book in print, movie, or the like.

The program schedule section 3201 generates schedule information and others by going through a scheduling process of programs to be broadcast by the broadcast station 3105.

The sub meta information addition section 3202 generates sub meta information, and adds the resulting sub meta information to the entity of a sub content (sub content) or the schedule information. Herein, the sub content is a content including at least, singly, a product, a program, a package, a service, still image data, moving image data, music data, or text, and provided from the content service server 3107.

The sub meta information is the meta information hierarchically below main meta information (or program meta information.) interrelated to the main content. Accordingly, by making an access to the main meta information, the information reception devices 3101 can access, extendedly, to the sub meta information interrelated to the main meta information, whereby any target sub content can be acquired.

The program meta information addition section 3203 generates the program meta information being the main meta information for addition to the schedule information generated by the program schedule section 3201. Note here that the program meta information added to the schedule information is structured as the basic EPG information for delivery to the information reception devices 3101. The basic EPG information is the one structured in the format of Electronic Program Guide (EPG). Herein, the program meta information or the sub meta information is the meta information indicating information about information, and the program meta information belongs to the main meta information. The main meta information will be described later.

The basic EPG information includes the program meta information, and has structure information as a program guide. When transmitted over the network 3103, the basic EPG information is delivered in such a format as HTML (Hyper Text Markup Language), and when transmitted by broadcast waves, it is sent out in such a format as SI (service Information).

The meta information reference ID addition section 3204 goes through assignment of the meta information reference ID, and adds the meta information reference ID to the schedule information generated by the program schedule section 3201 and the sub meta information. For the purpose of establishing a correspondence between the ECG information including the program meta information or the sub meta information and a program, the meta information reference ID is assigned to every program, for example. Thus, through addition of the meta information reference ID to the program meta information and the sub meta information added to the schedule information, the program meta information or the sub meta information can be acquired based on the meta information reference ID.

By referring to the meta information reference ID, the information reception devices 3101 acquire the program meta information or the sub meta information, and can access to the sub contents or information related to the broadcast programs. Herein, the meta information reference ID may be unique in the broadcast station 3105.

The meta information storage section 3205 stores, at least, the schedule information, the sub meta information, the program meta information, the meta information reference ID, or the sub contents. The sub meta information, the program meta information, the meta information reference ID, and the sub contents are all belonging to the ECG information, and the ECG information will be described later.

The information interrelation section 3206 interrelates the basic EPG information and the meta information reference ID, both of which are added to the schedule information. Through such an interrelation established between the meta information reference ID and the basic EPG information, the information reception devices 101 can acquire broadcast information or others for identification of the broadcast station 105 included in the basic EPG information, based on the meta information reference ID.

The identification information transmission section 3207 forwards the basic EPG information and the meta information reference IDs assigned to the respective programs over the broadcast waves or the network 3103. The meta information reference ID is delivered from the identification information transmission section 3207 together with the basic EPG information.

To deliver the meta information reference ID over the broadcast waves from the identification information transmission section 3207, for example, there needs to define the attribute value or others of a descriptor indicating the meta information reference ID for the SI, which is the transmission scheme for the basic EPG information.

To transmit the basic EPG information, the meta information reference ID, or the like, over the network 3103 exemplified by the Internet, there needs to define the delivery format supportable on the side of the information reception devices 3101, the delivery mechanism, or the like.

The delivery format is exemplified by HTML (Hyper Text Markup Language) format, XML (eXtensible Markup Language) format, or the like. Thus, when the HTML format or XML format is used for delivery, the meta information includes the attribute indicating the meta information reference ID.

For delivery in HTML format or XML format, the basic EPG information corresponding to the delivery format is provided with an attribute value of the meta information reference ID.

The sub meta information or the program meta information to be stored in the meta information storage section 3205 are forwarded to the directory service server 3106 at whatever time. Moreover, the sub contents or the sub meta information to be stored in the meta information storage section 3205 are forwarded to the content service server 3107.

Figure 28:
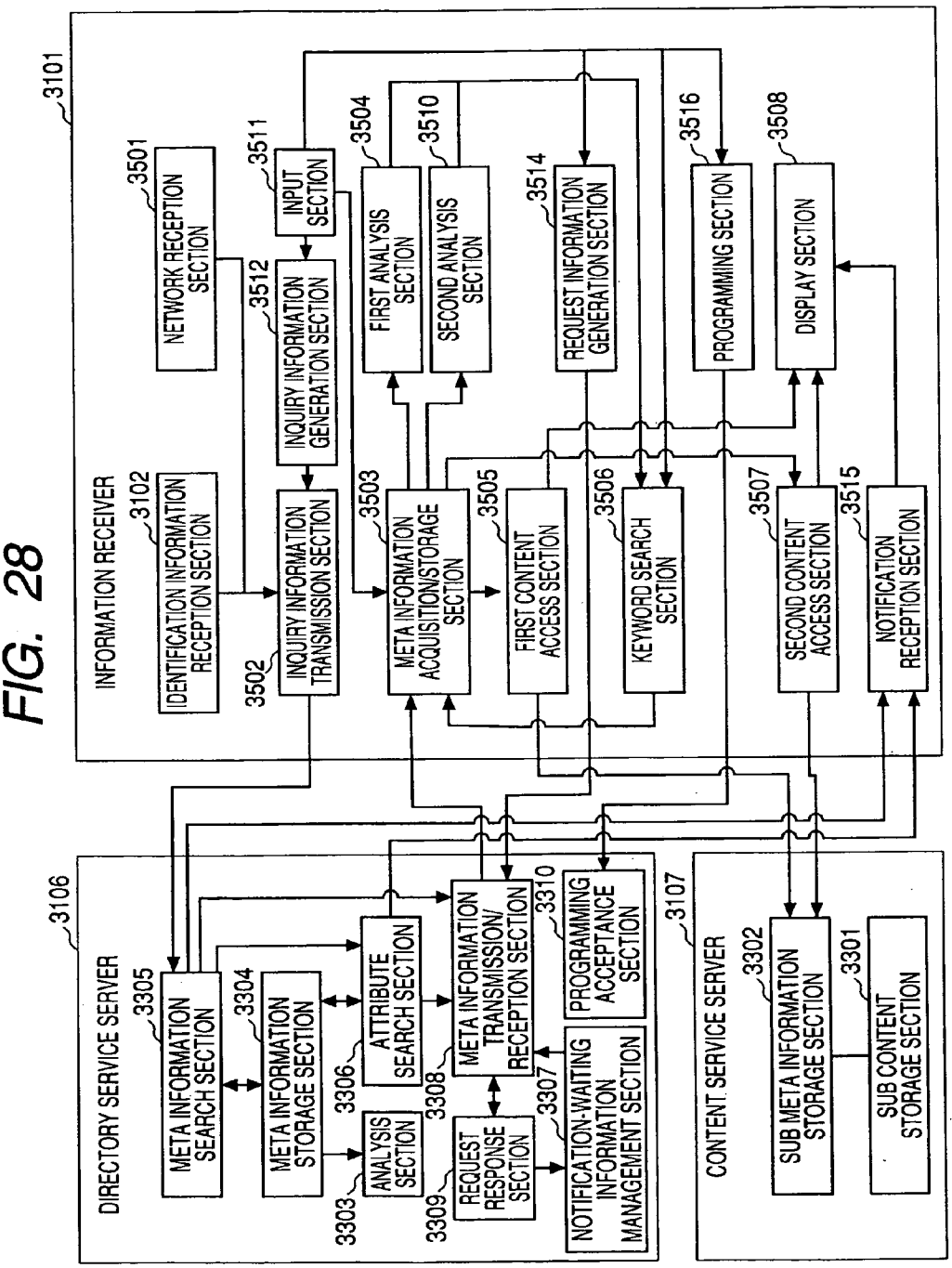
FIG. 28 is a block diagram showing the schematic structures of an information reception device, a directory service server, and a content service server of the embodiment.

Next, by referring to FIG. 28, described are the information reception device 3101, the directory service server 3106, and the content service server 3107. FIG. 28 is a block diagram showing the schematic structures of the information reception device 3101 of the present embodiment, the directory service server 3016 thereof, and the content service server 3017 thereof.

The content service server 3107 of the present embodiment stores main contents or various sub contents to be offered to viewers by content providers such as broadcast stations. Herein, as circumstances demand, entity of the sub content (sub content) includes information indicating whether the various sub contents are located, or how to acquire those, for example.

As shown in FIG. 28, the content service server 3107 at least includes a sub content storage section 3301, a sub meta information storage section 3302, a control section (not shown.) for exercising control over processes to be executed by the respective components, a transmission section (not shown.) for data transmission over the network 3103, and a reception section (not shown.) for data reception over the network 103.

The sub content storage section 3301 stores the sub contents coming from the broadcast station 3105. The sub contents can be exemplified by video contents, packages, publications, events, program information, message boards for communications with an indefinite number of users, chat services, or the like, which can be transmitted and received over the network 3103.

The sub content storage section 3301 also stores, as sub contents, Web site information for sub content sales. The sub content storage section 3301 stores the Web site information specifically related to programs.

Moreover, other than located in the sub content storage section 3301 in the content service server 3107 placed in the broadcast station, the sub contents of the present embodiment may be scattered in other sub content storage sections 301 provided to other content service servers 3107 on the network 3103.

The sub contents can be provided with the sub meta information coming as the ECG information. The sub meta information storage section 3302 stores the sub meta information.

Due to the fact that the sub contents can be provided with the sub meta information as such, the information reception devices 3101 can perform searching of the sub contents using the sub meta information as a key (key).

Here, the sub content storage section 3301 of the present embodiment stores main contents and others in addition to sub contents, and the sub meta information storage section 3302 stores main meta information and others in addition to sub meta information.

Note here that such an application is possible for the information search system 3100 of the present embodiment including plural broadcast stations 3105 to share a single content service server 3107 among the broadcast stations 3105.

Next, the directory service server 3106 of the present embodiment is operated as a server specifically for the directory service, for example. As shown in FIG. 28, the directory service server 3106 includes an analysis section 3303 for analyzing any acquired access information, a meta information storage section 3304, a meta information extraction section 3305, a meta information search section 3306, a notification-waiting information management section 3307, a meta information reception section 3308, a request response section 3309, a booking acceptance section 3310, a control section (not shown.) for exercising control over processes to be executed by the respective components, a transmission section (not shown.) for data transmission over the network 3103, and a reception section (not shown.) for data reception over the network 3103.

The meta information storage section 3304 stores a sub meta information group that is a collection of a plurality of pieces of sub meta information about various attributes including address, title, category, relating human name (e.g., cast, author), price, service offering time period, or the like of various kinds of sub contents coming from the content service server 3107 as the ECG information, and a main meta information group (program meta information group).

Moreover, the meta information storage section 3304 stores the program meta information related to regular programs and the sub meta information group with an interrelation established therebetween. Herein, the program meta information may be structured as a program meta information group including a plurality pieces of program meta information.

The meta information storage section 3304 can be applicable to a case where the program meta information, the sub meta information, or the meta information reference ID is stored on the basis of the broadcast station 3105 for management.

The meta information search section 3305 makes a search for the meta information storage section 3304 for the program meta information or the sub meta information based on inquiry information coming from the information reception devices 3101. The program meta information or the sub meta information being a search object is the whole of the meta information group stored in the directory service server 3106 irrespective of the meta information reference ID.

If failing the search of program meta information or the sub meta information instructed by the information reception device 3101, the meta information search section 3305 transfers the inquiry information to the attribute search section 3306. If completing the search, the corresponding meta information group is to be forwarded to the information reception device 3101. Here, even if completing the search, the meta information search section 3305 may transfer the inquiry information to the attribute search section 3306.

The meta information search section 3305 of the present embodiment may partially extract only any needed program meta information or sub meta information from thus found meta information group, and forwards thus extracted program meta information or the sub meta information to the information reception device 3101 from which the acquisition command information came.

Based on the inquiry information coming from the meta information search section 3305, the attribute search section 3306 searches an attribute of the meta information having substantially the same or similar attribute of the meta information designated by the information reception device 3101.

Note here that the attribute search section 3306 of the present embodiment is not restrictive only to attribute search of the meta information, and as a possible application, may search an index (or a tag.) indicating the type of the meta information such as program meta information.

After completing the search of the meta information group having the substantially the same or similar attribute based on the inquiry information, the attribute search section 3306 forwards the meta information group to the meta information transmission/reception section 3308. In an alternative manner, any needed meta information may be extracted from the meta information group for transmission to the meta information transmission/reception section 3308.

The communications-waiting information management section 3307 stores communications-waiting information, and transmits the communications-waiting information to a transmission section (not shown.).

The meta information transmission/reception section 3308 forwards, to the information reception device 3101 over the network 3103, the meta information group coming from the meta information search section 3305 or the attribute search section 3306.

The sub meta information is edited on the side of the broadcast station 3105 on a program basis, and the result is structured as a sub meta information group including one or more pieces of sub meta information. Moreover, a meta information reference ID is assigned thereto for reference of the sub meta information group.

The information reception device 3101 makes an access to the directory service server 3106 based on the meta information reference ID so as to acquire the meta information such as the sub meta information. Here, the directory search service server 3106 can acquire access information that is generated every time the information reception device 3101 makes an access, and stores the resulting access information for every information reception device 3101.

Furthermore, because the analysis section 3303 can analyze thus stored access information, the broadcast station 3105 can generate sub meta information that is considered appropriate for users (viewers) based on the analysis result. Here, the broadcast station 3105 also can receive the access information from the directory server 3106 over the network 3103.

Note here that, as a possible application, the information search system 3100 of the present embodiment may include plural broadcast stations 3105 to share a single directory service server 3106 among the broadcast stations 3105.

Next, the information reception device 3101 of the present embodiment shown in FIG. 28 is described. The information reception device 3101 can be exemplified by broadcast STBs (Set-Top Boxes), VCRs, various CE devices such as game machines, PCs (Personal Computers), PDAs (Personal Digital Assistants), mobile equipment starting with portable phones, and others.

The information reception device 3101 is provided with an identification information reception section 3102, a network reception section 3501, an inquiry information transmission section 3502, a meta information acquisition/storage section 3503, a first analysis section 3504, a first content access section 3505, a keyword search section 3506, a second content access section 3507, a display section 3508, a second analysis section 3510, an input section 3511, an inquiry information generation section 3512, a request information generation section 3514, a notification reception section 3515, and a programming section 3516.

Herein, the meta information acquisition/storage section 3503 of the present embodiment corresponds to request means or others, for example, the keyword search section 3506 of the present embodiment corresponds to preference search means or others, for example, and the display section 3508 of the present embodiment corresponds to display means or others, for example.

The identification information reception section 3102 receives, for storage, the basic EPG information and the meta information reference ID from an antenna or others over the broadcast waves. The network reception section 3501 receives, for storage, the basic EPG information and the meta information reference ID over the network 3103.

Note here that the information reception device 3101 of the present embodiment is described by exemplifying a case of performing reception from the broadcast station 3105 offering a data broadcasting service. Such an example is not restrictive, and as a possible application, only the meta information reference ID may be received not from the broadcast station 3105 but from the ISP or others.

The information reception device 3101 of the present embodiment is described by exemplifying a case of acquiring the meta information reference ID from the identification information reception section 3102. Such an example is not restrictive, and as a possible application, when an offerable service is CD sales, and when a main content is a "CD" such as a music CD, the CD-reproducible information reception device 3101 may have a function of acquiring the meta information reference ID from the information distribution device 3104 by reading the meta information reference ID stored in an extended storage region of the CD.

Moreover, for example, assuming a case of where the offerable service is book publication and the main content is a book in print, and when the front cover of the book or others is directly printed with a meta information reference ID, as a possible application related to the meta information reference ID, the information reception device 3101 may acquire the meta information reference ID through the input section 3511 such as a keyboard provided to the information reception device 3101. Here, the meta information reference ID may be a one-dimensional, two-dimensional, or three-dimensional bar code, for example.

The network reception section 3501 receives the address information such as URI of the directory service server 3106 or others over the network 3103, and stores the URI. Alternatively, the address information such as URI may be provided from the input section 3511 provided to the information reception device 3101 for storage. Use of the URI allows the information reception device 3101 to access to the directory service server 3106.

Here, the information reception device 3101 can be connected to the network 3103 through dialup connection, ADSL/FTTH, or the like.

The information reception section 3101 receives the basic EPG information provided over the broadcast waves or the network 3103, and the meta information reference ID added to the respective programs.

The information reception device 3101 manages the address information (e.g., URI), on the Internet, of the directory service server 3106 corresponding to the respective stations. When any change is made to the URI, the URI is updated so that the latest URI is always at hand. Such URI update is done by update data coming over the broadcast waves or the network 3103.

The identification information reception device 3102 or the network reception section 3501 receives the basic EPG information provided with the meta information reference ID which is provided by the SI using the broadcast waves or the network 3103, and stores the meta information reference ID.

For the purpose of identifying to which broadcast station the program corresponding to the received meta information reference ID belongs at the time of acquisition of the meta information reference ID, the meta information reference ID is interrelated to broadcast station information (not shown.) for storage.

At the time of acquiring the meta information reference ID from the SI, by receiving the broadcast station information, it becomes possible to identify to which broadcast station the program belongs. For example, according to the broadcast standards defined by ARIB (Association of Radio Industries and Businesses), the SI never fails to include a service ID indicating which broadcast station. The broadcast station information including such a service ID and the meta information reference ID are interrelated to each other.

Figure 29:
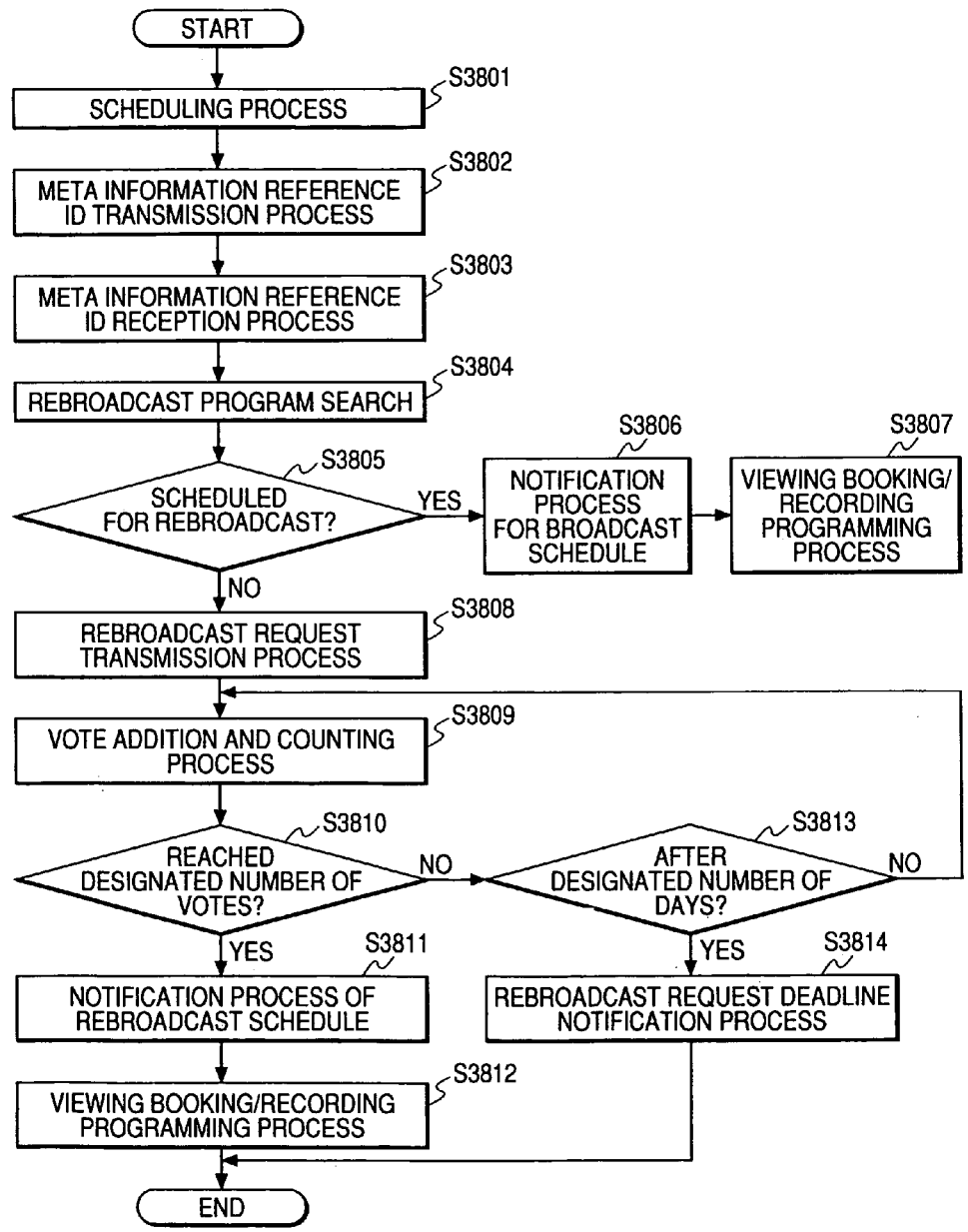
FIG. 29 is a flowchart showing the schematic operation of the information search system of the embodiment.

Next, by referring to FIG. 29, described is the operation of the information search system 3100 structured as above in the present embodiment. FIG. 29 is a flowchart showing the schematic operation of the information search system of the present embodiment.

Scheduling Process

First, as shown in FIG. 29, with the information search system 3100 of the present embodiment, a program scheduling process (S3801) is executed by the program schedule section 3201. After the broadcast station 3105 determines a program schedule, the main meta information (program meta information) and the sub meta information, both of which are related to the programs. Here, assignment of a meta information reference ID is carried out in advance for program identification.

Next, the program meta information addition section 3203 and the sub meta information addition section 3202 add, respectively, the program meta information and the sub meta information to the schedule information generated by going through the scheduling process.

Out of the program-relating sub contents, any sub content to be displayed to the viewers is selected, and thus selected sub content is interrelated to the meta information reference ID. Moreover, by adding the meta information reference ID corresponding to the program to the schedule information, the program meta information is interrelated to the sub meta information.

The meta information reference ID is linked to the program meta information and the sub meta information. Thus, as shown in FIG. 8 example or others in the above, the program meta information and the sub meta information linked to the meta information reference ID will have a unified data structure as the meta information group belonging to the meta information reference ID.

Through acquisition of the meta information reference ID, out of the meta information group linked to the meta information reference ID, only any needed program meta information or sub meta information can be extracted for partial acquisition.

Figure 30:
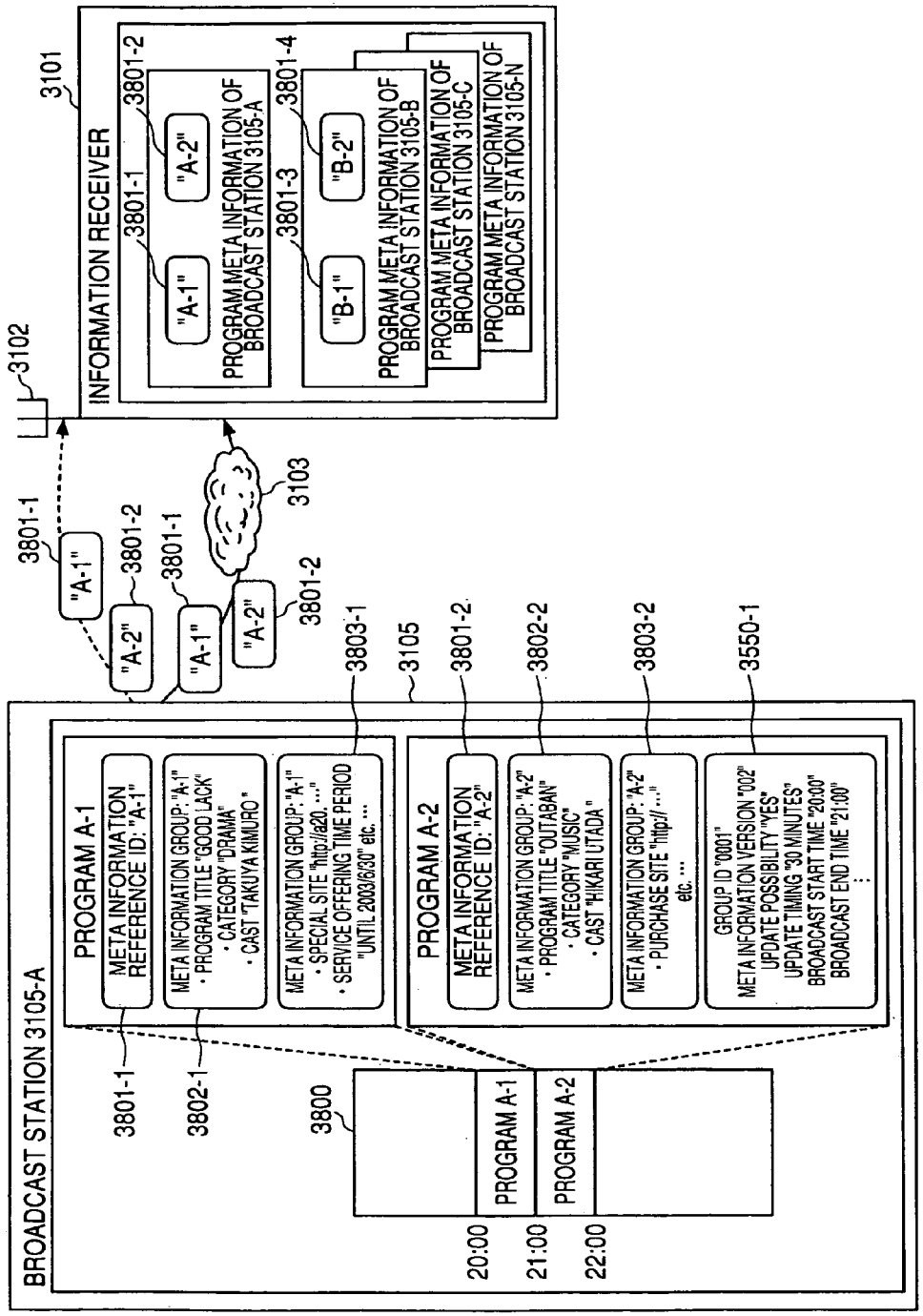
FIG. 30 is a diagram showing the schematic operation for the information distribution device of the embodiment to transmit a meta information reference ID to the information reception device.

As shown in FIG. 30, schedule information 3800 is provided with a meta information reference ID 3801, program meta information 3802 linked to the meta information reference ID 3801, and sub meta information 3803. FIG. 30 is a diagram showing the schematic operation of forwarding the meta information reference ID from the information distribution device of the present embodiment to the information reception device.

Figure 31A:
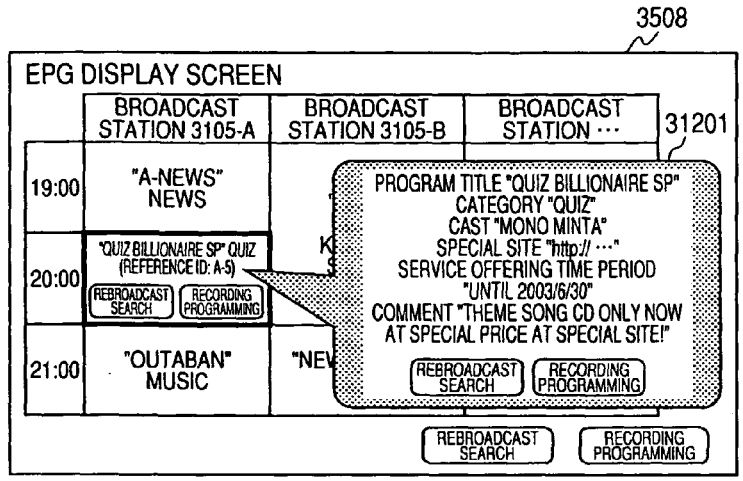
FIGS. 31A to 31C are each a diagram showing the structure of an EPG display screen of the embodiment.
Figure 31B:
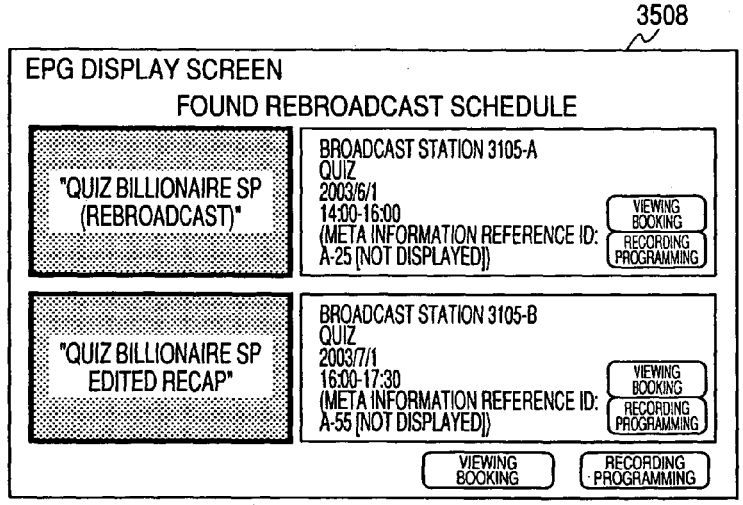
Figure 31C:
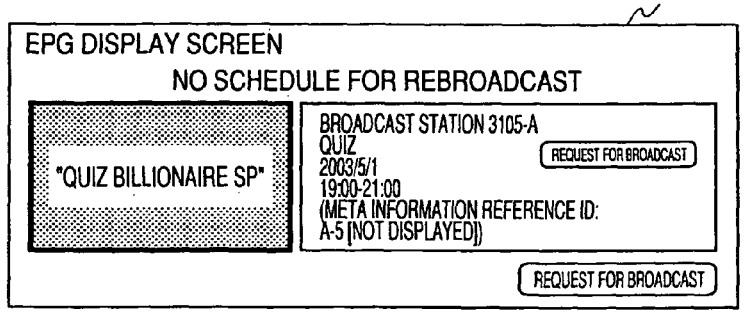

Here, by referring to FIGS. 31A to 31C, described now is an EPG display screen on which display is made based on the basic EPG information acquired by the information reception device 3101. FIGS. 31A to 31C are all a diagram showing the structure of the EPG display screen of the present embodiment.

The meta information retained by the information reception device 3101 is classified under the meta information included in the basic EPG information to be first acquired, and the meta information that is supposed to be acquired from the directory service server 3106.

As shown in FIG. 31A, the EPG display screen displays the basic information related to the broadcast programs such as the broadcast time or the program title on a broadcast station basis. For example, displayed thereon is the program-relating information such as the program title of "Quiz Billionaire SP" to be on the air from "20:00" by a broadcast station 3105-A.

Herein, FIG. 31A is showing only the program title out of the basic information related to the broadcast program. This is surely not restrictive, and the cast information or others may be displayed.

As shown in FIGS. 31A to 31C, described above is a case where the EPG display screen of the present embodiment displays the meta information reference ID of the above broadcast program. Such an example is not restrictive, and as a possible application, the EPG display screen may display no such meta information reference ID, for example.

When the meta information group including the main meta information or the sub meta information comes from the directory service server 3106, the information reception device 3101 acquires the whole of the meta information group for display on a caption section 31201 of the EPG display screen.

As shown in the caption section 31201 of FIG. 31A, if finding any intriguing program, the user can search for any rebroadcast program such as the program title of "Quiz Billionaire SP" by depressing a "rebroadcast search" button. Here, such rebroadcast program is not restrictive, and the search can be made with respect to any related programs such as special programs and edited-version programs, and relating goods (sub contents).

What is more, as shown in the caption section 31201, if finding any intriguing program, by depressing a "recording programming" button, the user can make the information reception device 3101 to record the program having the program title of "Quiz Billionaire SP".

As an example, if the line enclosing in rectangular the program title "Quiz Billionaire SP" is thickly lined in black by the input section 3511 and thus put into the active state, and if the rectangular is double-clicked by the input section 3511, the special site including the program title, cast information, or URL is displayed on the caption section 31201. Herein, the "special site" may display mail addresses instead of URLs.

Next, after the viewer (user) depressing the "rebroadcast search" button displayed on the caption section 31201, the information reception device 3101 responsively makes an access to the directory service server 3106 to search for any rebroadcast program of the "Quiz Billionaire". Here, the "rebroadcast search" button or the "recording programming" button displayed on the caption section 31201 may be displayed in the rectangular provided for the respective programs on the EPG display screen.

Referring to FIGS. 29 and 32, a rebroadcast program search process of the present embodiment is described. Here, FIG. 32 is a diagram schematically showing a partial acquisition process of the present embodiment to be executed for a rebroadcast program if it is scheduled for rebroadcast.

As described in the foregoing, after the reception process (S3803) of the meta information reference ID, through the EPG display screen, a program search result display screen, a recommended program screen, and the like, if the viewer pays attention to the program having the title of "Quiz Billionaire Special" shown in FIG. 32 (e.g., missed it, wants to watch it again, wants to watch from the beginning although watched from some point), the search can be made for the rebroadcast schedule for the program.

To make a search as such, after the input section 3511 depresses the "rebroadcast search" button shown in FIGS. 31A to 31C, the inquiry information generation section 3512 generates inquiry information including a meta information reference ID "A-5" interrelated to the searching program (main content), and the program meta information having a rebroadcast attribute linked to the meta information reference ID "A-5".

Here, as shown in FIG. 32, the program having the title of "Quiz Billionaire Special" with the meta information reference ID "A-5" shows "NONE" for the original program ID (attribute value of rebroadcast attribute) for rebroadcast. Here, if some value is set to the attribute value for rebroadcast of the user-designated program, the attribute value is set to the inquiry information.

As shown in FIG. 32, if "Quiz Billionaire Special (Rebroadcast)" is selected, and searched for rebroadcast, the attribute value for rebroadcast is "A-5", and thus the "A-5" is set to the inquiry information.

To ask for rebroadcast schedule search, thus generated inquiry information is forwarded to the directory service server 3106 by the inquiry information transmission section 3502 over the network 3103. Here, the inquiry information includes attribute values such as the program title and the cast in addition to the meta information reference ID, and the attribute value for rebroadcast.

Next, upon reception of the inquiry information, the meta information search section 3305 of the directory service server 3106 searches a plurality pieces of meta information under its management for the meta information group having "A-5" for the "attribute value for rebroadcast" based on the meta information reference ID or the attribute value for rebroadcast set to the inquiry information (S3804).

As a search result, if there is the meta information group including the meta information having the same specified attribute value for rebroadcast (S3805), that is, when the program is scheduled for rebroadcast, the meta information transmission/reception section 3808 forwards, to the information reception device 3101, the information (meta information reference ID, and the meta information group interrelated thereto) about the corresponding program (S3806). Herein, for transmission, only needed meta information may be partially extracted from the meta information group to be provided to the information reception device 3101.

As shown in FIG. 32, to make a search for a rebroadcast program of the program "Quiz Billionaire Special" having the meta information reference ID "A-5", due to the fact that the attribute value of the rebroadcast attribute (original program ID for rebroadcast) is "NONE", the meta information reference ID "A-5" is used as a search key to search for the meta information group having the attribute value for rebroadcast is "A-5".

As shown in FIG. 32, found are the program "Quiz Billionaire Special (Rebroadcast) having a meta information reference ID of "A-25", and the program "Quiz Billionaire Special Edited Version" having a meta information reference ID of "A-55", and as the search result, the meta information transmission/reception section 3308 forwards the meta information corresponding to thus found meta information reference IDs to the information reception device 3101.

Here, if no search can be made for attribute value for rebroadcast based on the search key, e.g., when no identical value is found, the meta information search section 3305 transfers the inquiry information to the attribute search section 3306 so that the attribute search section 3306 can search for the meta information group having the same or similar attribute value based on the attribute value of some other meta information set to the inquiry information.

For example, if the inquiry information is set with the program title or others as the attribute of the meta information, the attribute value such as the program title is used as a search key to search for the meta information group.

When the attribute value of the program title is a search key, and when the search key is set with "Quiz Billionaire Special", searched are the search key and the attribute value of the meta information exemplarily showing a 90% or more similarity (matching) (search of Quiz Billionaire Special V2 or others.). Alternatively, using the search key, exemplified is a case of making a search for an attribute value of the meta information provided with such a key as "continued version", "part 2", "edited version", or "special version" (search of Quiz Billionaire Special Edited Version or others.). Here, such a key as "continued version", "part 2", "edited version", or "special version" may be exemplified by a case of having been entered in advance in a key table (not shown.) or others, or a case where the attribute is set to the meta information.

This thus allows the attribute search section 3306 to search for any substantially the same or similar program as the program designated by the information reception device 3101, enabling any desired program under various many requirements.

Moreover, by alternatively executing the search if the meta information search section 3305 is incapable of search, the attribute search section 3306 can reduce the processing load of the directory service server 3106, thereby favorably improving the search process efficiency.

Herein, described above is an exemplary case where the meta information search section 3305 and the attribute search section 3306 of the present embodiment are separately structured. This is not restrictive, and those may be structured as a piece having the capabilities of the meta information search section 3305 and the attribute search section 3306, for example.

As a result of such search, when the information reception device 3101 receives the meta information group about the rebroadcast program, the meta information group is displayed on the EPG display screen of the display section 3508. Moreover, if the information reception device 3101 has a function of viewing booking or recording programming, through program specification or others made by the input section 3511, the programming section 3516 performs viewing booking or recording programming for the program scheduled for rebroadcast (S3807).

Thus, when the specified time comes, the information reception device 3101 displays video of the viewing-booked or recording-programmed program on the display section 3508, or recording the program to DVDs, VCRs, and the like.

Here, as shown in FIG. 31B, for viewing booking or recording programming, the search result is displayed on the display section 3508. The display section 3508 also displays, together with a message exemplarily telling "found rebroadcast schedule", the rebroadcast date for the title found program.

Next, when the user uses the input section 3511 to select a "viewing booking" button or the "recording programming"

button displayed in the item of any desired rebroadcast program, a command such as "viewing booking" or "recording programming" responsively goes to the programming section 3516 provided to the information reception device 3101.

The programming section 3516 of the information reception section 3101 accordingly performs viewing booking or recording programming based on the meta information of the program instructed by the input section 3511.

Here, the process flow starting from a search command for the rebroadcast program of the present embodiment to the viewing booking/recording programming (S3807) may be executed by the information reception device 3101 without requiring at some point the user's confirmation process such as confirmation screen display on the display section 3508.

In the above case, the user merely goes through program selection for rebroadcast search, and issues a command for rebroadcast schedule search, and if a rebroadcast program is accordingly found as a result thereof, viewing booking or recording programming is automatically performed. Thus, this reduces the amount of operation to be executed from the user's side, and the information reception device 3101 can perform viewing booking or recording programming in an efficient manner. Here, such a collective process for automatically performing viewing booking or recording programming may be set to the information reception device 3101 in advance, e.g., selection is made between collective process and normal process.

Figure 33:
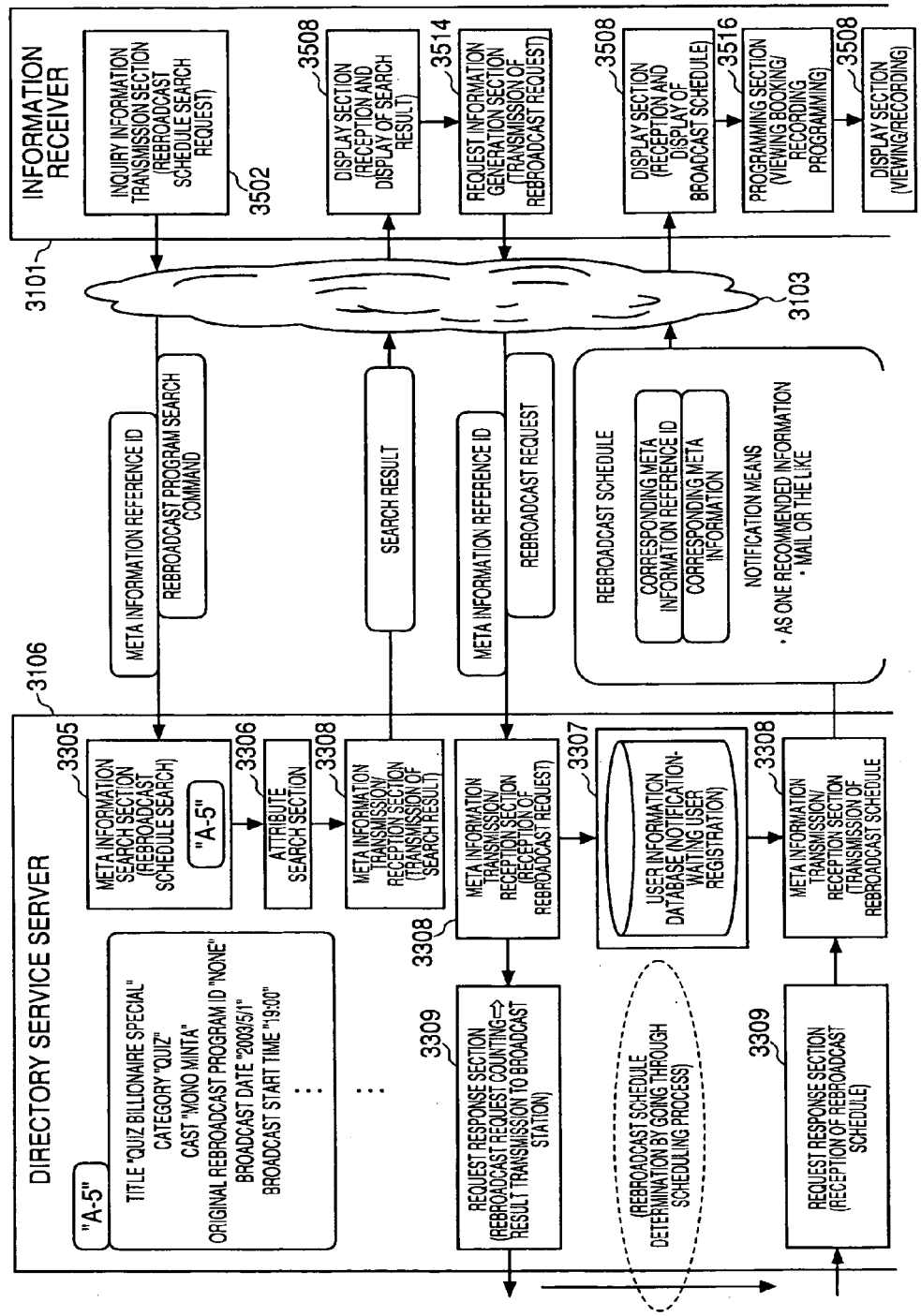
FIG. 33 is a diagram schematically showing a rebroadcast program search and request process when no rebroadcast program of the embodiment is scheduled.

By referring to FIGS. 29 and 33, described next is a rebroadcast program search/request process of the present embodiment. Here, FIG. 33 is a diagram schematically showing the rebroadcast program search and request process when no rebroadcast program is scheduled in the present embodiment.

As described in the foregoing, after the reception process (S3803) of the meta information reference ID, as already described, through the EPG display screen, the program search result display screen, the recommended program screen, and the like, if the viewer pays attention to the program having the title of "Quiz Billionaire Special" shown in FIG. 32 (e.g., missed it, wants to watch it again, wants to watch from the beginning although watched from some point), the search can be made for the rebroadcast schedule for such a program.

Once a program is selected, based on the attribute value (ID) showing the "original program ID for rebroadcast" for the attribute of the meta information to which thus selected program (main content) belongs, or the meta information reference ID to which the main content belongs, the meta information search section 3305 receives the inquiry information for search of the meta information group. Here, if no such ID is set to the "original program ID for rebroadcast" (attribute value for rebroadcast), the meta information reference ID is used as a search key.

As a result of such search, if neither the meta information search section 3305 nor the attribute search section 3306 can find the corresponding meta information, a transmission section (not shown.) forwards, to the information reception device 3101, a message telling that no rebroadcast program is found for the program as the search result.

Such a message telling that no rebroadcast program is detected is forwarded over the network 3103, and received by the notification reception section 3515 provided to the information reception device 3101. The notification reception section 3513 then forwards the message telling that no rebroadcast program is detected to the display section 3508.

As shown in FIG. 31C, upon reception of the message as such, the display section 3508 provided to the information reception device 3101 displays the message on the EPG display screen telling that no rebroadcast program has been detected.

Moreover, as shown in FIG. 31C, when a "request for rebroadcast" button is depressed by the input section 3511 or others, the request information generation section 3514 generates request information for asking for rebroadcast of the selected program.

After generating the request information, the request information generation section 3514 then forwards it to the directory service server 3106 over the network 3103 (S3808). Accordingly, based on the request information coming from a plurality of users, the broadcast station 3105 can make a determination whether to "rebroadcast" or "not rebroadcast". The user may depress the "request for rebroadcast" button to make a request for rebroadcast of any desired program.

The request information generation section 3514 provided to the information reception device 3101 transmits, to the directory service server 3106, the meta information reference ID such as "A-5" of the program asking for rebroadcast, and the request information set with a request message asking for rebroadcast, for example (S3808).

Here, if the information reception device 3101 wants to receive a rebroadcast determination notification after the user's designated program is determined for rebroadcast, the request information includes user information or others for user's identification such as his or her mail address, user ID, and the like. An inquiry may be made for the user to see whether he or she wants to receive the rebroadcast determination notification at the time of transmission of the request information, and the result may be used as a determination factor whether or not to ask for the user ID.

Upon reception of the request information coming from the meta information transmission/reception section 3308, the request response section 3309 provided to the directory service server 3106 makes an addition to the requests for the corresponding program (S3809). Here, the voting number requested through such request information is counted after a certain period. The request votes are counted in number for every meta information reference ID provided to each program, and every time request information comes, a vote is made.

When the received request information is including the user information such as user ID, the request response section 3309 forwards the determination-notification-waiting user information to the notification-waiting information management section 3307.

The notification-waiting information management section 3307 stores the user information about the determination-notification-waiting user into a database, and stores the resulting user information database. Thus, every time the user information comes from the request response section 3309, the notification-waiting information management section 3307 stores the user information into the user information database.

Figure 34:
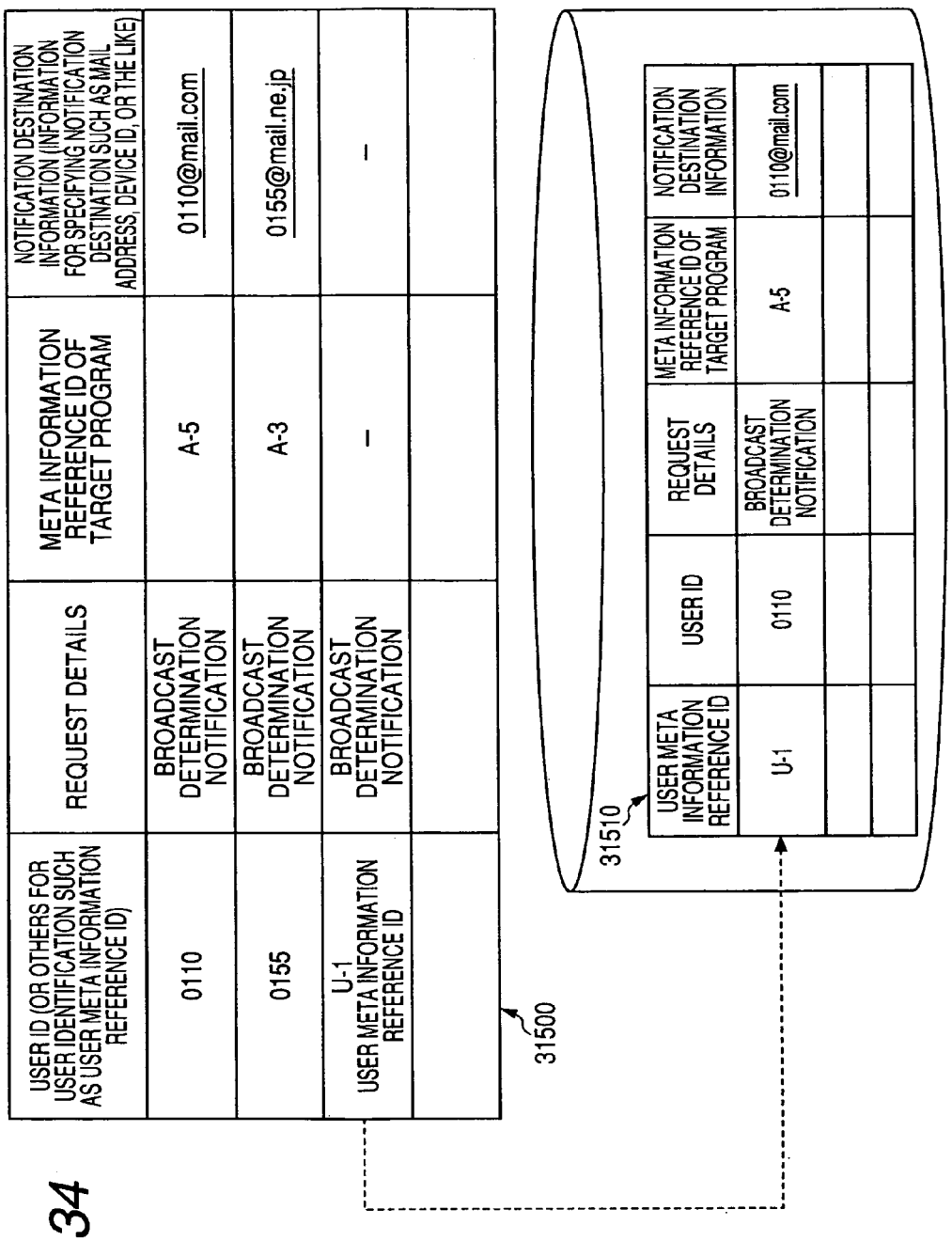
FIG. 34 is a diagram schematically showing the data structure of a user information database of the embodiment.

By referring to FIG. 34, described is the data structure of such a user information database of the present embodiment. FIG. 34 is a diagram schematically showing the data structure of the user information database of the present embodiment.

As shown in FIG. 34, a user information database 31500 is structured by a user ID, request details, a meta information reference ID of a target program, and notification-destination information.

The user ID is used to make an authentication whether it is the information reception device 3101 allowed to access the directory service server 3106. Thus, at log-on, the information reception device 3101 forwards a user ID and a password to the directory service server 3106.

In addition to the user ID, a user meta information reference ID may be exemplified. The user meta information reference ID is not an ID managed by the directory server 3106 but an ID managed by the account aggregation server 3109. Use of such a user meta information reference ID allows the account aggregation server 3109 to collectively manage a plurality of user IDs, whereby a plurality pieces of user information can be collectively managed.

The meta information reference ID of the target program is the meta information reference ID set to the request information coming from the information reception device 3101. The notification-destination information is specific information to make a notification toward the information reception device 3101. Here, the notification-destination information of the present embodiment is not restrictive to mail addresses, and the notification information may be telephone numbers, or the like.

As shown in FIG. 34, when the user meta information reference ID is "U-1", for example, only by storing any predetermined information into the user information database 31500, in any other server such as the account aggregation sever 3109, it can be separately managed such as the user information database 31510.

As shown in FIG. 33, as a result of adding and counting the request votes through reception of the request information (S3809), if a certain program won a predetermined number of votes or more such as 10000 votes (S3810), the request response section 3309 provided to the directory service server 3106 forwards information telling that the program has won the predetermined number of votes or more to any predetermined server provided to the broadcast station 3105 (e.g., server with which a person in charge of scheduling can check its contents).

The information telling that the program has won the predetermined number of votes or more includes a meta information reference ID, meta information linked to the meta information reference ID if required, and the like. Here, to the predetermined number of votes, any number can be set for every program offered by the broadcast station 3105.

Next, if the request votes exceed the predetermined number, the broadcast station 3105 contemplates the schedule whether or not to rebroadcast the program at the time of scheduling, for example. Alternatively, when the predetermined server receives the information telling that the program has won the predetermined number of votes or more, the broadcast station 3105 may automatically determine the rebroadcast schedule meeting the predetermined requirements such as the broadcast time.

If the rebroadcast schedule is determined as a result of contemplation as such, the broadcast station 3105 goes through the normal scheduling process of adding any needed meta information, for example, and with respect to the directory service server 3106, forwards information about the program determined for rebroadcast or enter the meta information such as the program meta information or the sub meta information.

As shown in FIG. 33, from the information reception device 3101, after the program having the meta information reference ID "A-5" (title "Quiz Billionaire Special") is subjected to the scheduling process as a rebroadcast program, the result will be the program shown in FIG. 32 having the meta information reference ID "A-25" (title "Quiz Billionaire Special (Rebroadcast)"), for example. The program meta information such as the title and the broadcast date, of the rebroadcast program after the scheduling process, the sub meta information, or others are entered to the broadcast station 3105.

Next, upon reception of the information related to the rebroadcast-determined program (rebroadcast determination information), the request response section 3309 transfers it both to the meta information transmission/reception section 3308 and the notification-waiting information management section 3307. The notification-waiting information management section 3307 extracts the notification-destination information from the user information database 31500 based on the user ID and the meta information reference ID of the target program, and then forwards the determination notification information set with the user ID, the notification-destination information, or others to the meta information transmission/reception section 3308.

Upon reception of the determination notification information coming from the notification-waiting information management section 3307, the meta information transmission/reception section 3308 forwards, to the information reception device 3101, a rebroadcast determination notification derived by adding rebroadcast determination information (e.g., meta information reference ID or meta information of the program scheduled for rebroadcast) to the determination notification information (S3811). Here, transmission means may be changed in accordance with the type of the information reception device 3101, such as E-mail, FAX, or message.

When the information reception device 3101 receives the rebroadcast determination notification, the display section 3508 displays the rebroadcast determination notification on the EPG display screen, and as described in the foregoing, the programming section 3516 goes through a process such as viewing booking or recording programming in a similar manner to the case with rebroadcast schedule (S3812).

Here, if the request counting result is not exceeding the predetermined number of votes (S3810), confirmation is made whether the counting deadline is not yet passed (S3813), and if before the deadline, the request information for the program is continuously accepted from the information reception device 3101.

As to the program not exceeding the predetermined number of votes even after a predetermined counting deadline, the directory service server 3106 closes the acceptance of the request information, and if required, the vote data may be discarded or output to another region (S3814). As such, this is the end of a series of operation related to the rebroadcast program search and request process of the present embodiment.

As described in the foregoing, from the rebroadcast program search process (S3804) to the process of requesting thus found rebroadcast program (S3808) and the viewing booking/recording programming process (S3812), as a possible application, the information reception device 3101 may not display on the display section 3508, exemplarily on a process basis, a confirmation response screen (not shown.) for accepting user's confirmation at some point of the procedure.

In the rebroadcast program search and request process of the present embodiment, the user merely goes through program selection, and issue a command toward the information reception device 3101 for rebroadcast program search. As a result of search as such, if a rebroadcast program is found, the programming section 3516 provided to the information reception device 3101 automatically performs viewing booking or recording programming for the rebroadcast program. Thus, this can improve the processing efficiency starting from the rebroadcast program search to the viewing booking or recoding programming.

Such a collective process may be regarded as a characteristic for the information reception device 3101 in terms of process, or may be executed under specific requirements, e.g., the user may make a setting to the setting information or others of the information reception device 3101 so that the user gives a permission to allow the collective process.

In the rebroadcast program search and request process of the present embodiment, described is a case where the counting capability and the storage region for the related information belongs to the directory service server 3106. This is not restrictive, and for example, any other server such as a predetermined server provided to the broadcast station 3105 may include the counting capability of adding and counting the votes made by the request information, and the storage region for the related information such as a user information database. In a case where the counting capability is located outside of the directory service server 3106, the directory service server 3106 transfers the requests coming from the reception device to the external server having the counting capability.

In the rebroadcast program search and request process of the present embodiment, described is a case where the directory service server 3106 forwards the rebroadcast determination notification toward the information reception device 3101 after the rebroadcast program is determined by the scheduling process. This is not restrictive, and as a possible application, a confirmation section (not shown.) provided to the information reception device 3101 or others may access the directory service server 3106 on a regular basis such as once a day, and the rebroadcast determination notification may be acquired. At such a time, the information reception device 3101 prepares a storage region (not shown.) for storing meta information reference IDs of programs requested for rebroadcast, and every time a rebroadcast request is made, stores the meta information reference ID of thus requested program. Based on such meta information reference IDs, it becomes possible to automatically make an inquiry to the directory service server 3106.

With the rebroadcast program search and request process of the present embodiment, the rebroadcast program is not the only option, and various programs such as "continued-version request", "edited version request", and "No Good collection request" can be searched for request.

In the above case, not only the original program (original program) ID for rebroadcast, and for example, another type of original program ID for the programs on series such as continued version (part 2) may be defined in advance. Alternatively, together with the original program ID, a management method for additionally defining "rebroadcast" or "edited version" as a "program attribute". Thus, for program search, it becomes possible not only to make a search for any rebroadcast program but also make a search for any program related to the above program such as edited version, special version, or the like.

The display section 3508 of the information reception device 3101 of the present embodiment displays menu screens including not only "rebroadcast search" or "rebroadcast request" but also "edited version search" or "edited version request" for program search of the edited version, and their corresponding buttons. The inquiry information corresponding thereto may be forwarded to the directory service server 3106.

Figure 35A:
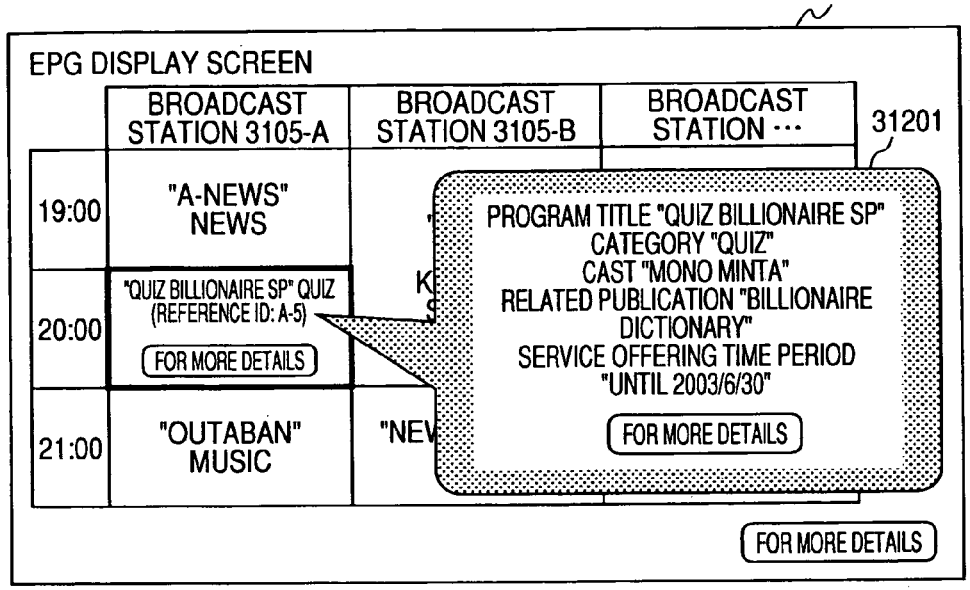
FIGS. 35A and 35B are each a diagram showing the structure of the EPG display screen of the embodiment.
Figure 35B:
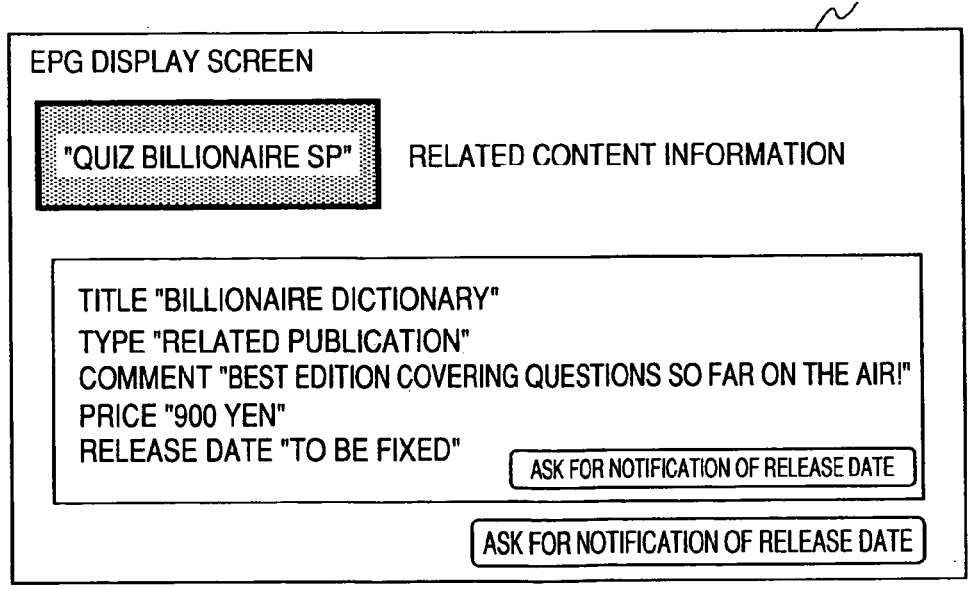
Figure 36:
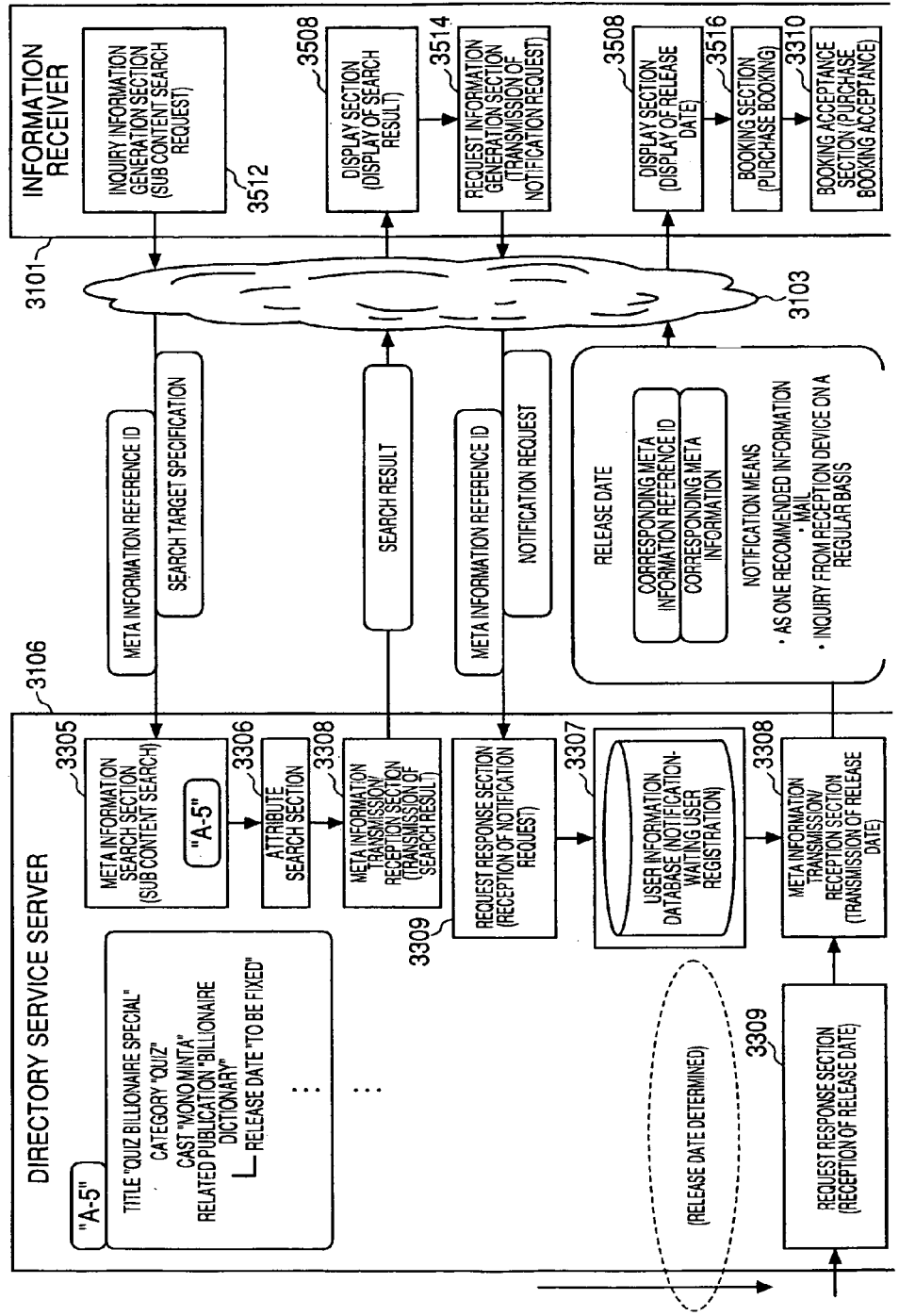
FIG. 36 is a diagram schematically showing a content search and request process of the embodiment.

Described so far are examples in which a main content is a program, and any main content other than the program may be applicable with almost the same process. In the below, referring to FIGS. 35A and 35B, and FIG. 36, described is a sub content search and request process of the present embodiment. FIGS. 35A and 35B are each a diagram showing the structure of the EPG display screen of the present embodiment, and FIG. 36 is a diagram schematically showing the content search and request process of the present embodiment.

As shown in FIG. 35A, the display section 3508 displays the EPG display screen. As described in the foregoing, clicking a rectangular for any appropriate program on the EPG display screen for program search makes the screen active, and double-clicking it displays the caption section 31201 on the display section 3508.

As shown in FIG. 35A, the caption section 31201 displays program meta information such as "program title (title)", "category", or "cast (personalities)", and sub meta information such as "related publication", or "service offering time period".

As shown in FIG. 35A, the caption section 31201 displays the program meta information including the program title and attribute value of "Quiz Billionaire SP", the program meta information including the category and the attribute value of "Quiz", and the program meta information including the cast and attribute value of "Mono Minta". Also displayed thereon are the sub meta information including the related publication and the attribute value of "Billionaire Dictionary", and the sub meta information including the service offering time period and the attribute value of "Until 2003/6/30".

Moreover, in a close range of the related publication and the attribute value of "Billionaire Dictionary" being the sub meta information on the caption section 31201, a "for more detailed" button is displayed. Depressing such a "for detailed information" using the input section 3511 will allow search and acquisition of more detailed information (meta information group) related to the sub contents, e.g., whether there is any related publication (sub content).

By using the information reception device 3101, the user can search or acquire the detailed information about the sub contents related to a certain program (main content) or sub contents through various means such as detailed information display, search, recommend, or others from the EPG display screen.

As shown in FIG. 36, assuming here is a case of searching a meta information group having a meta information reference ID of "A-5", the inquiry information generation section 3512 provided to the information reception device 3101 generates inquiry information including the meta information reference ID "A-5", the title "Quiz Billionaire Special", an instruction of including the meta information whose attribute is the related publication (search target instruction), or the like.

For sub content search, the inquiry information transmission section 3502 forwards the inquiry information generated by the inquiry information generation section 3512 to the directory service server 3106 over the network 3103. Here, the destination of such transmission of the inquiry information includes every URI of the directory service server 3106 in the information reception device 3101.

When the directory service server 3106 receives such inquiry information, the meta information search section 3305 searches for a plurality pieces of meta information in charge for the corresponding meta information group based on the meta information reference ID or the found in the inquiry information.

As a result of such search, if thus designated meta information group is found in the meta information group, the meta information transmission/reception section 3308 forwards the meta information group related to the program to the information reception device 3101. Here, out of the meta information group to be forwarded to the information reception device 3101, only the meta information related to the sub content may be partially extracted for transmission.

As shown in FIG. 36, the search result derived by the meta information search section 3305 is the meta information group about the title "Quiz Billionaire SP" having the meta information reference ID "A-5". Thus, the meta information search section 3305 extracts the related publication "Billionaire Dictionary" and the meta information related to such as related publication (Release Date "pending") for transmission to the meta information transmission/reception section 3308.

Here, as described in the foregoing, if no meta information group is found as a search result derived by the meta information search section 3305 of the present embodiment, for example, the meta information search section 3305 transfers the inquiry information to the attribute search section 3306, and the attribute search section 3306 searches for the meta information group.

For example, as described above, if the "search target instruction" found in the inquiry information has the attribute of the related publication, in addition to the related publication, the attribute search section 3306 can search for any similar attribute such as "related video", and "related game" from the meta information group. Here, such an attribute similar to the related publication may be entered in advance into a key table (not shown.) or others, and the attribute search section 3306 may refer to such a key table to make a search for the meta information group.

Accordingly, the attribute search section 3306 can make a search for programs almost the same or similar to the program (main content) or sub contents such as videos and books related to the programs.

If the attribute search section 3306 succeeds in finding the corresponding meta information group, similarly to the search result derived by the meta information search section 3305, the meta information transmission/reception section 3308 forwards the meta information group or any extracted meta information to the information reception device 3101.

As shown in FIG. 35B, the search result of the meta information reference ID "A-5" is displayed on the EPG display screen. If the EPG display screen indicates that the release date for the related publication (sub content) is "pending", the input section 3511 depresses a button of "ask for receiving notification". In response to such a button depression, the request information generation section 3514 provided to the information reception device 3101 receives a determination notification about the release date from the directory service server 3106 when the release date for the related publication is determined. Then, the request information is generated for transmission to the directory service server 3106.

The request information includes at least a meta information reference ID, and a notification request, and for example, as shown in FIGS. 35A to 35B, the request information includes the meta information reference ID "A-5", the related publication "Billionaire Dictionary", a release date notification as the notification request, and the like.

Upon reception of the request information, the meta information transmission/reception section 3308 transfers it to the request response section 3309. By transferring the request information to the request response section 3309 as such, the request information is entered into the user information database under the management of the notification-waiting information management section 3307. Here, the user information database has almost the same structure as the one described above, and thus no further description is given here again.

When the release date for the sub content is determined, and when the "release date" of the sub meta information related to the sub content under the management of the content service server 3107 is updated, the sub meta information including the attribute value of the release date is forwarded to the request response section 3309 provided to the directory service server 3106.

The request response section 3309 transfers the sub meta information including the attribute value of the release date coming from the content service server 3107 to both the meta information transmission/reception section 3308 and the notification-waiting information management section 3307.

Based on the user ID coming from the user information database 31500 and the meta information reference ID coming from the request response section 3309, the notification-waiting information management section 3307 extracts the notification-destination information, and forwards the determination notification information including the user ID and the notification-destination information to the meta information transmission/reception section 3308.

Upon reception of the determination notification information coming from the notification-waiting information management section 3307, the meta information transmission/reception section 3308 adds, to the determination notification information, the meta information reference ID, the sub meta information including the attribute value of the release date, or others for transmission to the information reception device 3101. Here, transmission means may be changed in accordance with the type of the information reception device 3101, such as E-mail, FAX, or message.

When the information reception device 3101 receives the sub meta notification or others, the display section 3508 displays the sub meta notification or others on the EPG display screen. In a case where the information reception device 3101 is provided with a sub content purchase booking capability, the programming section 3516 can perform a purchase booking process for booking the sub content prior to the release date in response to a command coming from the input section 3511.

In response to the command coming from the input section 3511, the programming section 3516 generates purchase booking information for make a booking of the sub content, and forwards it to the directory service server 3106 over the network 3103.

When the booking acceptance section 3310 provided to the directory service server 3106 receives the purchase booking information, the booking acceptance section 3310 adds purchase booking information to a user purchase database (not shown.) under the management of the booking acceptance section 3310.

Moreover, the booking acceptance section 3310 forwards the purchase booking information to the account aggregation server 3109.

Here, the user purchase database of the present embodiment is applicable if being the user information database 31500, or the user information database 31510 under the management of the account aggregation server 3109.

After the purchase booking information is added to the user purchase database, when the release date comes for the booked sub content, the directory service server 3106 issues a command to the content service server 3107 to distribute the sub content to the information reception device 3101 based on the user purchase database. In such a manner, the information reception device 3101 can purchase the sub content.

Here, when such a command is issued by the directory service server 3106 toward the content service server 3107, after checking the account aggregation server 3109 completing the sub content billing/settlement process in a normal manner, the directory service server 3106 issues a command to the content service server 3017 to distribute the sub content. As such, this is the end of the description about the sub content search and request process of the present embodiment.

Note here that the billing/settlement process to be executed by the account aggregation server 3109 of the present embodiment will be described in detail later.

Further, in the sub content search and request process of the present embodiment, for the duration of the process of asking for a notification of the sub content release date to the process of sub content purchase booking, the information reception device 3101 may go through the procedure without displaying the screen (not shown.) for asking the user to make a confirmation on the display section 3508, for example.

The user merely goes through sub content selection, and asks for (requests) notification of the sub content release date. As a result, when the release date is determined, a purchase booking may be automatically made. This reduces the number of operation steps the user is supposed to go through, and the information reception device 3101 can be improved in processing efficiency can be reduced.

Moreover, in the sub content search and request process of the present embodiment, described above is a case of notifying the determined release date if the release date is pending at the time of search made for the meta information group interrelated to the sub content. Such a notification of the release date is not the only option. For example, the similar process can be executed for any other detailed information such as price and title. That is, the determination notification provided to the information reception device 3101 can be exemplified by a release date determination notification, a price determination notification, or others, and also included is an update notification of the main meta information interrelated to the main content or the sub meta information interrelated to the sub content.

At the time when the broadcast station 3105 and the information distribution device 3104 want to provide viewers (users) with any specific sub contents, by narrowing down the viewers' (users') preferences, advertisement can be performed in an efficient manner.

The information reception device 3101 can easily make a search for any main contents or sub contents whose contents seem intriguing, and thus can reach any target content with no useless information. At this time, the information reception device 3101 uses the information derived by a plurality of broadcast stations 3105 as a basis to make an access to the contents managed by the broadcast stations 3105.

Each of the broadcast stations 3105 can individually manage the directory service server 3106 and the content service server 3107. Even if every broadcast station 3105 is not registered to the information search system of the present embodiment, the information search system can be activated, and an later addition will do.

The basic EPG information is collectively collected by distribution companies for the EPG service or others for delivery. Alternatively, any other additional ECG information may be closed and managed in the broadcast station.

This eliminates the need for data submission to the EPG service distribution companies so that the process needed for the data update can be minimized. Moreover, detail change made to the program meta information under the management of the directory service server 3106 or the content service server 3107 does not affect the broadcast waves (SI information).

For the information reception device 3101 to acquire the meta information about the detailed information and the related information, to make an access to the directory service server 3106, the information distribution device 3104 of the meta information (mainly the broadcast station 3105) can acquire the access information derived thereby. Here, if the whole of the meta information is stored in the information reception device 3101 for processes, the meta information cannot be acquired unless the information reception device 3101 explicitly performs data transmission.

Even if the meta information, and the contents of the sub content and the main content referable by a certain program are updated with a lapse of time, the information to be received by the information reception device 3101 is always the same meta information reference ID.

This allows to provide always the latest information at an access timing made by the information reception device 3101. Similarly to a case of real-time broadcast, information about any recorded programs can be dealt with.

On the side of the broadcast station 3105, the meta information reference IDs, attributes of various meta information, and the service offering time period can be controlled.

The information distribution device 3104 can make a search for rebroadcast programs of a program designated by the information reception device 3101 in an efficient manner. Further, the information reception device 3101 can make a request for the information distribution device 3104 to rebroadcast the program.

Moreover, if the program is scheduled for rebroadcast, or if the program is newly determined for rebroadcast after pending for a while, such a result is notified by the information distribution device 3104 to the information reception device 3101 so that the reliability of the information reception device 3101 to broadcast the program can be improved.

The information distribution device 3104 can forward a notification such as the date of the rebroadcast program to the information reception device 3101 at any appropriate timing. Thus, the rebroadcast schedule for the program can be forwarded to the information reception device 3101 immediately after the program is originally off the air.

As described in the foregoing, according to the present invention, an information distribution device delivers only a meta information reference ID instead of the whole of a meta information group, and forwards a meta information group interrelated to the meta information reference ID as needed. This can reduce the data amount for delivery and the data amount to be stored in the information reception device, favorably improving the processing efficiency, and providing any desired content to the information reception device.

As described in the foregoing, according to the present embodiment, the information distribution device 3104 can make a search for any target content in an efficient manner from a content designated by the information reception device 3101.

As such, although described are the preferable embodiments of the present invention by referring to the accompanying drawings, the present invention is not restricted to such examples. It is understood for those skilled in the art that numerous other modifications and variations can be devised without departing from the technical scope claimed in the claims of the invention, and such modifications and variations are surely within the technical scope of the present invention.

It should be understood that various changes and modifications to the presently preferred embodiments described herein will be apparent to those skilled in the art. Such changes and modifications can be made without departing from the spirit and scope of the present invention and without diminishing its intended advantages. It is therefore intended that such changes and modifications be covered by the appended claims.

The invention claimed is:

1. An information access system capable of distributing program meta information and a content with an interrelation established therebetween, the information access system comprising:
an information distribution device storing:
(a) program meta information; and
(b) content meta information;
a transmitter configured to transmit:
(a) the program meta information; and
(b) a meta information reference ID;
an information reception device including:
(a) a display device;
(b) a receiver;
(c) a processor; and
(d) a memory device storing instructions, which when executed by the processor, cause the processor to operate with the receiver and the display device to:
(i) receive:
(A) the program meta information; and
(B) the meta information reference ID;
(ii) request content meta information from the information distribution device based on said received meta information reference ID, the requested content meta information being distributed to the information reception device in response to the request;
(iii) determine whether the requested content meta information has an update possibility;
(iv) if the determination is the requested content meta information has the update possibility, perform an update confirmation process;
(v) if the determination is the requested content meta information does not have the update possibility, do not perform the update confirmation process so as to increase efficiency of an update process; and
(vi) display the distributed content meta information requested from the information distribution device, said displayed content meta information:
(A) being based on the meta information reference ID; and
(B) being a latest content meta information.

2. The information access system of claim 1, wherein when executed by the processor, the instructions cause the processor to operate with the receiver to receive the program meta information and the meta information reference ID over a network.

3. The information access system of claim 1, wherein when executed by the processor, the instructions cause the processor to operate with the receiver to receive the program meta information and the meta information reference ID over a broadcast wave.

4. The information access system of claim 1, wherein the displayed content meta information includes address information of an entity of the content.

5. The information access system of claim 1, further comprising content access means for making an access to the content based on the address information of the entity of the content with the interrelation established with the program meta information.

6. The information access system of claim 5, further comprising analysis means for analyzing preference information from the content accessed by the content access means.

7. The information access system of claim 6, wherein the content is searched based on the preference information.

8. The information access system of claim 1, wherein the content meta information is set with a keyword related to a program.

9. The information access system of claim 8, further comprising content access means for making an access to the content related to the keyword based on the keyword.

10. The information access system of claim 9, further comprising analysis means for analyzing preference information from the content found by a search means based on the keyword.

11. The information access system of claim 10, wherein the search means further comprises preference search means for searching the content based on the preference information.

12. The information access system of claim 1, wherein the content meta information:
(a) includes information about the content with the interrelation established with the program meta information; and
(b) is hierarchically below the program meta information.

13. An information distribution device capable of distributing program meta information and a content with an interrelation established therebetween, the information distribution device comprising:
a transmitter;
a receiver;
a processor;
a memory device storing instructions, which when executed by the processor, cause the processor to operate with the transmitter and receiver to:
(a) store:
(i) program meta information; and
(ii) content meta information which is updated in real time;
(b) transmit, to an information reception device:
(i) the program meta information; and
(ii) meta information reference ID;
(c) receive a request for content meta information from the information reception device based on the meta information reference ID transmitted to the information reception device; and
(d) transmit, to the information reception device, the content meta information based on the meta information reference ID transmitted to the information reception device, said information reception device being configured to:
(i) determine whether the requested content meta information has an update possibility;
(ii) if the determination is the requested content meta information has the update possibility, perform an update confirmation process;
(iii) if the determination is the requested content meta information does not have the update possibility, do not perform the update confirmation process so as to increase efficiency of an update process; and
(iv) display said transmitted content meta information, said displayed content meta information:
(A) being based on said meta information reference ID; and
(B) being a latest content meta information.

14. The information distribution device of claim 13, wherein when executed by the processor, the instructions cause the processor to operate with the transmitter to transmit the program meta information and the meta information reference ID over a network.

15. The information distribution device of claim 13, wherein when executed by the processor, the instructions cause the processor to operate with the transmitter to transmit the program meta information and the meta information reference ID over a broadcast wave.

16. The information distribution device of claim 13, wherein the content meta information:
   (a) includes information about the content; and
   (b) is hierarchically below the program meta information.

17. An information access device comprising:
   a display device;
   a receiver;
   a processor; and
   a memory device storing instructions, which when executed by the processor, cause the processor to operate with the receiver and the display device to:
      (a) receive:
         (i) program meta information; and
         (ii) a meta information reference ID;
      (b) request content meta information based on the received meta information reference ID, the requested content meta information being distributed to the information reception device in response to the request;
      (c) determine whether the requested content meta information has an update possibility;
      (d) if the determination is the requested content meta information has the update possibility, perform an update confirmation process;
      (e) if the determination is the requested content meta information does not have the update possibility, do not perform the update confirmation process so as to increase efficiency of an update process; and
      (f) after receiving the distributed content meta information, display the distributed content meta information, said displayed content meta information:
         (i) being based on the meta information reference ID; and
         (ii) being a latest content meta information.

18. The information access device of claim 17, wherein when executed by the processor, the instructions cause the processor to operate with the receiver to receive the program meta information and the meta information reference ID over a network.

19. The information access device of claim 17, wherein when executed by the processor, the instructions cause the processor to operate with the receiver to receive the program meta information and the meta information reference ID over a broadcast wave.

20. The information access device of claim 17, further comprising content access means for making an access to the address information of the entity of the content included in the content meta information.

21. The information access device of claim 20, further comprising analysis means for analyzing preference information derived by accessing the address information of the entity of the content.

22. The information access device of claim 21, further comprising search means for searching the content based on the preference information.

23. The information access device of claim 17, further comprising content access means for making an access to content based on a keyword relating to the content included in the content meta information.

24. The information access device of claim 23, further comprising analysis means for analyzing preference information of the content accessed based on the keyword.

25. The information access device of claim 24, further comprising preference search means for searching the content based on the preference information.

26. The information access device of claim 17, wherein the content meta information:
   (a) includes information about the content; and
   (b) is hierarchically below the program meta information.

27. A method of operating an information access system capable of distributing program meta information and a content with an interrelation established therebetween, the method comprising:
   (a) causing an information distribution device to store:
      (i) program meta information; and
      (ii) content meta information which is updated in real time;
   (b) causing a transmitter to transmit:
      (i) the program meta information; and
      (ii) a meta information reference ID;
   (c) causing an information reception device to receive:
      (i) the program meta information; and
      (ii) the meta information reference ID;
   (d) causing the information reception device to request content meta information from the information distribution device based on the received meta information reference ID;
   (e) causing the information distribution device to distribute the requested content meta information to the information reception device;
   (f) causing the information reception device to determine whether the requested content meta information has an update possibility;
   (g) if the determination is the requested content meta information has the update possibility, performing an update confirmation process;
   (h) if the determination is the requested content meta information does not have the update possibility, not performing the update confirmation process so as to increase efficiency of an update process; and
   (i) causing a display device to display the distributed content meta information requested from the information distribution device, said displayed content meta information:
      (i) being based on the meta information reference ID; and
      (ii) being a latest content meta information.

28. The method of claim 27, which includes causing the information reception device to receive the program meta information and the meta information reference ID over a network.

29. The method of claim 27, which includes causing the information reception device to receive the program meta information and the meta information reference ID over a broadcast wave.

30. The method of claim 27, wherein the content meta information received based on the meta information reference ID includes address information of an entity of the content.

31. The method of claim 30, wherein the content is accessed based on the address information of the entity of the content.

32. The method of claim 31, wherein preference information is analyzed from the accessed content.

33. The method of claim 32, wherein the content is searched based on the preference information.

34. The method of claim 27, wherein the content meta information is set with a keyword related to a program.

35. The method of claim 34, wherein the content related to the keyword is searched based on the keyword.

36. The method of claim 35, wherein preference information is analyzed from the content found based on the keyword.

37. The method of claim 36, wherein the content is searched based on the preference information.

38. The method of claim 27, wherein the content meta information:
(a) includes information about the content; and
(b) is hierarchically below the program meta information.

39. A method of operating an information distribution device, the method comprising:
(a) causing a memory device to store:
(i) program meta information; and
(ii) content meta information which is updated in real time;
(b) causing a transmitter to transmit:
(i) the program meta information; and
(ii) a meta information reference ID to an information reception device;
(c) causing a receiver to receive a request for content meta information from the information reception device based on the meta information reference ID transmitted to the information reception device; and
(d) causing the transmitter to transmit, to the information reception device, the content meta information based on the meta information reference ID transmitted to the information reception device, said information reception device being configured to:
(i) determine whether the requested content meta information has an update possibility;
(ii) if the determination is the requested content meta information has the update possibility, perform an update confirmation process;
(iii) if the determination is the requested content meta information does not have the update possibility, do not perform the update confirmation process so as to increase efficiency of an update process; and
(iv) display said transmitted content meta information, said displayed content meta information:
(A) being based on said meta information reference ID; and
(B) being a latest content meta information.

40. The method of claim 39, which includes causing the transmitter to transmit the program meta information and the meta information reference ID over a network.

41. The method of claim 39, which includes causing the transmitter to transmit the program meta information and the meta information reference ID over a broadcast wave.

42. The method of claim 39, wherein the content meta information:
(a) includes information about the content; and
(b) is hierarchically below the program meta information.

43. A method of operating an information reception device storing instructions, the method comprising:
(a) causing a receiver to receive:
(i) program meta information; and
(ii) a meta information reference ID;
(b) causing a processor to execute the instructions to request content meta information based on the meta information reference ID, the requested content meta information being distributed to the information reception device in response to the request;
(c) causing the processor to execute the instructions to determine whether the requested content meta information has an update possibility;
(d) if the determination is the requested content meta information has the update possibility, causing the processor to execute the instructions to perform an update confirmation process;
(e) if the determination is the requested content meta information does not have the update possibility, causing the processor to execute the instructions to not perform the update confirmation process so as to increase efficiency of an update process; and
(f) after receiving the distributed content meta information, causing a display device to display the distributed content meta information, said displayed the content meta information:
(i) being based on the meta information reference ID;
(ii) being a latest content meta information.

44. The method of claim 43, which includes causing the receiver to receive the program meta information and the meta information reference ID over a network.

45. The method of claim 43, which includes causing the receiver to receive the program meta information and the meta information reference ID over a broadcast wave.

46. The information access method of claim 43, wherein address information of an entity of a content included in the content meta information is accessed.

47. The method of claim 46, wherein preference information derived by accessing the address information of the entity of the content is analyzed.

48. The method of claim 47, wherein the content is searched based on the preference information.

49. The method of claim 43, wherein content is accessed based on a keyword related to the content included in the content meta information.

50. The method of claim 49, wherein preference information of the content accessed based on the keyword is analyzed.

51. The method of claim 50, wherein the content is searched based on the preference information.

52. The method of claim 43, wherein the content meta information:
(a) includes information about the content; and
(b) is hierarchically below the program meta information.

* * * * *